US010836585B2

(12) United States Patent
DeVries et al.

(10) Patent No.: US 10,836,585 B2
(45) Date of Patent: Nov. 17, 2020

(54) APPARATUS AND METHOD FOR MONITORING CONVEYOR SYSTEMS

(71) Applicant: Flexible Steel Lacing Company, Downers Grove, IL (US)

(72) Inventors: Brett E. DeVries, Comstock Park, MI (US); Todd A. Zeilinger, Holland, MI (US); Kurt Alan Dykema, Holland, MI (US); David Adrian Moelker, Zeeland, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 16/229,946

(22) Filed: Dec. 21, 2018

(65) Prior Publication Data
US 2019/0193946 A1 Jun. 27, 2019

Related U.S. Application Data

(60) Provisional application No. 62/733,367, filed on Sep. 19, 2018, provisional application No. 62/610,015, filed on Dec. 22, 2017.

(51) Int. Cl.
*B65G 45/12* (2006.01)
*G01M 13/00* (2019.01)
(Continued)

(52) U.S. Cl.
CPC ............. *B65G 45/12* (2013.01); *B65G 43/00* (2013.01); *B65G 43/02* (2013.01); *B65G 45/16* (2013.01); *G01M 13/00* (2013.01)

(58) Field of Classification Search
CPC ................................................ B65G 45/10–24
(Continued)

(56) References Cited

U.S. PATENT DOCUMENTS 775,341 A 11/1904 Raesner
3,629,814 A 12/1971 Klein
(Continued)

FOREIGN PATENT DOCUMENTS

CN 202642774 1/2013
CN 204872691 12/2015
(Continued)

OTHER PUBLICATIONS

Invitation to Pay Additional Fees and, Where Applicable, Protest Fee from International Patent Application No. PCT/US2018/067133, dated Mar. 5, 2019, 2 pages.
(Continued)

*Primary Examiner* — William R Harp
(74) *Attorney, Agent, or Firm* — Fitch, Even, Tabin & Flannery LLP

(57) ABSTRACT

In one aspect, an apparatus is provided for a conveyor belt system. The apparatus includes a conveyor belt cleaner having an elongate support and a pair of mounts configured to position the elongate support to extend across a conveyor belt. The apparatus includes a cleaner blade configured to be operatively mounted to the elongate support and engage a conveyor belt. The apparatus further includes a sensor configured to detect at least one characteristic of the elongate support as the elongate support vibrates during conveyor belt operation. A processor of the apparatus is configured to use the at least one characteristic of the elongate support to predict at least one property of the cleaner blade.

43 Claims, 44 Drawing Sheets

(51) Int. Cl.
   *B65G 43/00*  (2006.01)
   *B65G 45/16*  (2006.01)
   *B65G 43/02*  (2006.01)

(58) Field of Classification Search
   USPC .................................................. 198/493–499
   See application file for complete search history.

(56) References Cited

U.S. PATENT DOCUMENTS

| | | | |
|---|---|---|---|
| 3,834,534 | A | 9/1974 | Peterson |
| 4,369,398 | A | 1/1983 | Lowry, Sr. |
| 4,381,673 | A | 5/1983 | Klauba |
| 4,404,505 | A | 9/1983 | Swanson |
| 4,469,993 | A | 9/1984 | Swanson |
| 4,513,882 | A | 4/1985 | Cabi-Akman |
| 4,823,599 | A | 4/1989 | Schneider |
| 4,969,553 | A | 11/1990 | Stoll |
| 5,054,606 | A | 10/1991 | Musschoot |
| 5,168,266 | A | 12/1992 | Fukuda |
| 5,278,620 | A | 1/1994 | Godlove |
| 5,626,447 | A | 5/1997 | Buysman |
| 5,777,232 | A | 7/1998 | Kurita |
| 5,783,042 | A | 7/1998 | Leeman |
| 5,944,170 | A | 8/1999 | Laveine |
| 5,950,803 | A | 9/1999 | Schwarze |
| 6,003,657 | A | 12/1999 | Mott |
| 6,116,088 | A | 9/2000 | Schneider |
| 6,126,512 | A | 10/2000 | Chao |
| 6,135,268 | A | 10/2000 | Couch |
| 6,260,691 | B1 | 7/2001 | Buchas |
| 6,283,274 | B1 | 9/2001 | Dolan |
| 6,321,586 | B1 | 11/2001 | Wojtowicz |
| 6,374,990 | B1 | 4/2002 | Swinderman |
| 6,374,991 | B1 | 4/2002 | Swinderman |
| 6,407,523 | B1 | 6/2002 | Allan |
| 6,439,373 | B1 | 8/2002 | Swinderman |
| 6,554,734 | B1 | 4/2003 | Maydew |
| 6,575,292 | B2 | 6/2003 | Swinderman |
| 6,585,108 | B2 | 7/2003 | Travis |
| 6,591,969 | B2 | 7/2003 | Swinderman |
| 6,624,604 | B2 | 9/2003 | Torikoshi |
| 6,792,321 | B2 | 9/2004 | Sepe, Jr. |
| 6,986,418 | B2 | 1/2006 | Swinderman |
| 6,988,610 | B2 | 1/2006 | Fromme |
| 7,051,862 | B1 | 5/2006 | Smith |
| 7,131,525 | B2 | 11/2006 | Swinderman |
| D543,670 | S | 5/2007 | Swinderman |
| 7,216,756 | B2 | 5/2007 | Swinderman |
| 7,222,726 | B2 | 5/2007 | Meade |
| D547,523 | S | 7/2007 | Swinderman |
| 7,415,236 | B2 | 8/2008 | Nakano |
| 7,441,647 | B2 | 10/2008 | Wiggins |
| 7,444,265 | B2 | 10/2008 | Havela |
| 7,472,784 | B2 | 1/2009 | Swinderman |
| 7,556,140 | B2 | 7/2009 | Swinderman |
| 7,669,708 | B2 | 3/2010 | Swinderman |
| 7,673,739 | B2 | 3/2010 | Freeman |
| 7,740,126 | B2 | 6/2010 | Swinderman |
| 7,740,127 | B2 | 6/2010 | Swinderman et al. |
| 7,775,341 | B2 | 8/2010 | Swinderman |
| 7,779,994 | B1 | 8/2010 | Travis |
| 7,866,457 | B2 | 1/2011 | Swinderman |
| 7,894,934 | B2 | 2/2011 | Wallace |
| 8,037,997 | B2 | 10/2011 | Swinderman |
| 8,069,971 | B2 | 12/2011 | Swinderman |
| 8,077,050 | B2 | 12/2011 | Smith |
| 8,205,741 | B2 | 6/2012 | Swinderman |
| 8,267,239 | B2 | 9/2012 | Swinderman |
| 8,312,987 | B2 | 11/2012 | Lynn |
| 9,376,263 | B2 | 6/2016 | Nancarrow |
| 9,731,906 | B2 | 8/2017 | Strathaus |
| 2003/0023333 | A1 | 1/2003 | Birkle |
| 2007/0029169 | A1 | 2/2007 | Swinderman |
| 2009/0078536 | A1 | 3/2009 | Swinderman |
| 2009/0294252 | A1 | 12/2009 | Swinderman |
| 2012/0031736 | A1 | 2/2012 | Swinderman |
| 2017/0174441 | A1 | 6/2017 | Strathaus |
| 2018/0287450 | A1 | 10/2018 | Alfano |
| 2020/0048011 | A1 | 2/2020 | Harrison |

FOREIGN PATENT DOCUMENTS

| | | |
|---|---|---|
| CN | 107265089 | 10/2017 |
| JP | H04148793 A | 5/1992 |
| WO | 9804898 | 2/1998 |
| WO | 2006058147 A1 | 6/2006 |
| WO | 2008027731 A2 | 3/2008 |
| WO | 2008027732 A2 | 3/2008 |
| WO | 2017020080 A1 | 2/2017 |
| WO | 2017108150 | 6/2017 |

OTHER PUBLICATIONS

Schulte Strathaus, Starclean® Automatic tensioning device type 830-E, publicly available at least as early as Feb. 9, 2018, two pages.
Notification of Transmittal of the International Search Report and Written Opinion of the International Searching Authority, or the Declaration form the International Bureau of WIPO for corresponding International Application No. PCT/US2018/867133, dated May 8, 2019, 14 pages.
Automated Tensioner for Conveyor Belt Cleaners; Powder & Bulk Solids (The Source for Dry Processing and Bulk Handling Technology); Apr. 7, 2017; 3 pgs.

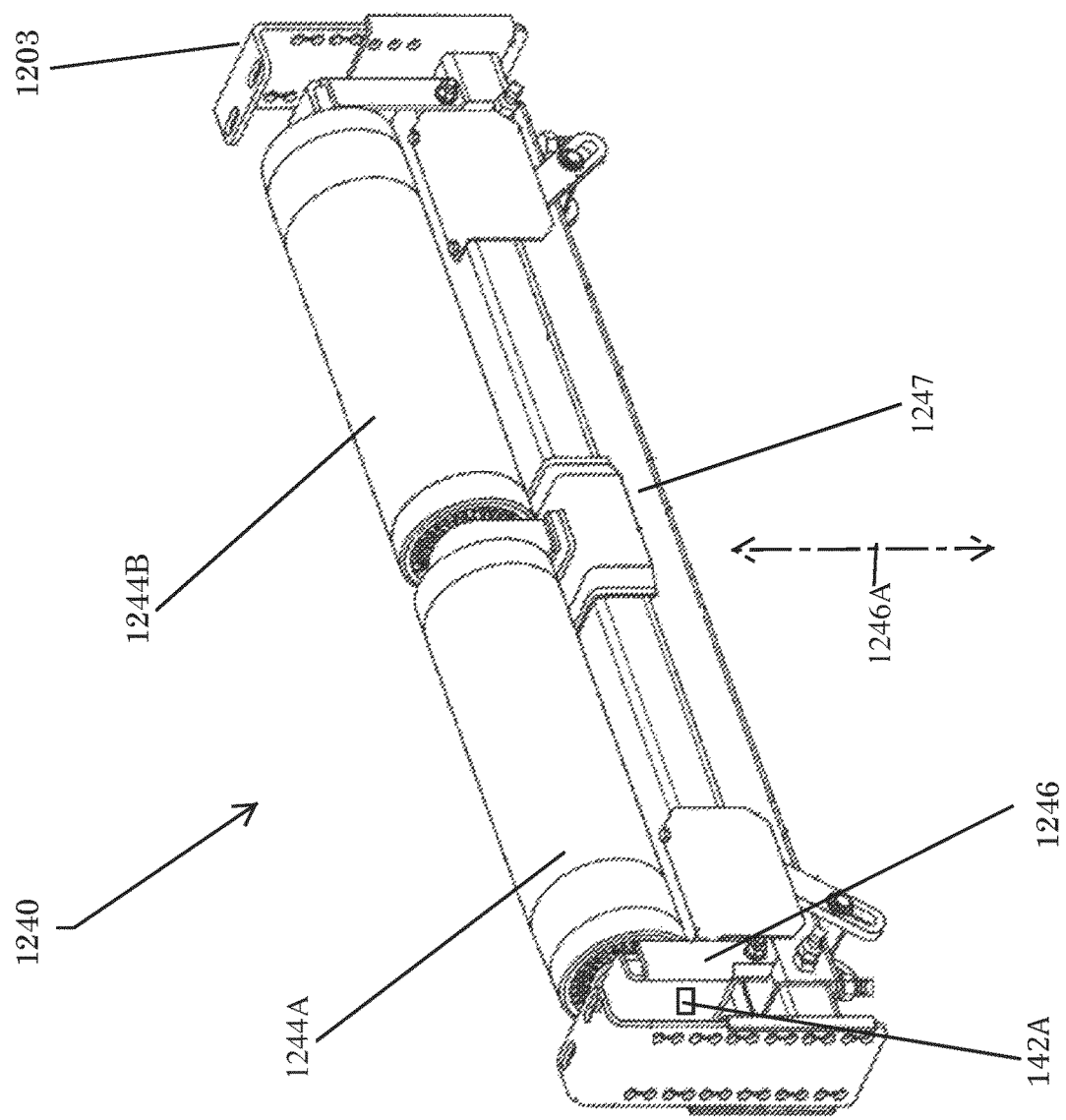

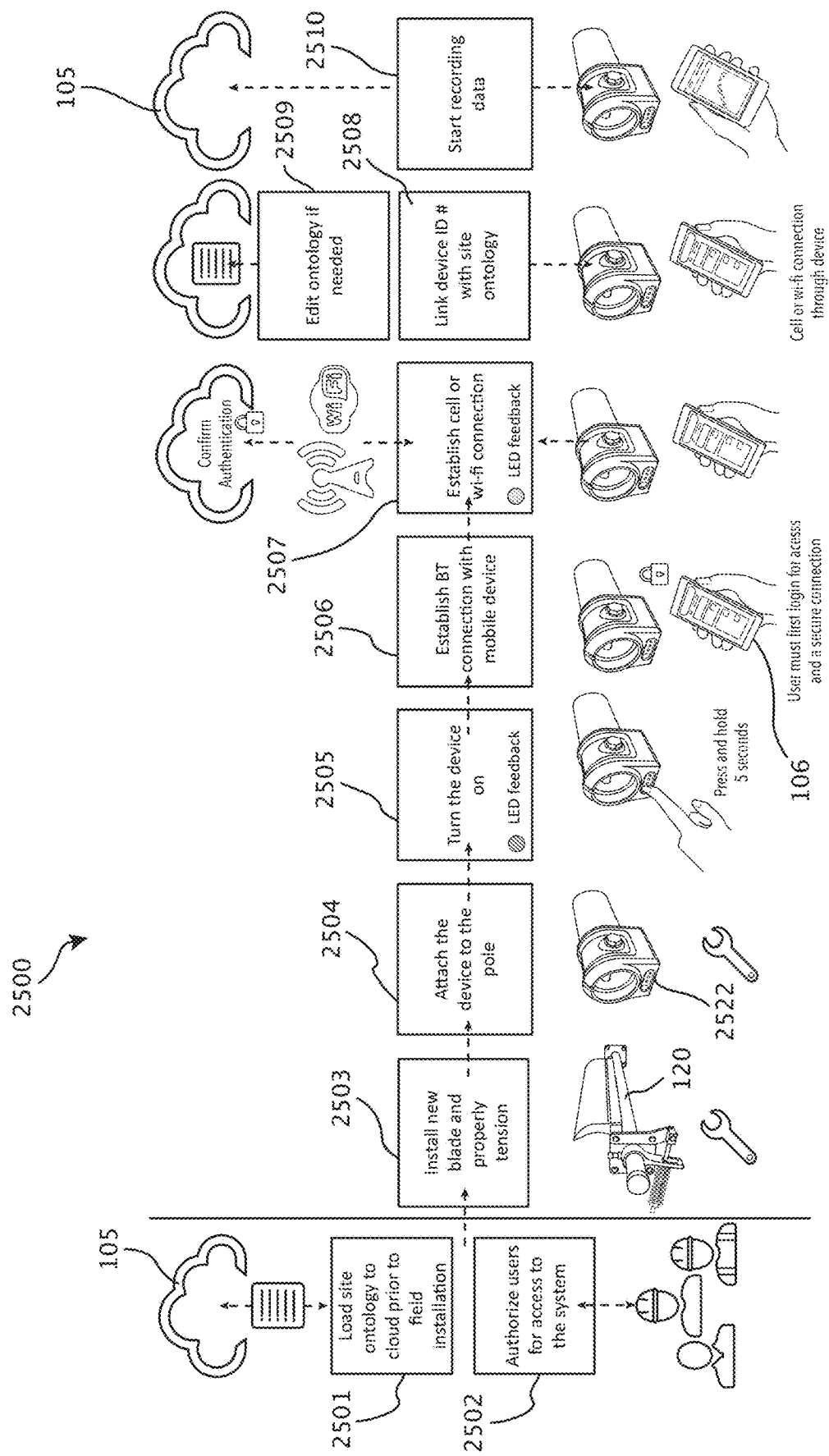

APPARATUS AND METHOD FOR MONITORING CONVEYOR SYSTEMS

CROSS-REFERENCE TO RELATED APPLICATIONS

This application claims benefit under 35 U.S.C. § 119(e) to U.S. Provisional Application No. 62/610,015, filed Dec. 22, 2017, and U.S. Provisional Application No. 62/733,367, filed Sep. 19, 2018, which are both hereby incorporated by reference herein in their entireties.

FIELD

This disclosure relates to conveyor systems and, more specifically, to monitoring components of a conveyor system.

BACKGROUND

Conveyor systems are utilized to transport materials or objects from one position to another. One type of conveyor system is a conveyor belt system which may include a series of rollers and a conveyor belt arranged to travel thereover in a downstream belt travel direction and path. Rollers include both drive rollers or pulleys and idler rollers. Drive rollers are connected to a power source, such as a drive motor, which rotates the drive roller and the drive roller in turn acts upon the conveyor belt. For example, a conveyor system may include a head roller, a driven tail roller, idler rollers intermediate the head and tail rollers, and a conveyor belt forming a loop around the rollers. The conveyor belt has a top run generally above the idler rollers and a return run generally below the idler rollers. The driven tail roller engages the conveyor belt and drives the conveyor belt top run in a longitudinal, downstream belt travel direction and path. The idler rollers contact and the bottom surface of the top run of the conveyor belt to support the weight of the material carried by the top surface of the top run of the conveyor belt. The idler rollers spin in response to the frictional engagement with the bottom surface of the top run of the conveyor belt and may include roller bearings to spin easily.

Conveyor belts may meander or mistrack laterally toward one side or the other of the rollers due to reasons such as uneven loads carried by the belt. Conveyor systems may include conveyor belt tracking devices that respond to belt mistracking by redirecting the belt back to the correct travel path of the belt which is substantially centered on the conveyor rollers. Some tracking devices comprise at least one roller along which the belt travels. The at least one roller is pivotal in response to belt mistracking so that the pivotal roller acts to redirect the conveyor belt back toward its correct travel path. Exemplary tracking devices are described in U.S. Pat. No. 8,556,068 and U.S. Patent Application Pub. No. 2016/0264358, which are both hereby incorporated by reference herein in their entireties.

Conveyor belt systems may be used to transport different conveyed materials such as coal or aggregate. During use, residue from the conveyed material can build up on a conveyor belt. The residue may include small particles and/or liquids that stick to the belt such that the residue remains in contact with the conveyor belt surface after the rest of the conveyed material is discharged from the belt. Conveyor belt cleaners may be used to remove this residue and debris. A conveyor belt cleaner may include one or more scraper blades mounted to an elongated support member, such as a support pole, extending laterally across the belt with the scraper blades biased into engagement with the surface of the conveyor belt. The scraper blade scrapes away the residue as the conveyor belt moves along the travel path. The ends of the pole extend beyond the lateral sides of the belt and are mounted to the structure supporting the conveyor belt via resilient mounting mechanisms that bias the pole and the scraper blade mounted thereto toward the belt so the scraper blades are in resilient engagement therewith. The resilient engagement permits scraper blades to deflect out of the way of irregularities in the conveyor belt such as a splice of a conveyor belt. The splice of the conveyor belt may include mechanical fasteners secured to ends of the conveyor belt that are intermeshed and joined together by a hinge pin. The splice may also include metallic fasteners that have fastener plates, rivets, and/or staples that extend above an outer surface of the belt and contact the scraper blades engaged with the belt with each rotation of the conveyor belt. Another type of conveyor belt splice is a solid plate fastener that joins the ends of the conveyor belt and extends across the conveyor belt. The solid plate fastener may also extend upwardly from the outer surface of the conveyor belt and impact the scraper blades engaged with the conveyor belt. The resilient engagement of the conveyor belt cleaner allows the scraper blades to deflect out of the way of the splice without the scraper blades damaging the mechanical fasteners.

Some conveyor belt systems are loaded by discharging the material to be conveyed onto the belt. For example, a conveyor system for conveying coal or aggregate includes an impact area or loading zone along the path of the conveyor belt in which coal or aggregate is discharged onto the conveyor belt. The discharging may involve the coal or aggregate dropping several feet or more before landing on the top surface of the top run of the conveyor belt. Impact beds support the bottom surface of the top run of the conveyor belt along these loading zones to absorb some of the impact from the material discharged thereon. Impact beds include platforms and/or bars that contact the top run bottom surface along the loading zone. The platforms and/or bars typically are formed of elastomeric material which allows the platforms and/or bars to resiliently deform when impacted. Impact beds may include raised sides so as to support the belt in a generally U-shaped configuration along the loading zone. This reduces spillage of material.

The components of a conveyor belt system may wear down over time or break down due to one or more components of the system breaking. For example, the scraper blades of a conveyor belt cleaner will wear down over time and may have less than the desired engagement with the conveyor belt. Current monitoring methods for scraper blades and idler rollers involves directly monitoring the condition of the scraper blade by embedding wires or sensors into the blade or idler roller.

SUMMARY

In accordance with one aspect of the present disclosure, an apparatus is provided that includes a conveyor belt system comprising a conveyor belt cleaner. The conveyor belt cleaner has an elongate support and a pair of mounts configured to position the elongate support to extend across a conveyor belt. The conveyor belt cleaner includes a cleaner blade configured to be operatively mounted to the elongate support and engage the conveyor belt. The apparatus further includes a sensor configured to detect at least one characteristic of the elongate support as the elongate support vibrates during conveyor belt operation. A processor of the apparatus is configured to use the at least one characteristic of the elongate support to predict at least one property of the conveyor belt system. In this manner, at least one property of a component of the conveyor belt system may be predicted by sensing vibrations of the elongate support rather than the component directly. This protects the sensor while providing desired information about the conveyor belt system.

In one embodiment, the apparatus includes a housing configured to be mounted to the elongate support and the sensor is in the housing. The housing permits the sensor to be mounted to an elongate support of an existing conveyor belt cleaner rather than requiring replacement of the conveyor belt cleaner. Further, because the housing is configured to be mounted to the elongate support, existing cleaner blades may continue to be used which simplifies installation.

In one embodiment, the elongate support includes a pair of opposite ends and an axis extending therebetween. The sensor is at one of the ends of the elongate support axially outward from one of the mounts. The material carried by the conveyor belt is carried along a path generally between the mounts of the conveyor belt cleaner. Because the sensor is axially outward from one of the mounts, the sensor is outside of the path of the material being handled by the conveyor belt. This protects the sensor by reducing the exposure of the sensor to particles such as dust and small rocks that may fall off of the conveyor belt. In some embodiments, the apparatus includes a communication interface configured to communicate, via a wireless network, the at least one characteristic to a remote computer including the processor. The sensor being axially outward from the one mount may reduce electromagnetic interference from the support structure of the conveyor belt system.

In accordance with another aspect of the present disclosure, a method is provided for monitoring a conveyor belt system. The conveyor belt system includes a conveyor belt and a conveyor belt cleaner having a cleaner blade configured to engage a conveyor belt. The conveyor belt cleaner includes an elongate support and a pair of mounts configured to position the elongate support to extend across the conveyor belt. The method includes detecting, using a sensor associated with the elongate support, at least one characteristic of the elongate support as the elongate support vibrates during operation of the conveyor belt. The method further includes using the at least one characteristic of the elongate support to predict at least one property of the conveyor belt system. In this manner, the at least one property of a component of the conveyor belt system may be predicted without having to measure the property at the component itself. Because some components of the conveyor belt system such as cleaner blades wear down and are periodically replaced, the method permits continued monitoring of the conveyor belt system despite replacement of the cleaner blades or other components of the conveyor belt system that may wear out over time.

The subject disclosure also provides an apparatus for monitoring a conveyor belt cleaner. The apparatus includes a housing, a mounting portion of the housing configured to be secured to a support pole of a conveyor belt cleaner, and a sensor in the housing configured to detect at least one characteristic of the support pole as the support pole vibrates during operation of the conveyor belt. Conveyor belt cleaner support poles are somewhat standardized in the industry and, because the mounting portion is configured to be secured to a support pole, the apparatus may be secured to different models of conveyor belt cleaners from a manufacturer or conveyor belt cleaners of different manufacturers. This improves the ease with which a user may install or service the apparatus on a conveyor belt cleaner.

The apparatus includes communication circuitry in the housing configured to communicate with a remote computer via a network. The apparatus further includes a processor in the housing that is operably coupled to the sensor and the communication circuitry. The processor is configured to cause the communication circuitry to communicate data associated with the at least one characteristic of the support pole to the remote computer. The communicated data may be used by the remote computer to monitor the conveyor belt cleaner, the conveyor belt, or a combination thereof. In one embodiment, the remote computer receives the data from the communication circuitry and uses the data to predict at least one property of the conveyor belt cleaner, the conveyor belt, or a combination thereof.

In accordance with another aspect, an apparatus is provided for connecting a sensor module to a support pole of a conveyor belt cleaner. The apparatus includes a body having an outer surface for receiving a sensor module and a mounting portion sized to fit in an opening of a support pole and extend along an inner surface of the support pole. The apparatus further includes an actuator operatively coupled to the mounting portion and movable to cause the mounting portion to engage the inner surface of the support pole. With the mounting portion secured to the support pole, the body of the apparatus vibrates with the support pole during operation of the conveyor belt. The sensor module may sense at least one characteristic of the body as the body vibrates with the support pole during conveyor belt operation. In this manner, the at least one characteristic of the body may be used to determine at least one property of the associated conveyor belt system when it is not practical to mount the sensor module directly to the support pole.

BRIEF DESCRIPTION OF THE DRAWINGS

FIG. 12 is a perspective view of another tracking device having a sensor, the tracking device being suitable for use in the conveyor system of FIG. 1A or FIG. 1C;

FIG. 25 is a flow diagram illustrating a setup method for the sensor of FIGS. 24A and 24B.

DETAILED DESCRIPTION

Figure 1A:
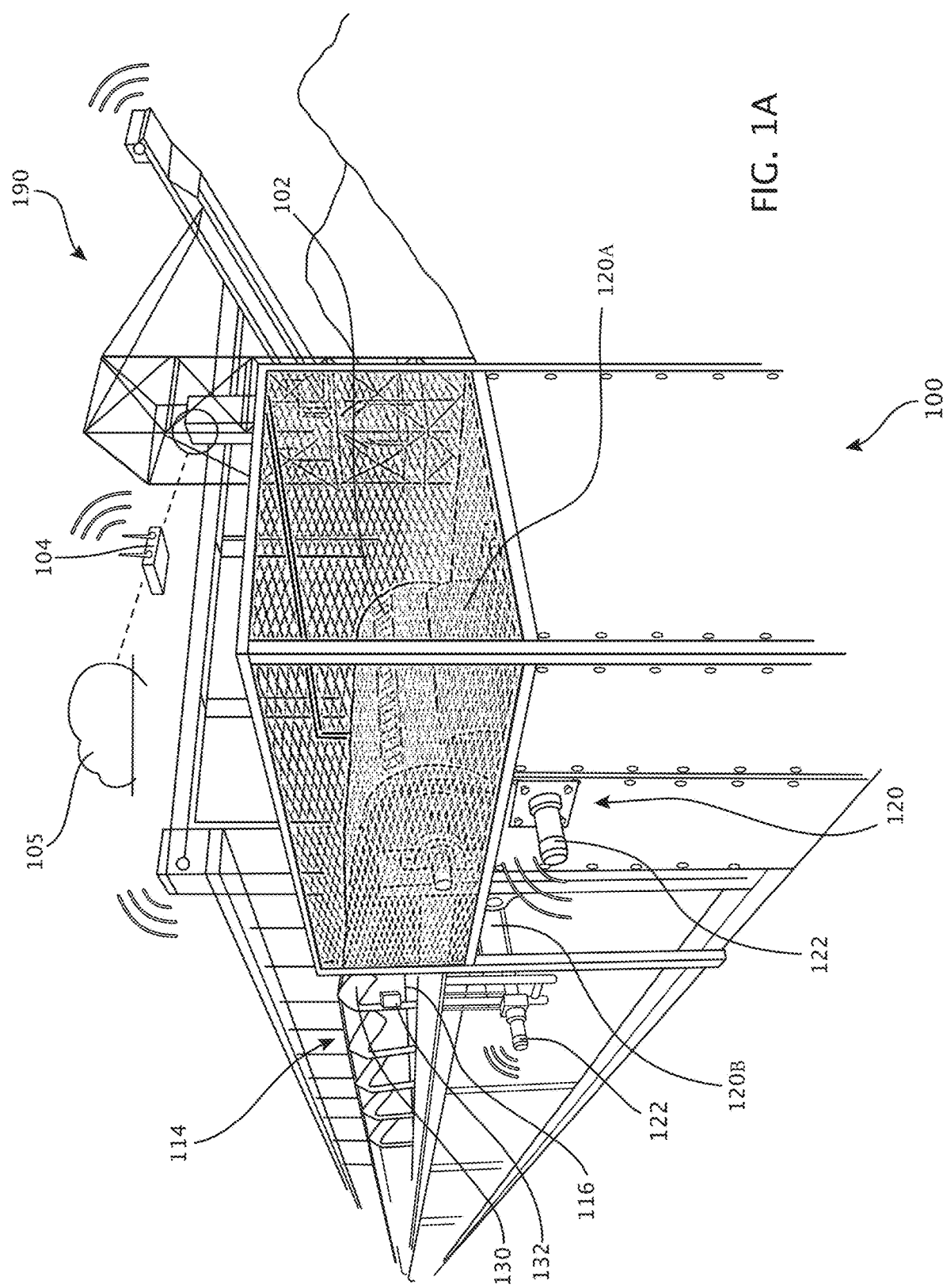
FIG. 1A is a perspective view of a conveyor system including a conveyor belt, conveyor belt cleaners, and sensors associated with the conveyor belt cleaners configured to transmit signals regarding properties of the belt cleaners over a wireless network.

In accordance with one aspect of the present disclosure, an apparatus is provided for monitoring a conveyor system. The apparatus may include one or more sensors associated with conveyor belts as well as ancillary devices of the conveyor system, such as idler rollers, cleaners, trackers, and/or impact beds. The one or more sensors may be associated with the ancillary devices in a number of approaches, such as being integrated with the ancillary devices, mounted to the ancillary devices, and/or mounted to frame members of the structure supporting the conveyor belt proximate the ancillary devices.

The ancillary devices may include portions with relatively short expected lifespans, or replaceable portions, and portions with relatively long expected lifespans, or permanent portions. Although referred to herein as being "permanent," the permanent portions may deteriorate over time and are capable of being replaced. The permanent portions have a longer predicted lifespan and are designed to outlast the "replaceable portions." For example, the replaceable portion of a belt cleaner may be the scraping blade of the belt cleaner and the permanent portion of the belt cleaner may be the housing or an elongated, rigid mounting structure, such as a base member or support pole, of the belt cleaner. As another example, the permanent portion is a portion of a frame of the conveyor system to which the ancillary devices are mounted.

The one or more sensors of the apparatus may be mounted to, integrated with, and/or proximate the permanent portion(s) of one or more ancillary devices. The sensors detect one or more characteristics of the ancillary device, such as acceleration. The acceleration may be due to, for example, jarring impacts against a portion of the ancillary device such as a splice impacting a scraper blade of a conveyor belt cleaner. The sensors may also detect one or more characteristics of a conveyor belt, such as by using an optical sensor to detect carry-back on a return run of the conveyor belt. The sensors may also detect sound. Sound can be used to detect if the belt is running, and specific sounds can be monitored for which may indicate debris on the belt, an impact with a cleaner, or a failed bearing in one of the rollers. The sensors may also detect one or more ambient conditions, such as temperature and humidity. The sensors may also detect the temperature of one or more components of the ancillary device.

The apparatus may include a processor and the measured data corresponding to the detected one or more characteristics is transmitted to the processor. The processor identifies fault conditions, such as a worn out or broken ancillary device, in the conveyor system based on the measured data. In one form, the processor is a local processor directly connected to the sensor. In another form, the processor is a remote computing device that receives the data from one or more sensor module over a wired and/or wireless communication network. In some forms, each sensor module communicates directly with a communication hub, such as a router. In another form, the sensor modules form a mesh network, in which a first sensor module acts as a communication relay for a second sensor module, the second sensor module acts as a communication relay for a third sensor module, and so on. The ability of the sensor modules to operate as communication relays allows sensor modules that would have difficulty directly communicating with a communication hub of the system to still provide data to the processor. For example, the communication hub may be positioned at the beginning of an underground mine. The first sensor module is closest to the communication hub while the second and third sensor modules are progressively farther into the mine. Although the second and third sensor modules may be unable to communicate directly with the communication hub due to interference from the rock of the mine, data from the third sensor module may be relayed by the second sensor module to the first sensor module which in turn relays the information to the communication hub. Likewise, the data from the second sensor module may be relayed by the first sensor module to the communication hub. In other forms, one or more of the sensor modules include a cellular communication card, such as a Global System for Mobile Communications ("GSM") card and communicate via a cellular network.

In one approach, the processor identifies a fault condition by comparing the measured data to a minimum threshold value, a maximum threshold value, or to an acceptable range of values. For example, data from an accelerometer detecting acceleration of an idler roller is compared to a maximum threshold value. If the acceleration exceeds the maximum threshold value, the processor identifies a fault because the high acceleration may indicate that the idler is not rotating or some condition or set of conditions is causing the conveyor belt to vibrate proximate the idler roller. In another example, the processor receives data from an accelerometer configured to measure acceleration of a conveyor belt cleaner and compares the acceleration values to an acceptable range of acceleration values. If the measured acceleration values are too low, the processor may identify a fault condition because the low acceleration values may be the result of the scraper blade of the conveyor belt cleaner not engaging the conveyor belt. If the measured acceleration values are too high, the processor may identify a fault condition because the high acceleration values may be the result of the scraper blade riding along the residue on the conveyor belt instead of scraping the residue off, for example if the blade has become too worn.

In one form, the processor monitors data outputs from the one or more sensors over a period of time to identify trends that may indicate a fault in the conveyor system. For example, the processor may use data from an accelerometer detecting acceleration of a tracker to identify the frequency of corrective actions undertaken by the tracker. If the processor determines the frequency of corrective actions exceeds a threshold value, the processor identifies a fault condition because the frequency of corrective actions may indicate that some condition or set of conditions is causing the conveyor belt to continuously drift in one direction. In one form, the apparatus includes a memory configured to store data outputs from the one or more sensors. The processor is operatively coupled to the memory and may retrieve information regarding the sensor data outputs from the memory such as to determine historical trends in the sensor data outputs.

The apparatus may also include a user interface operatively coupled to the processor and configured for displaying identified fault conditions to a user. In some forms, the user interface is a remote computing device usable remote from the monitored conveyor belt system. The processor may include a local computer in the facility containing the monitored conveyor belt system and the user interface may include a remote computing device operated by a user. For example, the user interface may include a personal computer, laptop computer, smartphone, or a tablet computer. If the user interface is a portable device such as a smartphone or tablet computer, the local computer may transmit an alert such as an email or a notification to the portable device in the event of a failure condition.

Figure 1B:
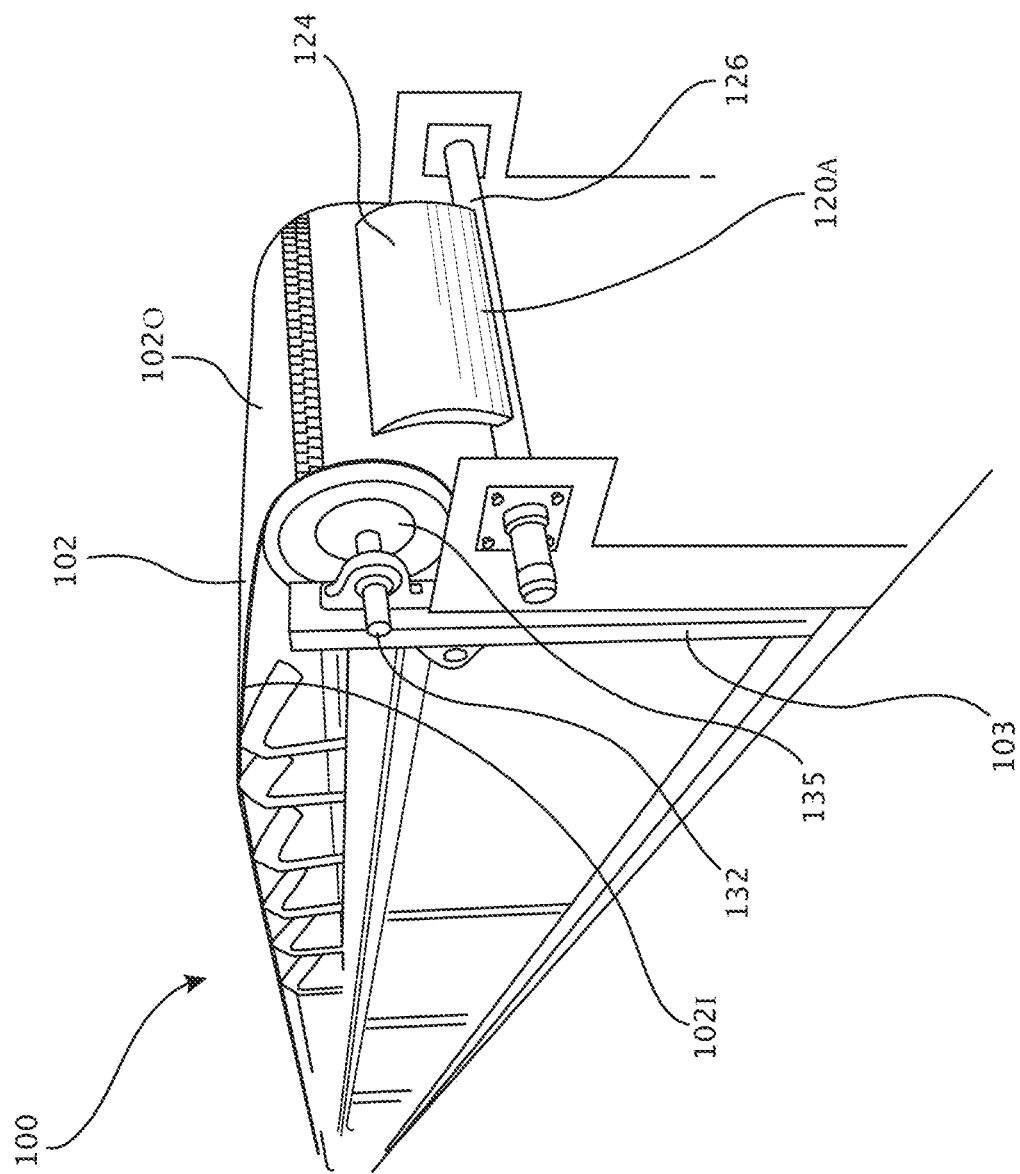
FIG. 1B is a perspective view of the conveyor belt and one of the conveyor belt cleaners of the conveyor system of FIG. 1A.
Figure 1C:
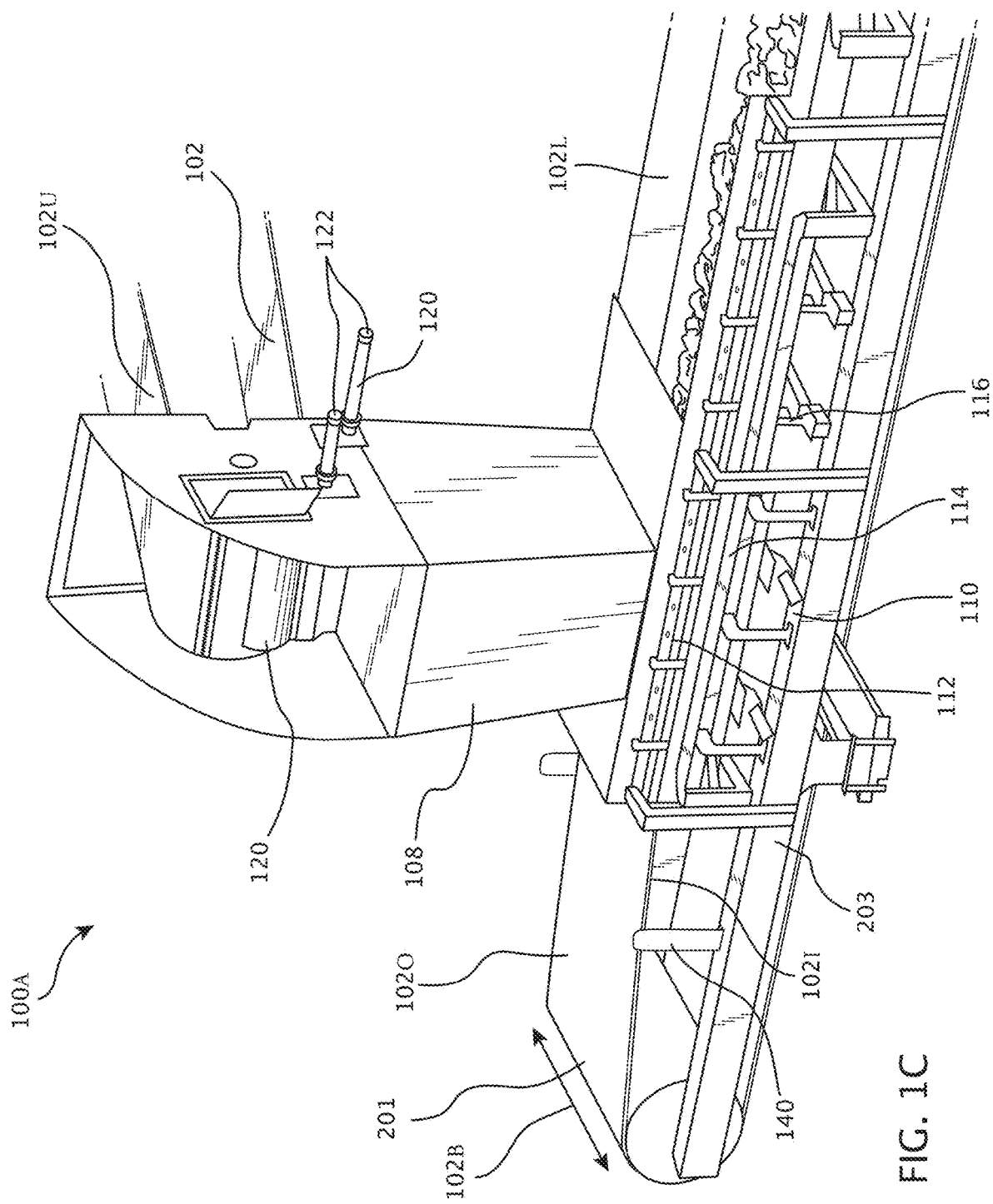
FIG. 1C is a perspective view of another conveyor system including an upper conveyor system having conveyor belt cleaners, a lower conveyor system having an impact bed, and a transfer chute system for guiding discharged material from the upper conveyor system onto a loading zone of the lower conveyor system at the impact bed.

With reference to FIGS. 1A, 1B, and 1C, conveyor systems 100, 100A are provided that include conveyor belts 102 and a number of ancillary devices, such as impact beds 110, belt cleaners 120, idler rollers 130, drive rollers 135, and trackers 140. The conveyor systems 100, 100A may be components of a larger conveyor system, may be separate systems at a common location, or separate systems at separate locations as some examples. Regarding FIG. 3, the conveyor systems 100, 100A include a monitoring system 10 for monitoring one or more characteristics of one or more components of the conveyor systems 100, 100A. The monitoring system 10 includes sensor modules 112, 122, 132, 142 positioned at one or more components of the conveyor systems 100, 100A. The sensor modules 112, 122, 132, 142 each include one or more sensors and a communication module. The sensor modules 112, 122, 132, 142 are configured to detect one or more conditions of the one or more components based on, for example, movements of components or portions thereof. The monitoring system 10 includes a remote resource, such as cloud computing system 105, that processes data from the sensor modules 112, 122, 132, 142 to determine one or more characteristics of the corresponding ancillary devices and conveyor belt 102 and/or to predict properties of the ancillary devices and conveyor belt 102 such as the remaining lifespan thereof. The cloud computing system 105 is operable to predict other properties of the conveyor system 100, such as whether the belt is running, how long the belt has been running, whether the ancillary device is properly engaged with the belt 102, the amount of carryback, and the presence or absence of material on the belt 102. The cloud computing system 105 may include one or more remote servers providing cloud computing functionality.

Figure 3:
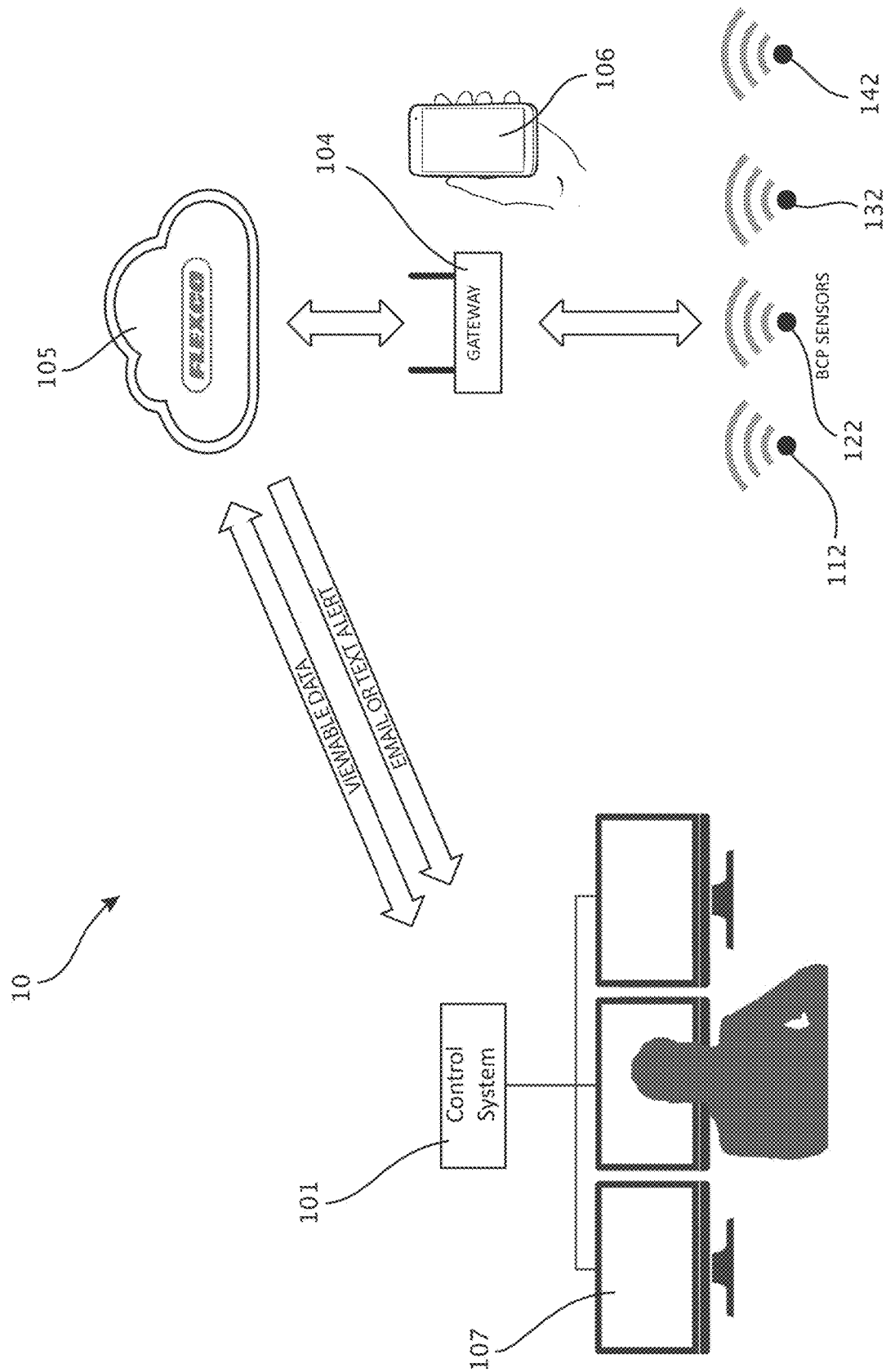
FIG. 3 is a network diagram illustrating the wireless communication of sensors of the conveyor system of FIG. 1A with a control system by way of a wireless gateway and a cloud computing system.

The sensor modules 112, 122, 132, 142 communicate with the cloud computing system 105 by way of a gateway 104. The gateway 104 is an internet router or cellular tower which connects the sensor modules 112, 122, 132, 142 to the internet. Information from the cloud is viewed by a user through a computer 107 (see FIG. 3) or smartphone 106. The computer 107 is part of a control system 101, such as a computer configured to control the conveyor system 100. Although a desktop computer 107 and a smartphone 106 are shown in FIG. 3, other computing devices may be utilized such as a laptop computer, a tablet computer, a smartwatch, and augmented reality glasses.

With reference to FIGS. 1A and 1B, the idler rollers 130 and drive rollers 135 of the system 100 are rotatably coupled to a frame 103. The conveyor belt 102 is a continuous belt extending around the plurality of idler rollers 120 and drive rollers 135 such that the conveyor belt 102 travels relative to the frame 103 along a path. The belt cleaners 120 each include a cleaner blade such as a plurality of scraper blades 124 that are biased into engagement with the outer surface 1020 of the belt 102. The belt cleaners 120 include a pre-cleaner or primary belt cleaner 120A and a secondary belt cleaner 120B. The primary belt cleaner 120A is positioned at the head or drive pulley 135 so as to remove material from the belt 102 and assist discharging the material from the conveyor belt 102. The secondary belt cleaner 120B is positioned along the return run of the conveyor belt 102 to provide additional cleaning of the conveyor belt 102 and limit "carry-back" of material. In other words, the secondary belt cleaner 120B ensures the material is discharged from the conveyor belt 102 rather than traveling back to a tail drive roller 135 of the conveyor belt 102.

In some forms, the primary belt cleaner 120A is configured to be rotated into engagement with the belt 102. In some forms, the secondary belt cleaner 120B is configured to move vertically, in a linear direction substantially normal to the surface of the belt 102, into engagement with the belt 102.

Figure 16A:
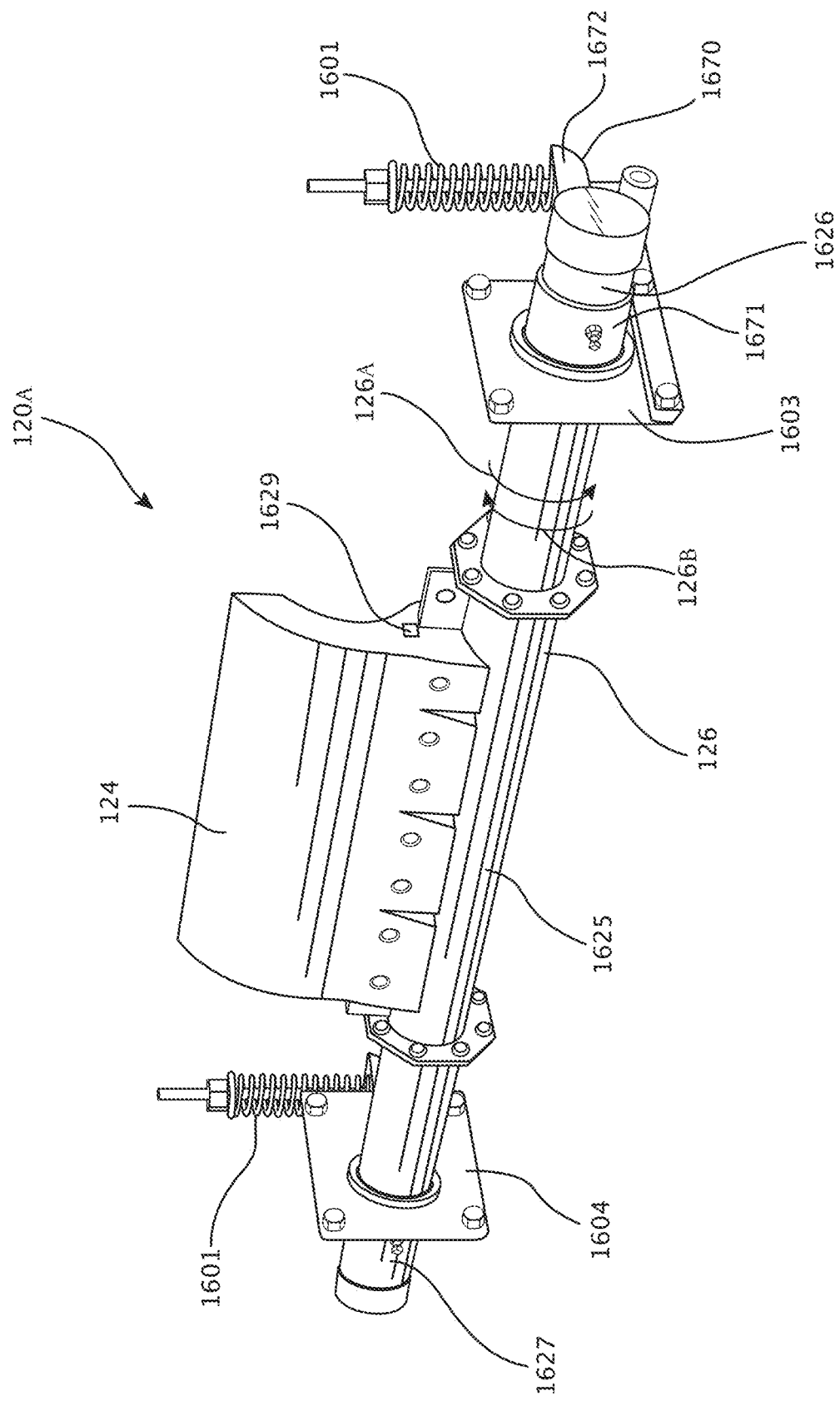
FIG. 16A is a perspective view of a primary belt cleaner of the conveyor system of FIG. 1A.

An example of the primary belt cleaner 120A is provided in FIG. 16A. The belt cleaner 120A includes one or more scraper blades 124 mounted to an elongate support such as a support pole 126. The scraper blade 124 can be made of a variety of materials, such as steel, carbide, or urethane. The scraper blade 124 may be a scraper blade assembly having a resilient body portion, such as an elastomeric or polymeric body portion, and a hard blade tip, such as a carbide tip. Each scraper blade assembly may also include a base, such as U-shaped metallic bracket, which is bolted to the support pole 126. The body portion resiliently biases the scraper blade against the conveyor belt and resiliently deforms to permit the scraper blade to deflect out of the way of an imperfection of the conveyor belt 102 such as fastener on the belt. The support pole 126 includes end portions 1626, 1627 that are connected to mounts 1603, 1604 and an intermediate portion 1625 that is releasably connected to the end portions 1626, 1627. The releasable connection permits the intermediate portion 1625 and the scraper blades 124 connected thereto to be easily removed for maintenance. The mounts 1603, 1604 are configured to be secured to the frame 103 of the conveyor belt 102, such as by welding or fasteners.

The mounts 1626, 1627 permit controlled turning of the support pole 126 in directions 126A, 126B. The mounts 1603, 1604 each include a tension bracket 1670 having a collar 1671 secured to the support pole 126 and a spring 1601. The spring 1601 resiliently biases the scraper blades 124 against the conveyer belt 120. The mounts 1603, 1604 permit the support pole 126 to turn in direction 126A in response to an impact against the scraper blades 124, such as a fastener of the conveyor belt 102 striking the scraper blades 124. Turning of the support pole 126 in direction 126A causes the tension bracket 1670 to compress the spring 1601. The compressed spring 1601 then urges the tension bracket 1670 back toward its initial position which moves the scraper blades 124 back into engagement with the conveyor belt 102.

In some forms, the scraper blades 1624 include a communication circuit for communicating with the sensor module 122, such as an RFID chip 1629. Regarding FIG. 2B, the sensor module 122 includes a sensor circuit 123 having an RFID reader such as RFID sensor 1803 (see FIG. 18) that identifies the one or more scraper blades 124 by reading the RFID chip 1629 of the one or more scraper blades 124. In one form, the RFID chip 1629 (see FIG. 16A) is a near field chip or non-powered chip. The RFID reader 127 creates a magnetic field which induces a current in the RFID chip 1629. The induced current is used to transmit a code. In some forms, the control system 101 uses identifying information about the scraper blades 124, such as the model of the scraper blades 124 and/or material the scraper blades 124 are formed of, in the analysis of the data from the sensor module 122. For example, a carbide scraper blade may be expected to vibrate more in standard use than a urethane scraper blade. Alternatively or additionally, the sensing of the RFID chip 1629 is used to detect the presence of a scraper blade 1624. If no RFID chip 1629 is detected, the sensor module 122 transmits a signal to the control system 101 indicating that no scraper blade 124 is present. Still further, the control system 101 may be configured to determine whether the incorrect scraper blade 1624 is installed based on the reading of the RFID chip 1629.

Figure 16B:
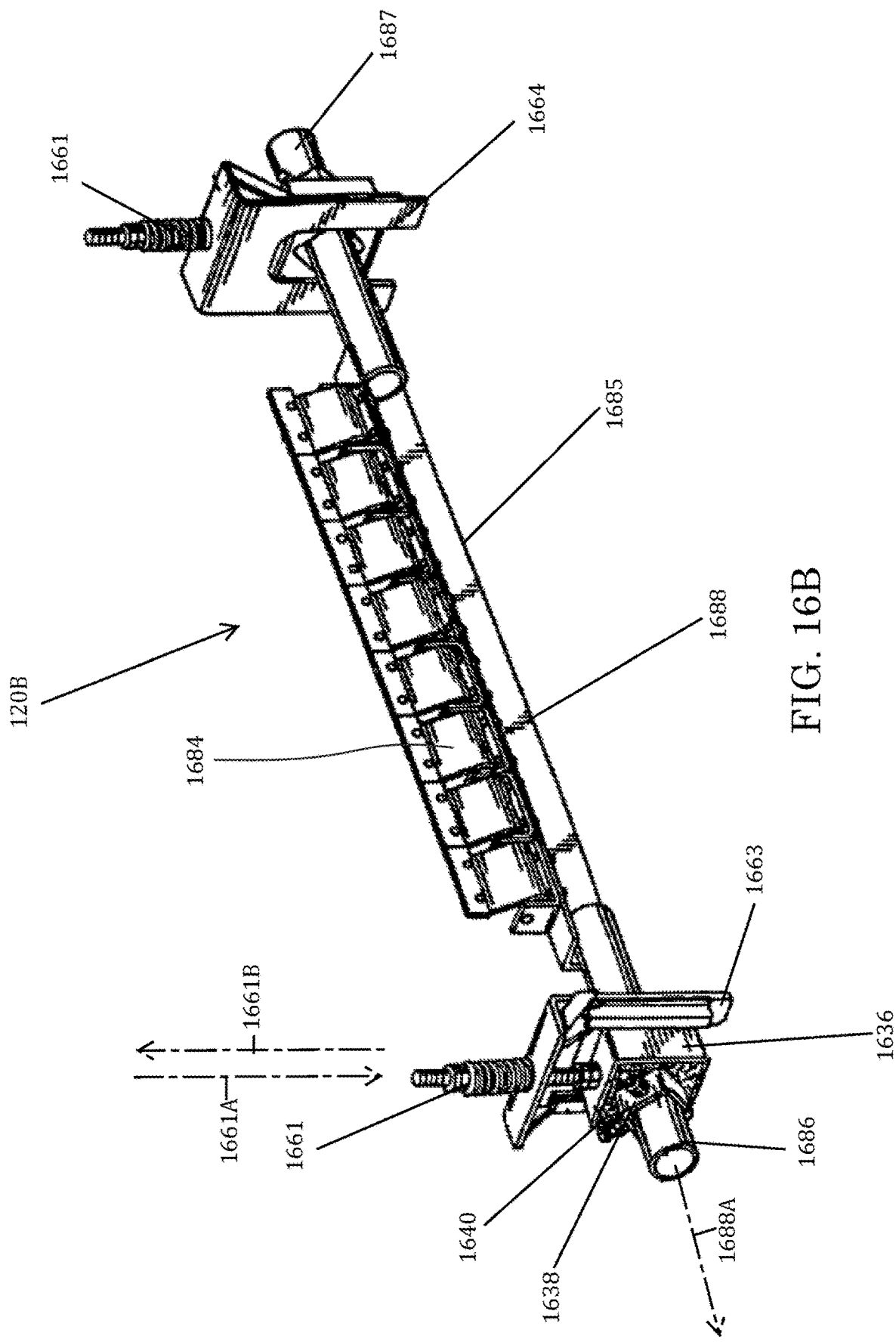
FIG. 16B is a perspective view of a secondary belt cleaner of the conveyor system of FIG. 1A.

An example of the secondary belt cleaner 120B is shown in FIG. 16B. The belt cleaner 120B includes one or more scraper blades 1684 mounted to an elongate support, such as the support pole 1688. The scraper blades 1684 can be made of a variety of materials, such as steel, carbide, or urethane. The support pole 1688 includes end portions 1686, 1687 that are connected to mounts 1663, 1664 and an intermediate portion 1685 that is connected to the end portions 1686, 1687. The scraper blades 1684 are releasably connected to the intermediate portion 1685, allowing the scraper blades 1684 to be easily removed for maintenance. The mounts 1663, 1664 are configured to be secured to the frame 103 of the conveyor belt 102, such as by welding or fasteners.

The mounts 1663, 1664 permit controlled linear movement of the support pole 1688 in directions 1661A and 1661B. A pair of springs 1661 urge the support pole 1688 and thus the scraper blades 1684 toward the belt 102 in direction 1661B. The mounts 1663, 1664 permit the support pole 1688 to move in direction 1661A in response to an impact against the scraper blades 1684, such as a damaged fastener of the conveyor belt 102 striking the scraper blades 1684. Movement of the support pole 1688 in direction 1661A causes compression of the springs 1661. The compressed springs 1661 then urge the support pole 1688 in the direction 1661B back into engagement with the belt 102. As described below, one or more sensor modules 122 can be coupled to the support pole 1688 to detect movement of the scraper blades 124. Other belt cleaners are described in U.S. Pat. Nos. 7,093,706; 7,347,315; 8,757,360; and 9,586,765 which all are hereby incorporated by reference in their entireties.

The mounts 1663, 1664 include square-shaped housings 1636 and sleeve members 1638 which permit controlled turning of the support pole 1688 about a longitudinal axis 1688A of the support pole 1688. The end portions 1686, 1687 extend through the square-shaped housings 1636 and are secured to the sleeve members 1638. A resilient material 1640 is positioned between the inner walls of the rectangular housing 1636 and the outer walls of the sleeve members 1638. In operation, friction between the scraper blades 124 and the belt 102 turns the support pole 1688. The resilient material 1640 resists the turning and biases the sleeve members 1638 back toward the illustrated position so as to maintain engagement between the scraper blades 1684 and belt 102.

Returning to FIG. 1C, the conveyor system 100A has two belts 102 including an upper belt 102U and a lower belt 102L. The upper belt 102U is cleaned by belt cleaners 120 having sensor modules 122. Material conveyed by the upper belt 102U is discharged into a chute 108. The chute 108 guides the discharged material onto a loading zone of the lower belt 102L. The lower belt 102L is supported at the loading zone by an impact bed 110.

The scrapers 120, impact bed 110, and other ancillary devices are supported by a frame 203 of the conveyor system 100A and engage the belt 102. In one form, the sensor modules 112, 122, 132, and/or 142 are coupled to the frame 103 proximate to the coupling of the frame 103 and the corresponding ancillary device. Movement of portions of the ancillary devices causes the frame 103 to vibrate, and the sensor modules 112, 122, 132, and/or 142 measure this vibration.

Regarding FIG. 1A, the conveyor system 100 further includes a communication hub 104, such as a wireless router, which wirelessly communicates with a plurality of sensor modules 112, 122, 132, and 142. The wireless communication between the sensor modules 112, 122, 132, and 142 and communication hub 104 may utilize any of a variety of communication protocols. For example, the sensor modules 112, 122, 132, 142 may use infrastructure protocols such as 6LowPAN, IPv4/Ipv6, RPL, QUIC, Aeron, uIP, DTLS, ROLL/RPL, NanoIP, CNN, and TSMP; identification protocols such as EPC, uCode, Ipv6, and URIs; communication/transport protocols such as Wifi, Bluetooth®, DigiMesh, ANT, NFC, WirelessHart, IEEE 802.15.4, Zigbee, EnOcean, WiMax, and LPWAN; discovery protocols such as Physical Web, mDNS, HyperCat, UpnP, and DNS-SD; Data protocols such as MQTT, MQTT-SN, Mosquitto, IMB MessageSight, STOMP, XMPP, XMPP-IoT, CoAP, AMQP, Websocket and Node; device management protocols such as TR-069 and OMA-DM; semantic JSON-LD and Web Thing Model; and/or multi-layer frame work protocols such as Alljoyn, IoTivity, Weave, and Homekit.

In some forms, the communication hub 104 communicates with an external data processing system, such as a cloud-based computing system 105 as shown in FIG. 1A. The cloud-based computing system 105 may store communicated data and/or process the communicated data and relay data back to the communication hub 104 or another computer system for further processing or storage. For example, the cloud-based computing system 105 may include one or more data processing applications configured to run on a virtual machine in the cloud-based computing system 105 and process the data communicated to the cloud-based computing system 105 by the communication hub 104. Alternatively or additionally, the communication hub 104 transmits data from the sensor modules 112, 122, 132, and 142 to one or more onsite computers such as a control room computer or portable computers, e.g., smartphones or tablets, carried by users of the conveyor system 100. The sensor modules 112, 122, 132, and 142 may also transmit data directly to the one or more onsite computers using one or more communication protocols such as those listed above. Furthermore, the sensor modules 112, 122, 132, 142 may transmit data between each other or other sensors before communicating data to the one or more on-site computers, the communication hub 104, and/or the cloud-based computing system 105. The communication hub 104 may use the same protocols or different protocols when communicating with the cloud-based computing system 105, an on-site computer, or another external device.

Figure 18:
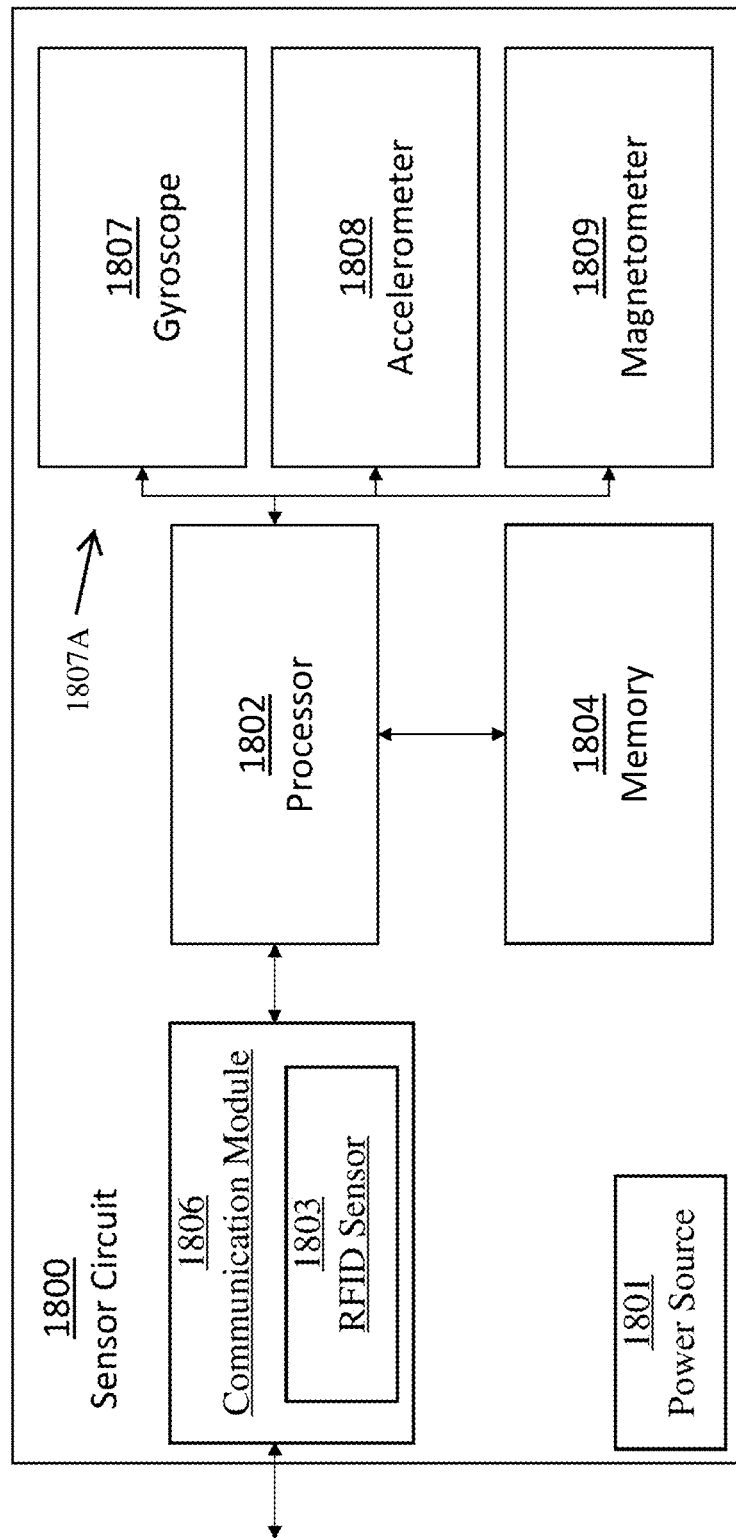
FIG. 18 is a block diagram of a sensor circuit of a sensor module that includes sensors for detecting movement.

FIG. 18 illustrates a sensor circuit 1800 that may be utilized as part of the sensor modules 112, 122, 132, and 142 described above. The sensor circuit 1800 includes a processor 1802 communicatively coupled to a memory 1804, a communication module 1806, and one or more sensors 1807A. The memory unit 1804 is non-transitory computer readable memory, such as random access memory (RAM), solid state memory, or magnetic disc-based memory.

A power source 1801, such as a direct electric connection (e.g., a wired connection) and/or a battery, powers the processor 1802, memory 1804, communication module 1806 and sensors 1807A. The sensor modules 112, 122, 132, and 142 may be configured to run on the battery if the direct electric connection is disconnected and transmit an alert indicating that the direct electric connection has been disconnected. In some forms, the power source 1801 includes a charger or generator that includes one or more inertial damping mechanisms such as a flywheel, pendulum, shock absorber, or rotary damper capable of converting kinetic energy to electric energy and charging the battery. For example, as the sensor modules 112, 122, 132, and 142 vibrate due to operation of the conveyor system 100, 100A, the batteries of the sensors 1807A are charged.

In one form, the one or more sensors 1807A include a gyroscope 1807, an accelerometer 1808, and a magnetometer 1809. The sensors 1807A detect movement of the corresponding ancillary device. Data representing the detected movement is transmitted to the processor 1802. The processor 1802 writes the received data to the memory 1804. Additionally or alternatively, the processor 1802 operates the communication module 1806 to wirelessly transmit the data representative of the detected movement to an external device using one or more of the standards listed above.

The sensor modules 112, 122, 132, and 142 may include, for example, digital or analog accelerometers 1808 having one, two, or three axes; digital or analog gyroscopes 1807 having one, two, or three axes; and/or a magnetometer 1809 such as a MEMS magnetic field sensor. As such the sensor modules 112, 122, 132, and 142 may have three, six, or nine axes of sensing. The accelerometers may be configured to measure one or more static or dynamic forces being applied to ancillary devices 110, 120, and 130 of a conveyor belt system. The gyroscopes may be used to determine the number and rate of rotation of portions of the ancillary devices 110, 120, and 130, such as turning of the support pole 126 (see FIG. 16A) in directions 126A, 126B in space. The magnetometer may provide absolute angular measurements of portions of the ancillary devices 110, 120, and 130, such as turning of the support pole 126 in direction 126A, 126B relative to the earth's magnetic field. The sensor modules 112, 122, 132, and 142 may further include a processor for processing sensed data, one or more memories for storing and processing sensed data, and one or more communication modules for communicating with various external devices. The one or more communications modules may communicate with the external devices using one or more of the protocols listed above.

In one form, the memory unit 1804 stores routines for processing the data output by the sensors 1807, 1808, and 1809. The processor 1802 runs the stored routines to process the data. The results of the routines are transmitted by the communication module 1806.

Figure 19:
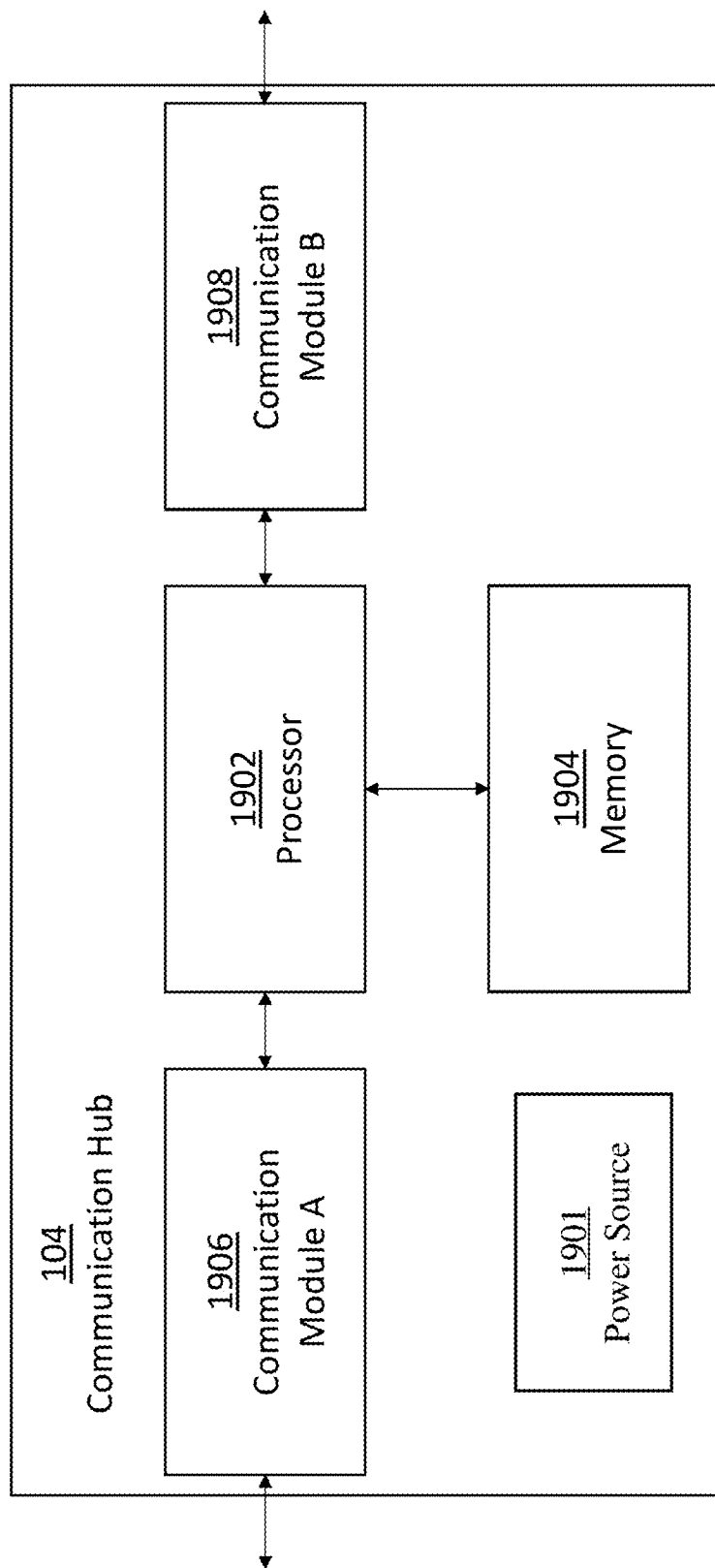
FIG. 19 is a block diagram of a communication hub for communicating with the sensor circuit of FIG. 18.

In one form, the communication module 1806 transmits the data to the communication hub 104 (see FIG. 1A) via a wired or wireless connection. Turning to FIG. 19, the communication hub 104 includes a processor 1902, a memory 1904, a first communication module 1906 and a second communication module 1908. The first communication module 1906 communicates using the same communication protocol as the communication module 1806. The first communication module 1906 receives the data from the communication modules 1806 of multiple local sensor circuits 1800. The received data is transmitted from the first communication module 1906 to the processor 1902.

The processor 1902 operates the second communication module 1908 to transmit the received data to a remote resource. In one form, the remote resource is a remote onsite computer. In another form, the remote resource is offsite, for example a cloud-based server system. The data is then processed and/or displayed as described below.

Figure 22:
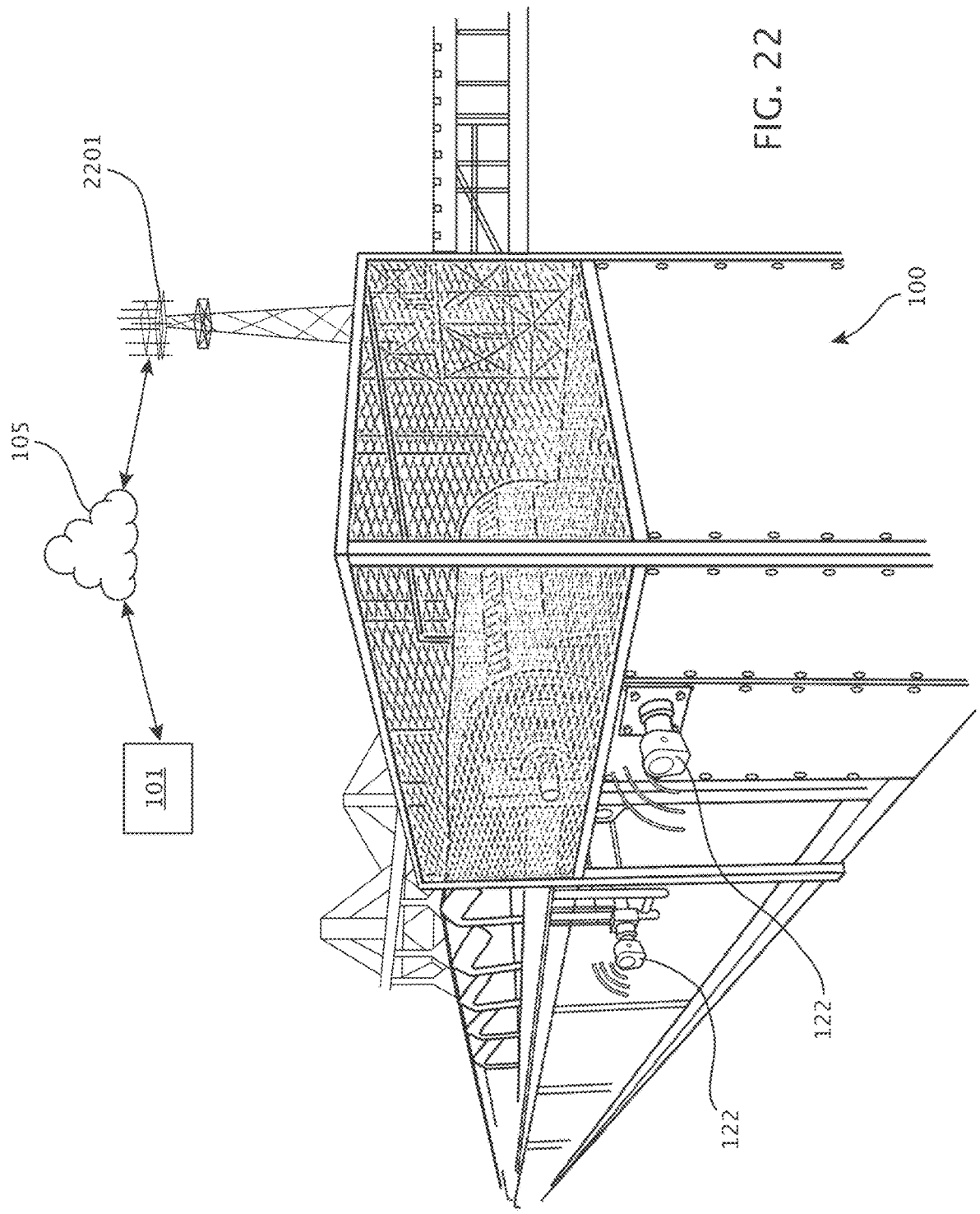
FIG. 22 is a perspective view of the conveyor system of FIG. 1A wherein the sensor modules communicate over a cellular communication network.

In one form, the communication module 1806 is a cellular communication module. The communication module 1806 is configured to communicate over a standard cellular communication protocol, such as GSM. FIG. 22 illustrates the conveyor system 100 in which the sensor modules 122 include cellular communication modules 1806. The sensor modules 122 communicate with the central control system 101 over the internet 105 by way of a cellular phone tower 2201. In some forms, the communication module 1806 is configured to communicate over a low-power wide-area network, such as LTE CAT-M1 or NB-IoT. The communication module 1806 includes a fallback communication protocol, such as 2G cellular communications.

In one form, the communication module 1806 of the sensor circuit 1800 includes the RFID sensor 1803. The RFID sensor 1803 is configured to detect nearby RFID chips. RFID chips can be coupled to the replaceable portions of the ancillary devices 110, 120, 130, and 140. The RFID sensor 1803 detects the presence of the replaceable portion by detecting the RFID chip. Alternatively or additionally, the RFID sensor 1803 receives identifying information from the RFID chip. For example, the RFID sensor 1803 may detect the RFID chip 1629 described above to identify the model number of the scraper blade 1624. The processor 1802 or the central control system 101 uses the identifying information to select the stored values to which the data from the sensors 1807A are compared.

In some forms, the RFID sensor 1803 only detects for RFID chips at specific times, such as when a button on the sensor module 122 is pressed. This reduces the amount of power used by the RFID sensor 1803 in comparison to if the RFID sensor 1803 were constantly scanning. In operation, a user presses the button when the new wear component or replaceable component is installed so that the RFID sensor 1803 is powered and detects the RFID chip. The RFID sensor 1803 may also periodically operate to detect the RFID chip so that the control system 101 can determine whether the replaceable component is still present in the ancillary device.

The sensor modules 112, 122, 132, and 142 may be configured to sense data continuously but only transmit a portion of the data in order to reduce the amount of data that needs to be processed. For example, the sensor module 122 includes the accelerometer 1808 and may sample the sensed data every second and transmit the sampled data to the cloud-based computing system 105 for processing. Sampling data at a fixed interval allows system users to control their data costs. However, at times, additional samples may be utilized to confirm one of more of the various fault conditions discussed in detail below. In this case, the cloud based computing system 105, or another external device such as a computer, may temporarily increase the sampling rate of a particular sensor module 112, 122, 132, 142 in order to confirm a fault condition exists. Generally, the sampling rate of the sensor modules 112, 122, 132, and 142 may be increased or decreased as desired for particular situations. In some forms, the sensor modules 112, 122, 132, and 142 maintain a consistent sampling rate for sensors 1807A contained therein, such as thirty samples per second, but internally process the data to reduce the amount of data being transmitted by the sensor modules 112, 122, 132, and 142. For example, the detected values may be averaged together over a period of time to obtain a single value for that period of time. Another approach is to utilize a fast Fourier transform to reduce the number and/or complexity of the detected values.

Each of the ancillary devices 110, 120, 130, 140 include a more permanent portion, such as a frame or body, and a replaceable portion usually configured to engage the conveyor belt 102. In some forms, the permanent portion is a portion of the frame 103 to which the ancillary devices 110, 120, 130, 140 are mounted. The sensor modules 112, 122, 132, and 142 may be coupled to the more permanent portions of the ancillary devices 110, 120, 130, 140 such that they do not need to be replaced when the replaceable portions are replaced.

Returning to FIG. 1B, the belt cleaner 120 has a support pole 126 and one or more replaceable scraper blades 124. The scraper blades 124 are urged against the outer conveying surface 1020 of the belt 102 to remove any debris or residue that remains stuck to the belt 102 after the conveyed material is discharged therefrom. The friction between the scraper blades 124 and the belt 102 and/or debris from material carried by the belt 102 wear down the scraper blades 124 over time. The belt 102 also includes one or more splices. The splices are typically raised relative to the outer surface 1020 of the belt 102. The splices often comprise fasteners that are coupled to the belt by staples, rivets, or other fastening members. The engagement between the scraper blades 124 and the belt 102 causes the scraper blades 124 to impact the splices, which further contributes to the wearing down or damaging of the scraper blades 124. When the scraper blades 124 become too worn or damaged, they no longer effectively clean the belt 102 and need to be replaced.

With reference to FIGS. 1B and 16A, the support pole 126 of the primary cleaner 120A is connected to the frame 103 at mounts 1603, 1604. The support pole 126 is not a wear component and has an expected life time several times that of the scraper blades 124. As shown in FIG. 2B, the sensor module 122 includes a housing 125 adapted to be connected to the support pole 126 and a sensor circuit 123 within the housing 125. The sensor circuit 123 is substantially similar to the circuit 1800 described above.

Figure 2A:
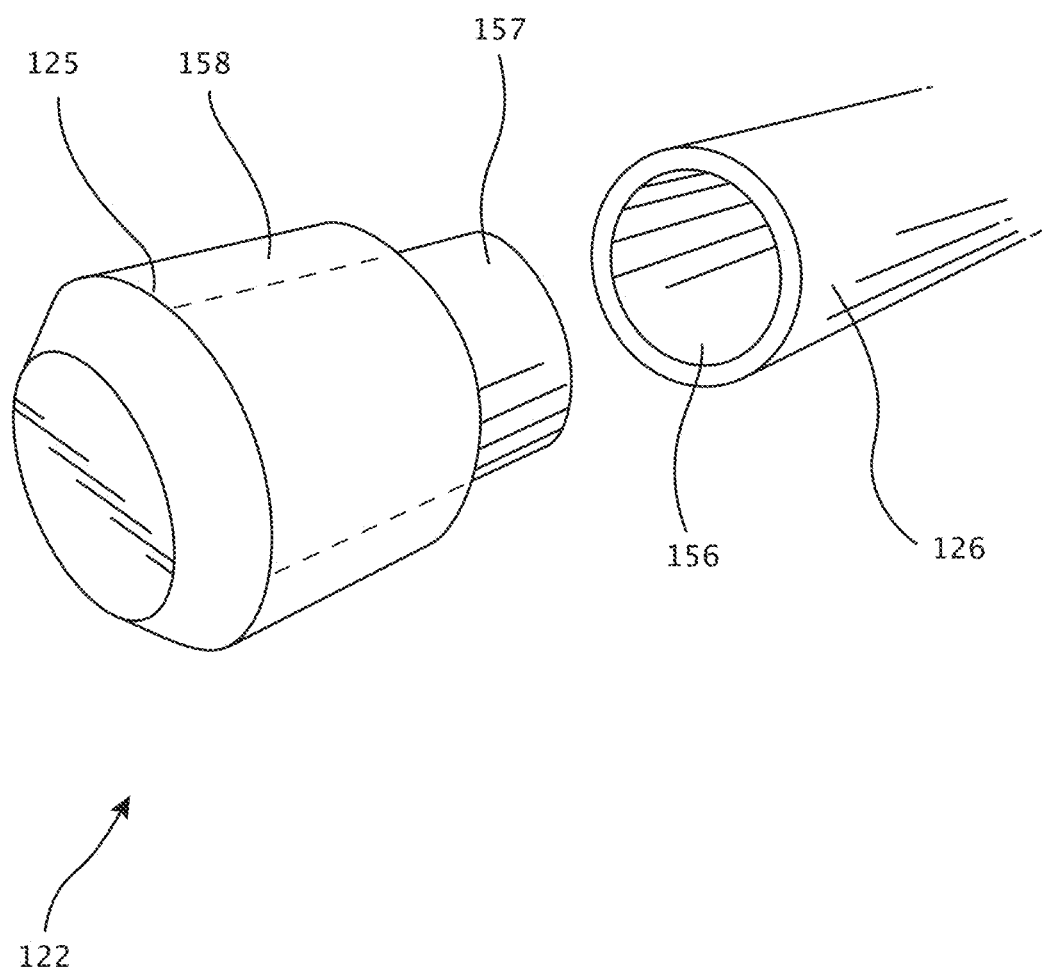
FIG. 2A is a perspective view of a sensor module for being mounted on a support pole of one of the conveyor belt cleaners of FIG. 1A to monitor one or more properties of the belt cleaner.
Figure 2B:
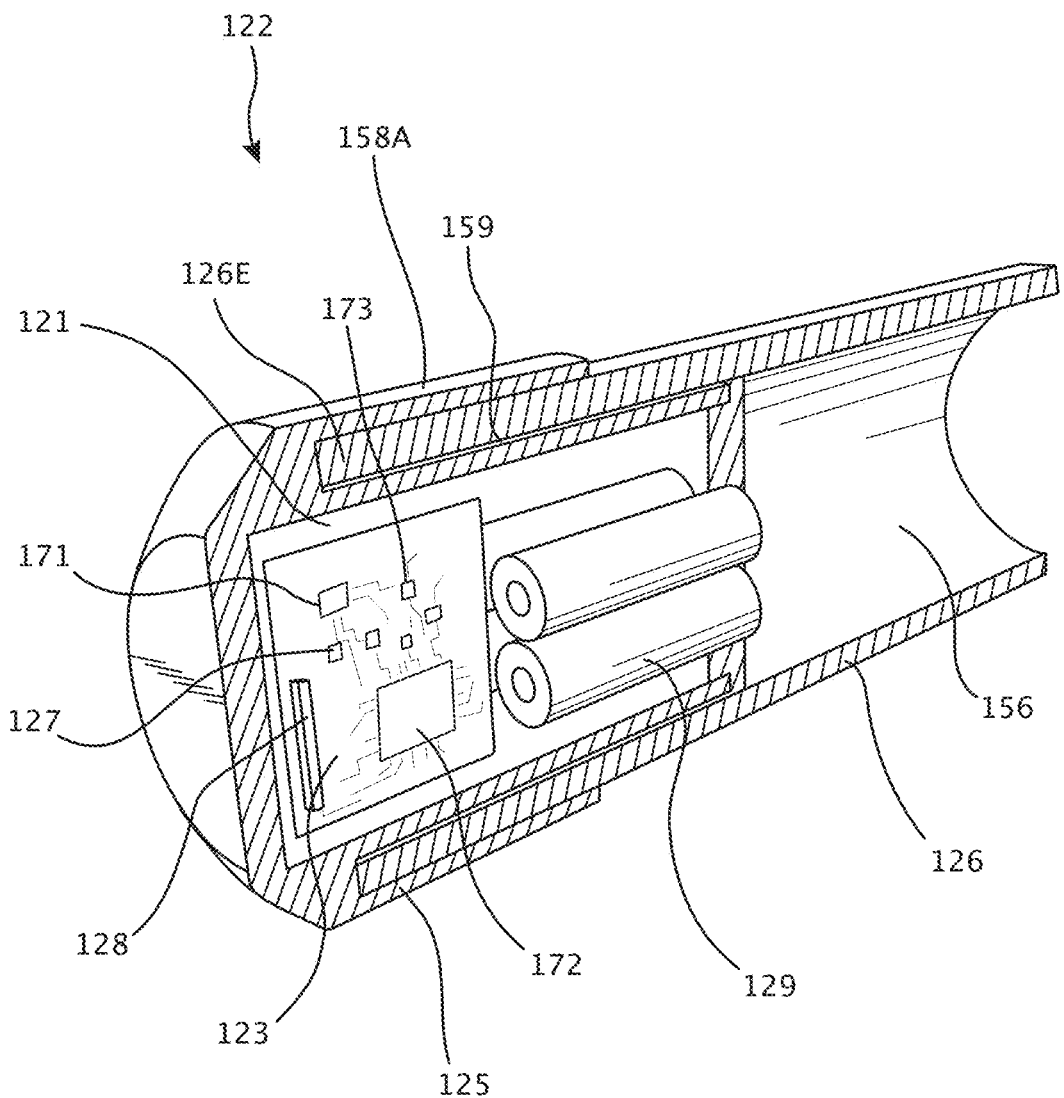
FIG. 2B is a cross-sectional view of the sensor of FIG. 2A.

With reference to FIGS. 2A, 2B, the housing 125 includes a mounting portion or plug portion 157 sized and shaped to extend at least partially into an opening 156 of the support pole 126 and form a plug fit therewith. The plug portion 157 shown has a substantially circular cross-section to fit securely into the substantially circular opening 156. In forms in which the support pole 126 has a different shaped opening 156, the plug portion 157 similarly has a differently shaped cross-section to couple thereto. The housing 125 further includes an outer portion 158 configured to remain outside of the support pole 126. The outer portion 158 and plug portion 157 define an annular recess 159 therebetween into which a portion of the support pole 126 is received. The outer portion 158 includes a sleeve 158A that surrounds an end portion 126E of the support pole 126 and firmly retains the sensor module 122 on the support pole 126. Further, fasteners, bands, and/or locking members may be used to secure the sensor module 122 to the support pole 126.

The housing 124 is configured to withstand harsh and/or outdoor environments. The housing may have a bright color, such as white, to reduce heating of the sensor module 122 by sunlight. The housing 124 may be formed of a rigid material to reduce the risk of breaking in the harsh environments of the conveyor systems 100, 100A. Exemplary materials include rigid composites, metal alloys, metals, or plastics. Additionally, the sensor circuit 123 may be embedded in a potting material to reduce the likelihood of being damaged by the vibration and/or impacts experience by the sensor module 122.

With reference to FIG. 2B, the housing 125 includes a cavity 121 positioned at least partially in the plug portion 157. The cavity 121 is sized to receive the sensor circuit 123. In one form, a power source, such as batteries 129, are also positioned in the cavity 121. Alternatively, the housing 125 includes separate internal cavities 121 for the sensor circuit 123 and batteries 129. In one form, the cavity 121 extends at least partially into the outer portion 158 beyond the end of the recess 159 such that an antenna 128 of the sensor circuit 123 is positioned beyond the end portion 126E. In this manner, wireless signals transmitted and/or received via the antenna 128 are not blocked by the support pole 126.

In operation, the scraper blades 124 vibrate as they scrape against the running belt 102. The vibration of the scraper blades 124 in turn vibrates the support pole 126 and the sensor module 122 fitted and secured to the end portion 126E of the support pole 126. If the scraper blades 124 become too dull, they will slide along debris on the belt 102 instead of scraping the debris off. This causes the scraper 120 to move differently, such as by the support pole 126 rotating a different angular amount, and/or vibrate differently, such as at greater frequency and/or amplitude, than when the scraper 120 is working correctly. Alternatively, the scraper blades 124 may be worn down, broken, or pushed back to the point that the scraper blades 124 no longer engage the belt 102. This causes the scraper 120 to vibrate less than or not at all it would if the scraper 120 were in proper working condition.

In one form, the sensor circuit 123 includes a processor 171 configured to compare the vibration of the scraper 120 to an acceptable range stored in the sensor circuit 123. If the vibration falls outside of the acceptable range, one or more faults are detected and the processor 171 sends a signal indicating the fault via the transmitter 172 utilizing the antenna 128. The acceptable ranges stored on the sensor circuit 123 may be updated by communication with an external device. In another form, the sensor circuit 123 transmits the raw data from the sensor 173, such as an accelerometer, and a processor at a different location such as the in the cloud-based computing system 105 or at a central control computer performs the processing.

The sensor circuit 123 can be used to predict one or more properties of one or more components of the conveyor system 100. For example, the one or more properties may include whether or not the conveyor belt 102 is moving. When the conveyor belt 102 is moving, the sensor module 122 is vibrated and the at least one characteristic of the support pole 126, such as acceleration, can be detected by an accelerometer in the sensor circuit 123. When the sensor 123 detects vibration with low frequency or low magnitude, it can indicate that the belt 102 is running while loaded.

The sensor circuit 123 may be used to predict other properties of the components of the conveyor belt system 100. For example, the sensor circuit 123 may be used to detect whether the cleaner 120 is engaging the belt 102 or is backed off. In one form, engagement is detected based on vibration which is detected by an accelerometer 173 of the sensor circuit 123. In forms in which the belt cleaner 120 rotates into engagement with the belt 102, such as the belt cleaner 120A of FIG. 16A, engagement can be detected based on the rotation of the support pole 126. The sensor circuit 123 can detect a characteristic of the support pole 126, such as rate of rotation or position, with a gyroscopic sensor or a level sensor, such as a mercury switch. In some forms, the sensor circuit 123 detects rotation or orientation using an accelerometer by tracking the history of movement. If an accelerometer is used to track orientation, the sensor circuit 123 may be calibrated periodically to reduce compounding error. In another example, the sensor circuit 123 predicts when the scraper blades 124 are backed off of the belt 102 by way of a limit switch configured to detect when the support pole 126 is fully rotated by the spring 1601.

The sensor circuit 123 may also use the characteristic of orientation of the support pole 126 to predict a property of the scraper blades 124, such as wear level of the scraper blades 124. As the scraper blades 124 wear down, the base member 126 is rotated farther to keep the scraper blades 124 engaged with the belt 102.

The sensor circuit 123 may also use the linear position of a linear-biased conveyor belt cleaner 120B (see FIG. 16B) to predict the properties of engagement and wear of the scraper blades 124 of the conveyor cleaner 120. The position of the support pole 126 relative to the frame 103 indicates how far the support pole 126 is being urged towards the belt 102. This distance changes as the scraper blades 124 wear down. When the support pole 126 reaches the end of its travelable distance, the scraper blades 124 are worn to the point that they are no longer properly engaging the belt 102.

The sensor 173 of the sensor circuit 123 may include an accelerometer. The sensor circuit 123 may utilize the accelerometer to predict chatter in the conveyor system 100. Chatter, which is movement within the system caused by irregularities of one or more parts (such as idler rollers or drive rollers), may be predicted using vibrations detected by the accelerometer. The irregularity causes the part to move irregularly, which moves the belt 102. The belt 102 in turn moves the scraper blades 124 which move the support pole 126. The accelerometer can detect both the magnitude and frequency of the chatter.

The effectiveness of one of the belt cleaners 120 can depend on the tension with which it is urged into engagement with the belt 102. In one form, the sensor circuit 123 may predict the tension of the belt cleaner 120 based on the frequency response of the support pole 126. For example, if the belt cleaner 120 is under high tension and the scraper blades 124 are pushed away from the conveyor belt 102 by an impact, the belt cleaner 120 will quickly return the support pole 126 to the original position of the support pole 126 and re-engage the scraper blades 124 with the conveyor belt 102. Conversely, if the belt cleaner 120 is under low tension, the belt cleaner 120 will return the support pole 126 to the original position thereof and re-engage the scraper blades 124 with the conveyor belt 102 more slowly.

In some forms, the sensor 173 of the sensor circuit 123 may include a gyroscope and an accelerometer which are used to predict mistracking of the belt 102. Mistracking of the belt 102 can cause twisting of the scraper blades 124 as a result of asymmetrical forces imparted thereupon. The gyroscope and/or accelerometer can detect characteristics of the support pole 126 as the support pole 126 vibrates that indicate twisting of the scraper blades 124. Similarly, unevenly worn scraper blades 124 can cause twisting or other movement of the belt cleaner 120 that can be detected by the gyroscope and accelerometer of the sensor circuit 123.

The sensor circuit 123 may also be used to predict other properties of the conveyor system 100, such as whether the scraper blade 124 is missing (even if another portion of the belt cleaner 120 is still contacting the belt 102), whether one of the belt cleaners 120 is missing, whether the scraper blade 124 is chipped (and/or impact events likely to cause chipped scraper blades), whether the conveyor belt 102 is flapping, and the projected remaining life of the conveyor belt 102.

The sensor circuit 123 may also detect movement of the support pole 126 when the scraper blades 124 contact a splice of the conveyor belt 102. In one form, the central control system 101 identifies splices based on the pattern of movement of the support pole 126 because the splice will be at the same point of the belt 102 during every complete cycle. Identifying the movements of the scraper blades 124 caused by belt splices allows the central control system 101 to avoid attributing said movement to one of the other characteristics described above, such as a dull or damaged scraper blade 124.

Figure 21:
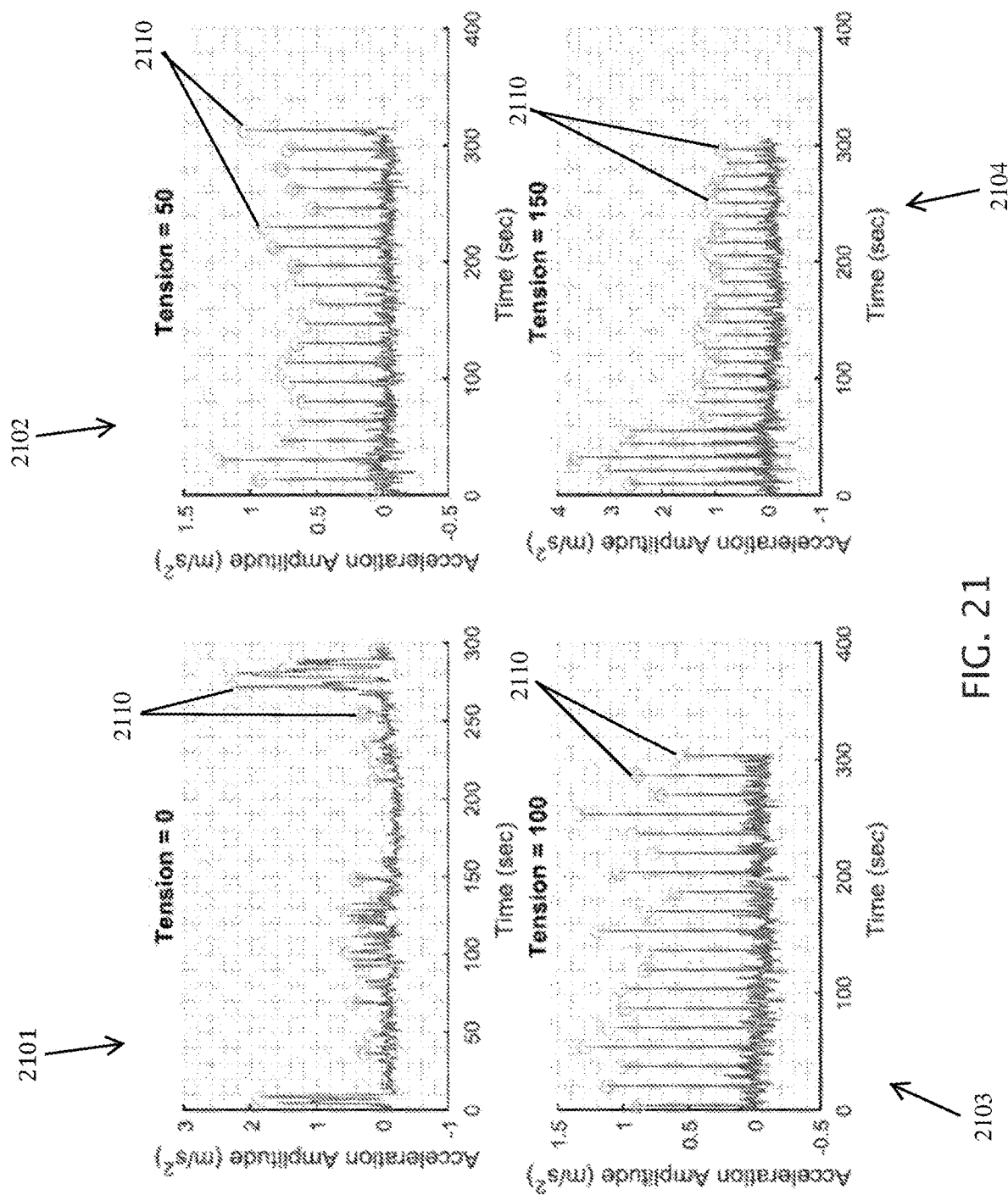
FIG. 21 is a collection of graphs showing acceleration amplitude versus time as measured by the sensor module of FIGS. 2A-2B at different belt cleaner tensions.

FIG. 21 displays example data from an accelerometer of the sensor 173 of the sensor circuit 123 wherein the belt 102 of the conveyor system 100 has a belt splice. The four graphs 2101, 2102, 2103, and 2104 display, respectively, acceleration amplitude vs. time for tensions of a belt cleaner at 0%, 50%, 100%, and 150% tensions. The tension of a belt cleaner is the amount of force by which the scraper blades 124 are urged against the belt 102 as a percentage of the target tension. The target tension varies based on the material of the scraper blades 124, the material of the belt 102, and the material being conveyed. As shown in graph 2101, when the scraper blades 124 are under no tension, the impacts 2110 with the splice do not occur at consistent intervals or amplitudes. However, as shown in graphs 2102, 2103, and 2104, when the scraper blades 124 are under tension, the splice impacts the scraper blades on substantially every rotation of the conveyor belt, and thus the impacts occur at consistent intervals. The central control system 101 processes the acceleration amplitude versus time data to identify accelerations that take place at consistent intervals. In some forms, the central control system 101 utilizes values representing the speed and length of the conveyor belt 102 to identify acceleration events that occur once every rotation. These events are identified as being caused by an imperfection in the belt 102, such as a splice. In some forms, stored values represent the predicted amplitude of acceleration of a belt cleaner 120 from an impact with a splice. The central control system 101 utilizes these stored values to identify acceleration events 2110 as impacts with a splice.

FIG. 21 illustrates the change in amplitude of acceleration from impacts as tension changes. In some forms, the central control system 101 processes accelerometer data to predict the tension of the belt cleaner 120 by comparing recorded data to stored values. In graph 2101, impacts 2110 at 0% tension had a mean amplitude of 0.55 m/s$^2$. Impacts 2110 at 50% tension, see graph 2102, had a mean amplitude of 0.71 m/s$^2$. In graph 2103, impacts 2110 at 100% tension had a mean amplitude of 0.94 m/s$^2$. Lastly, in graph 2104, impacts 2110 at 150% tension had a mean amplitude of 1.4 m/s$^2$. The exact amplitudes will change based on a number of other factors, such as splice material, blade material, conveyor speed, environmental factors, etc. However, the trend of higher magnitudes of acceleration as a result of impact at higher tensions enable the central control system 101 to estimate the tension when factoring in these other variables. As seen in graph 2104, the first five impacts 2110 had a mean amplitude of approximately 3 m/s$^2$. After the fifth impact, the mean amplitude dropped off to approximately 1 m/s$^2$. This sudden drop in magnitude can indicate damage to the blade 124 or the splice. In some forms, the central control system 101 will flag a sudden change in amplitude, such as that shown in the graph 2104, and transmit an alert to a user.

Returning to FIGS. 1A and 1B, the idler rollers 130 and drive rollers 135 are removably and rotatably mounted to the frame 103. The rollers 130, 135 may have a relatively short expected lifespan as a result of friction between the outer surface of the rollers 130, 135 and the belt 102 and/or the wear on roller bearings of the rollers 130, 135. As such the rollers 130, 135 may be replaced multiple times over the lifetime of the conveyor system 100. In one form, sensor modules 132 are mounted to the frame 103 proximate the idler rollers 130. The movement of the belt 102 along the idler rollers 130 cause the rollers 130 and the nearby portions of the frame 103 to vibrate. The sensor module 132 includes an accelerometer configured to measure the vibration of one of the idler rollers 130. If the internal bearings fail, the idler roller 130 may stop rotating or seize. A seized idler roller 130 can be detected by measuring a higher than expected amount of vibration. A processor may, either at the sensor module 132 or at a central computer, compare the measured vibration data to a stored range, and if the vibration measured is more or less violent than the stored values an alert can be transmitted indicating that the roller 130 is potentially damaged or seized.

The rollers 130 supporting the upper run of the conveyor belt 102 near the outer edges thereof are angled such that the outer ends of the rollers 130 are higher than the inner ends. This configuration partially rolls up the sides of the belt 102, giving the belt 102 a generally U-shaped or trough-shaped cross-section. The trough-shaped cross-section reduces the amount of material that spills off of the belt 102.

Returning to FIG. 1C, the impact bed 110 has one or more resilient supports or impact bars 114 for supporting an inner surface 1021 of an upper run 201 the conveyor belt 102L where the material falls through the chute 108 and onto the conveyor belt 102L. In one form, the impact bars 114 are mounted to a frame 116 which is in turn movably attached to the frame 203. The frame 116 may attached to the frame 203 via springs that permit the frame 116 and impact bars 114 to shift downward to absorb impact and then return to the original positions of the impact bars 114. Additionally, the impact bars 114 may have a laminated structure including an upper, belt-contacting layer made of nylon or Teflon and a resilient lower layer that is mounted to the frame 116. The resilient lower layer may be made of an elastomeric material for example. The resilient lower layer permits the impact bars 114 to compress to absorb some of the impact force of the material. The resilient lower layer of the impact bars 114 impact bars 114 may decompress when the impact force is removed. The impact bars 114 may be replaceable members that wear down over time from the impact of the conveyed material as well as friction from the belt 102. The impact bars 114 may be detachably coupled to the frame 116 such that they can be replaced without replacing the frame 116. Impact beds are described in U.S. Pat. No. 7,815,040 which is incorporated by reference herein in its entirety.

In operation, the material dropped through the chute 108 and onto the outer surface 1020 of the belt 102 causes the belt 102 and impact bars 114 and frame 116 of the impact bed 110 to shift downward. The impact bed 110 decelerates the impact bars 114 and frame 116 and then biases the impact bars 114 and frame 116 upward back toward the initial position thereof. The impact bed 110 may include the sensor module 112 mounted on the frame 116. The sensor module 112 is substantially similar to the sensor module 122 and includes a sensor circuit similar to the sensor circuits 123, 1800 discussed above. The sensor circuit of the sensor module 112 may include an accelerometer like the accelerometer 1808 and a communication module like the communication module 1806. The sensor module 112 may include a processor like the processor 1802. The processor of the sensor module 112, and/or a processor in a computing device external to the sensor module 112, compares data from the accelerometer to stored baseline values. In some forms, the processor(s) uses additional data representing the timing and weight of payload being dumped on the conveyor belt 102L to calculate expected movement of the impact bed 110. If the frame 116 is moving less or more than the range of expected values, the processor(s) determine the impact bed 110 is in a fault state and an alert is sent to a user.

Figure 11:
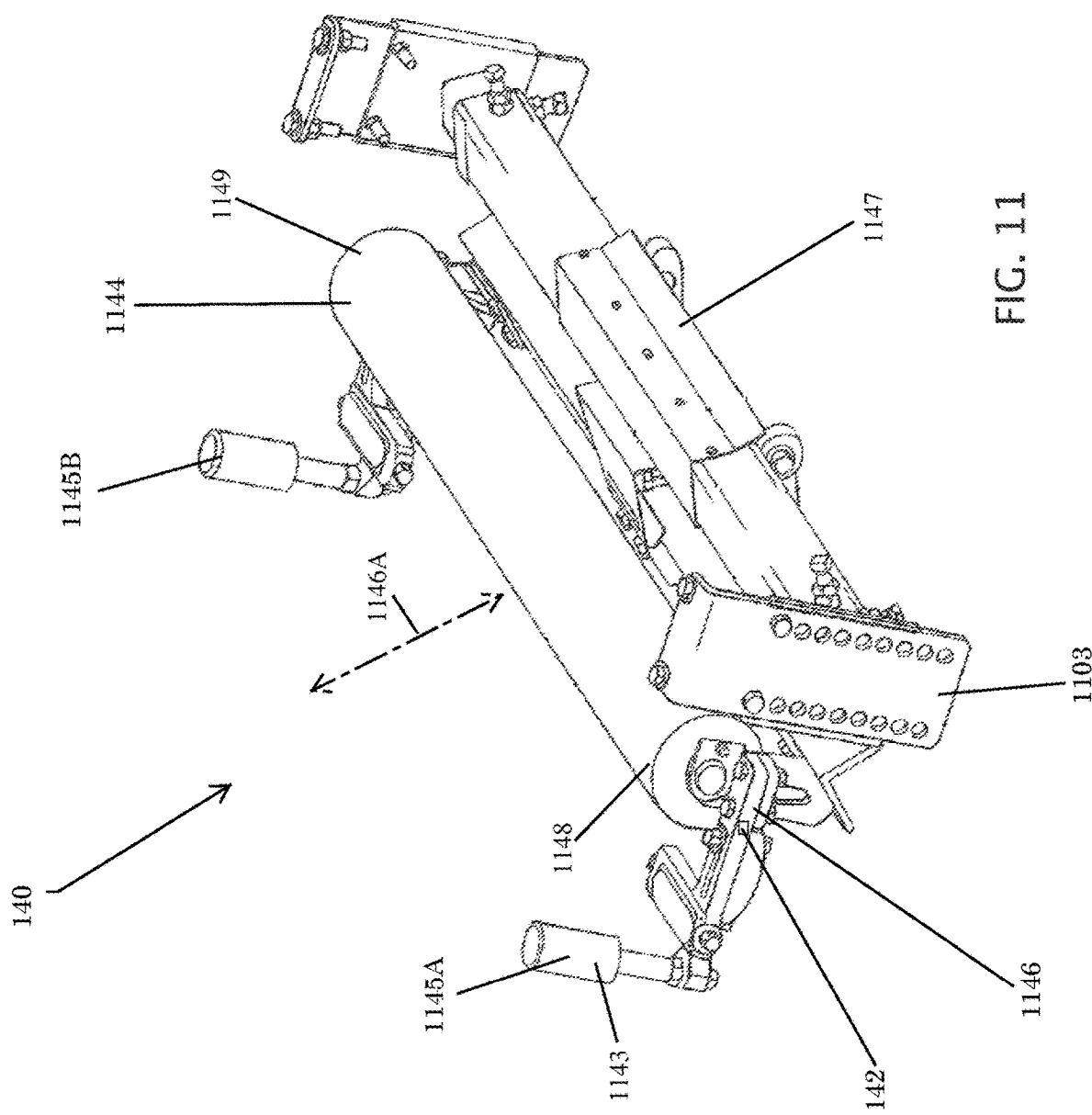
FIG. 11 is a perspective view of a tracking device having a sensor, the tracking device being suitable for use in the conveyor system of FIG. 1A or FIG. 1C.

With reference to FIG. 11, the conveyor systems 100, 100A may utilize one or more belt trackers 140 to keep the conveyor belts 102, 102U, 102L traveling along predetermined paths. The belt tracker 1140 includes an idler roller 1144 mounted on a pivotal frame 1146 for supporting the bottom surface of the conveyor belt 102, 102U, and 102L and side rollers 1145A, 1145B. The pivotal frame 1146 is pivotally connected to a support 1147 that extends laterally across the conveyor belt 102, 102U, 102L. The support 1147 is supported by mounts 1103 connected to the frame 103 associated with the conveyor belt 102, 102U, 102L. The pivotal connection between the frame 1146 and the support 1103 permits the frame 1146 to pivot about an axis 1146A.

When the belt 102, 102U, 102L creeps in a lateral direction 102B, the belt 102, 102U, 102L contacts the side roller 1145A causing the frame 1146 to pivot relative to the conveyor frame 103. The pivoting of the frame 1146 moves the side roller 1145A upward relative to the conveyor frame 103 and downstream in the direction of travel of the conveyor belt 102, 102U, 102L. Because the idler roller 1144 is also mounted to the frame 1146, the end portion 1148 of the idler roller 1146 near the side roller 1145A also moves upward relative to the conveyor frame 103 and downstream. Conversely, the pivoting of the frame 1146 due to the conveyor belt 102, 102U, 102L contacting the side roller 1145 moves the side roller 1145B and the end portion 1149 of the idler roller 1144 near the side roller 1145 downward relative to the conveyor frame 103 and upstream. This pivoting of the frame 1146 and associated rollers 1144, 1145A, 1145B redirects or urges the belt 102, 102U, 102L back toward a central position.

Over time, the idler roller 1144 and side sensor rollers 1145A, 1145B may wear out, with outer surfaces 1143 thereof having relatively short expected lifespans. The frame 1146 has a substantially longer expected lifespan. The belt tracker 1140 may include a sensor module 142 coupled to the pivoting frame 1146. The sensor module 142 may be substantially similar to the sensor module 122 and include a sensor circuit like the sensor circuit 1800. The sensor circuit of the sensor module 142 may include a processor, a wireless transmitter, and a sensor such as an accelerometer. The sensor of the sensor module 142 detects the direction of pivoting of the frame 1146 as well as the magnitude of pivoting motion of the frame 1146. The processor of the sensor module 142, and/or a remote processor in an external computing device, analyzes one or more characteristics of the pivoting of the frame 1146 over time such as frequency, direction, and acceleration. A high frequency of pivoting of the frame 1146 in one direction can indicate a problem with the conveyor system 100, 100A that is causing the belt 102, 102U, 102L to continuously creep. Alternatively, very little or no pivoting may indicate a fault with the tracking device 1140, such as a jam in the pivot connection between the frame 1146 and the support 1147. In some forms, the sensor module 142 senses vibration of the tracking device 1140. High vibration may indicate that the roller 1144 is no longer freely rotating.

FIG. 12 illustrates a belt tracker 1240 usable in place of the belt tracker 1140. The belt tracker 1240 is similar in many respects to the belt tracker 1140. The belt tracker 1240 includes two idler rollers 1244A, 1244B detachably coupled to a pivotal frame 1246. The frame 1246 is pivotally connected to a support 1247 that is in turn connected to the conveyor frame 103 via mounts 1203. When the belt 102 creeps in one lateral direction to one of the rollers 1244A, 1244B, the frame 1246 pivots about an axis 1246A which moves the one roller 1244A, 1244B in the downstream, belt travel direction of the conveyor belt 102, 102U, 102L. The pivoting of the frame 1246 about axis 1246A may also cause the one roller 1244A, 1244B to tilt so that the one roller 1244A, 1244B is raised relative to the other roller 1244A, 1244B. The pivoted rollers 1244A, 1244B bias the belt 102, 102U, 102L toward the desired central position of the belt 102, 102U, 102L. The belt tracker 1240 may also include a sensor module 142A mounted to the pivotal frame 1246. The sensor module 142A is similar to the sensor module 142 of the belt tracker 1140.

With reference to FIG. 3, the monitoring apparatus 10 may provide a network of interconnected devices for monitoring one or more characteristics of one or more components of the conveyor systems 100, 100A. For example, the sensor modules 112, 122, 132, 142 associated with the impact beds 110, belt cleaners 120, idler rollers 130, and belt trackers 140 transmit data to the wireless communication hub 104. The wireless communication hub 104 in turn transmits the data from the sensor modules 112, 122, 132, and 142 to a remote computer, such as the cloud-based computing system 105. In one form, the wireless communication hub 104 may communicate data from the sensor modules 112, 122, 132, and 142 to one or more portable computing devices such as smartphones 106. Further, the wireless communication hub 104 may provide data to sensor modules 112, 122, 132, 142 such as adjusting threshold values for the sensor modules 112, 122, 132, 142 or providing software or firmware updates.

The monitoring apparatus 10 includes the central control system 101 that receives data from the cloud-based computing system 105 and provides corresponding information to one or more computers 107. The control system 101 includes at least one processor, at least one memory (e.g., non-transitory computer readable memory, such as RAM, solid state disc, or magnetic disc), and communication circuitry (e.g., WiFi circuitry, Ethernet port, or cellular communication circuitry) configured to communicate with the cloud-based computing system 105. The at least one memory of the control system 101 is a non-transitory computer readable medium such as a magnetic disc. The computer 107 may include a screen, a speaker, etc. The computer 107 may provide the information to the user using various approaches, such as using visual, audio, and/or tactile approaches. In one form, the computer 107 includes one or more computer screens and the information corresponding to the data from the sensor modules 112, 122, 132, 142 is presented visually on the computer screens such as via an internet browser.

The control system 101 processes the data from the sensor modules 112, 122, 132, and 142 to determine one or more characteristics of one or more components of the conveyor system 100, 100A such as the impact bed 110, conveyor belt cleaners 120, and idler rollers 130. In one form, the sensor modules 112, 122, and 132 include accelerometers. The control system 101 stores data from the sensors 112, 122, and 132 over time and extrapolates the data to estimate the remaining operational lifetime of the impact bed 110, conveyor belt cleaners 120, and idler rollers 130. For example, as the scraper blade 124 of the conveyor belt cleaner 120 is dulled, the rotary distance the support pole 126 of the conveyor belt cleaner 120 moves increases. At a certain point, the scraper blade 124 will require sharpening or replacement. The control system 101 extrapolates the data from the sensor circuit 123 of the sensor module 122 to estimate when the scraper blade 124 will require replacement or sharpening. This estimate is used to schedule maintenance so that the conveyor belt cleaner 120 is repaired before breaking, thus reducing the risk of a failing conveyor belt cleaner 120 causing additional damage to the conveyor system 100, 100A. The control system 101 likewise may determine estimates of when maintenance is required for other ancillary devices such as the impact bed 110, the idler rollers 130, and drive roller 135 based on data from the associated sensor modules 112, 122, 132, 142.

In some forms, the control system 101 is provided at a control room at the same facility as the associated conveyor system 100, 100A. Alternatively, the control system 101 is at a location that is geographically remote from the facility of the conveyor system 100, 100A. By geographically remote, it is intended that the control system 101 is separated from the associated conveyor system 100, 100A by one or miles, two or more miles, three or more miles, hundreds of miles, or even on different continents. The control system 101 when located remote from the facility of the conveyor system 100, 100A may monitor conveyor systems at geographically dispersed locations.

Figure 5:
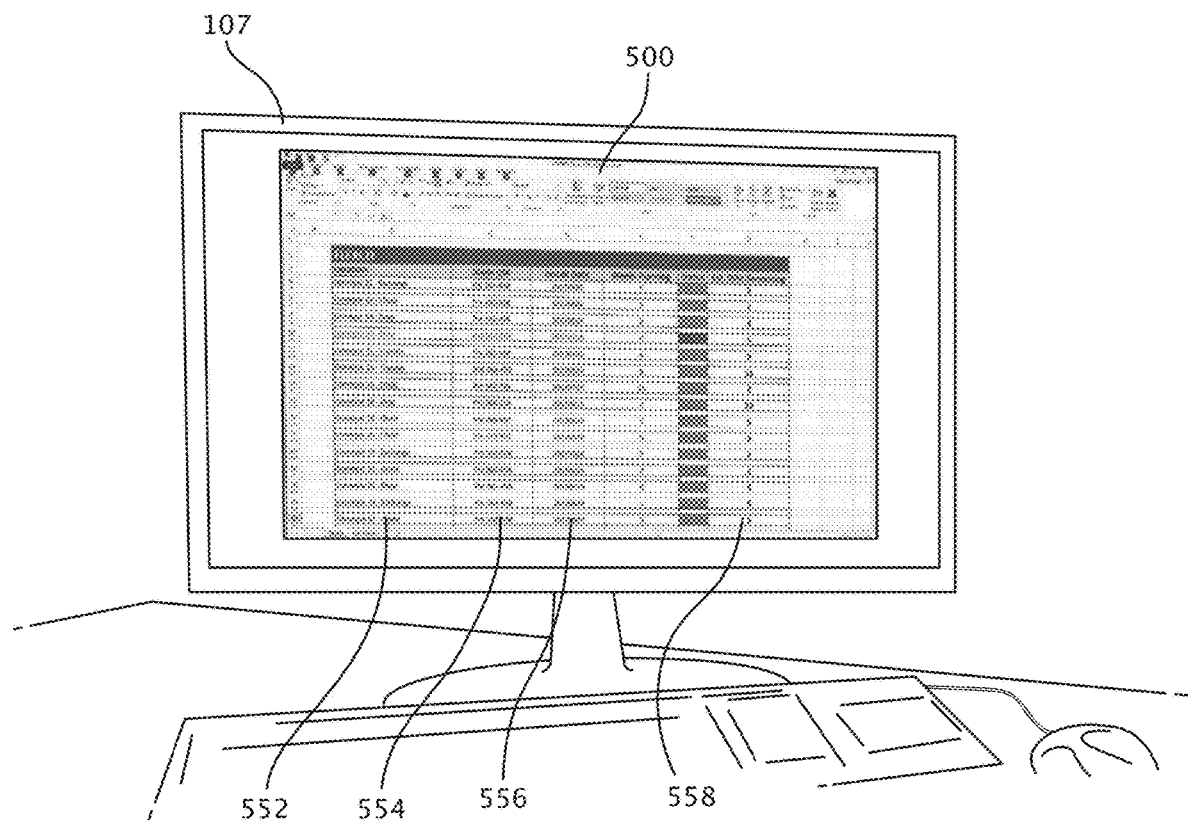
FIG. 5 is an illustration of a computer monitor displaying an application that provides information to a user based on data measured by the sensors in the conveyor system of FIG. 1A.
Figure 6:
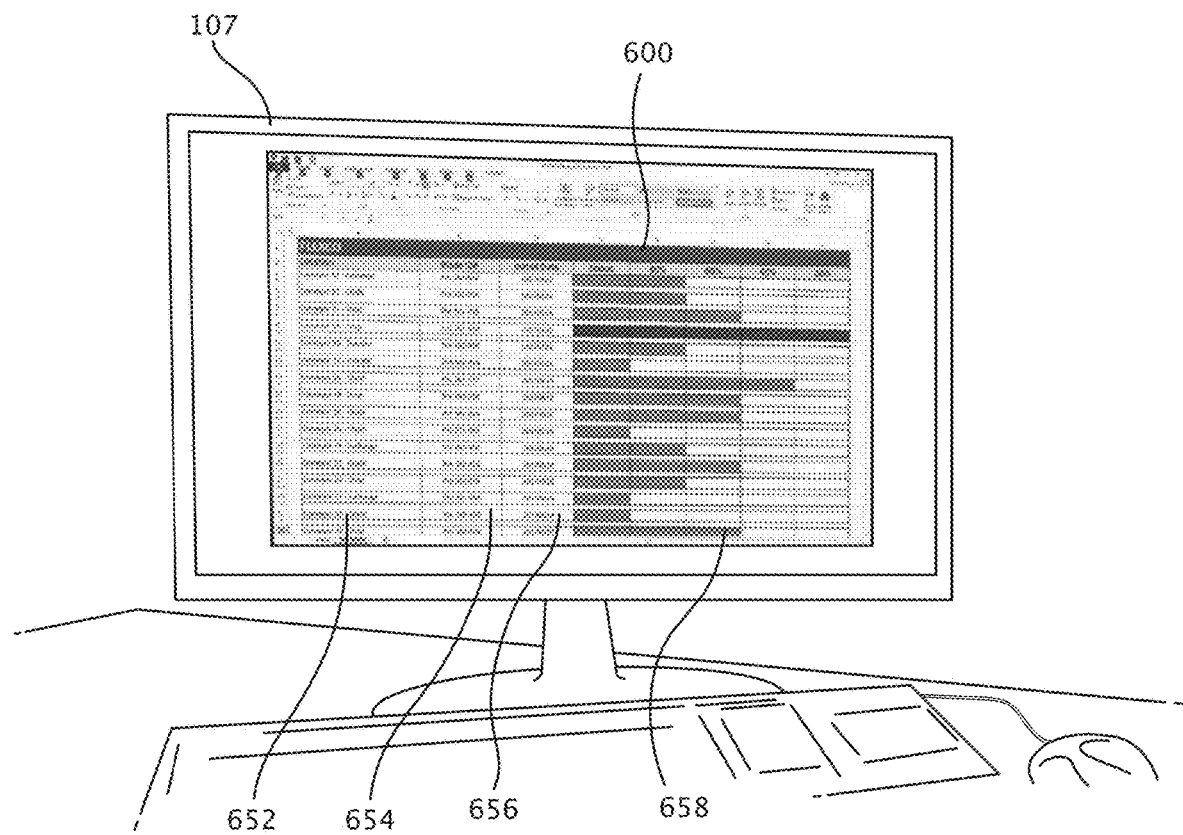
FIG. 6 is an illustration of a computer monitor displaying an application that provides information to a user based on data measured by the sensors in the conveyor system of FIG. 1A.
Figure 7:
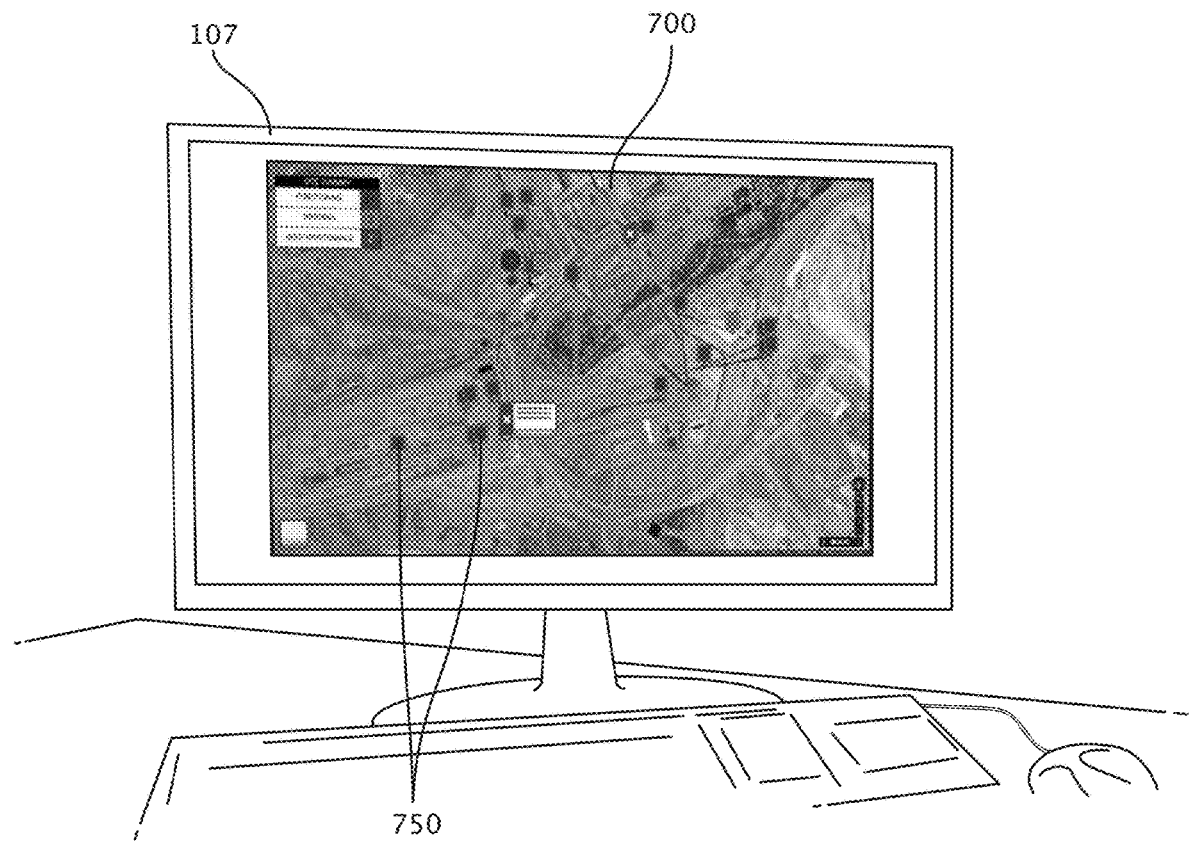
FIG. 7 is an illustration of a computer monitor displaying an application that provides information to a user based on data measured by the sensors in the conveyor system of FIG. 1A.
Figure 8:
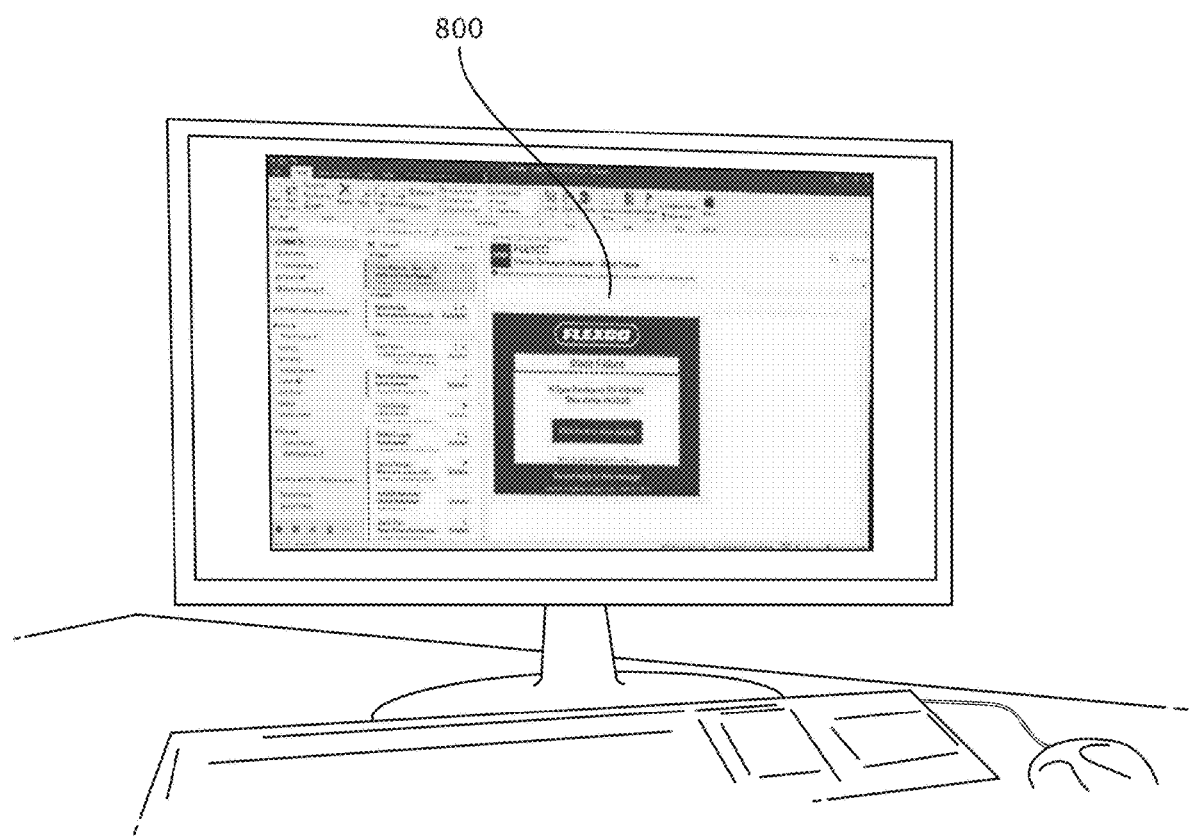
FIG. 8 is an illustration of a computer monitor displaying an email that provides information to a user based on data measured by the sensors in the conveyor system of FIG. 1A.
Figure 9:
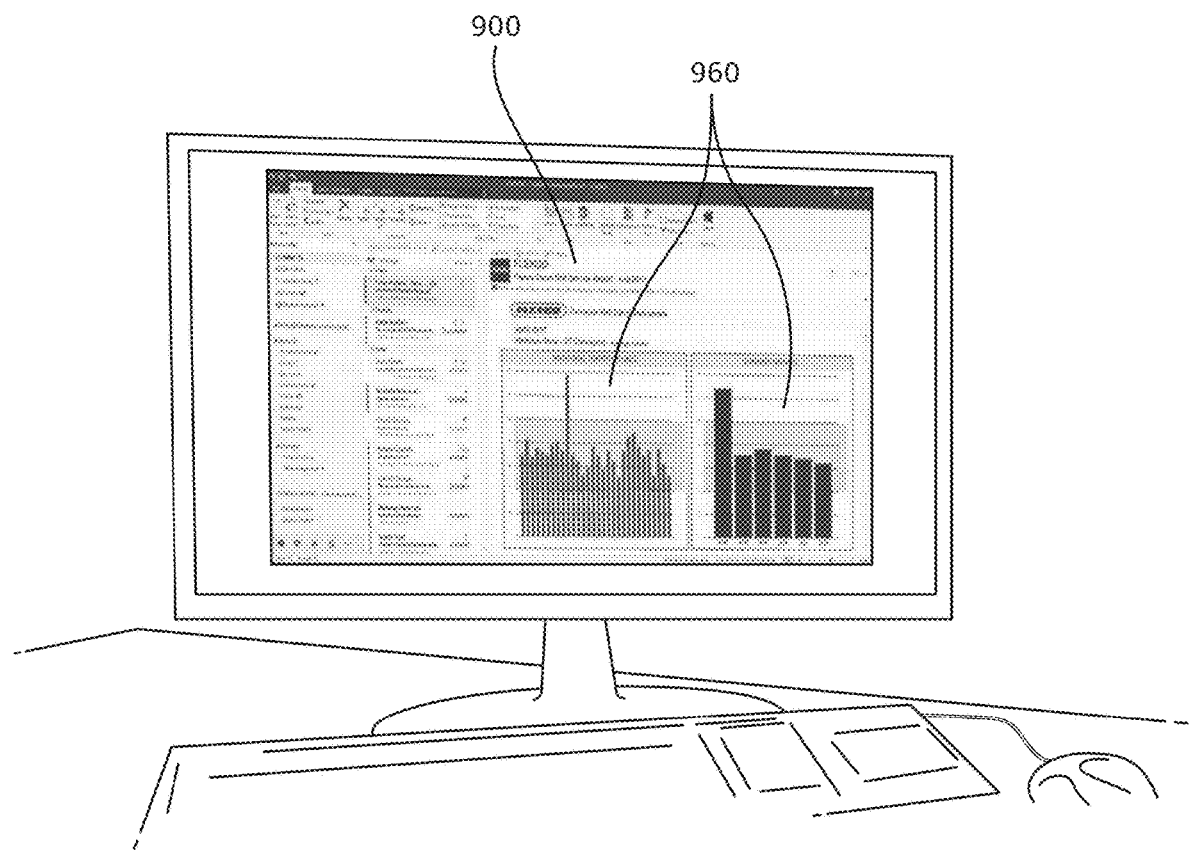
FIG. 9 is an illustration of a computer monitor displaying an email that provides information to a user based on data measured by the sensors in the conveyor system of FIG. 1A.
Figure 10:
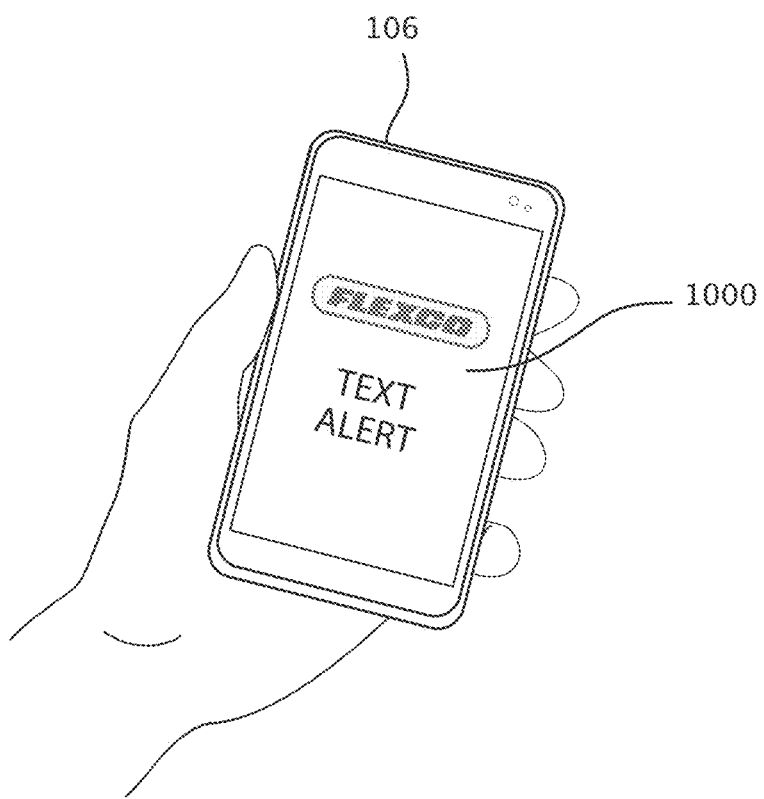
FIG. 10 is a perspective view of a smartphone displaying an application that provides information to a user based on data measured by the sensors in the conveyor system of FIG. 1A.

With reference to FIGS. 5-10, illustrations are provided of an example computer screen of the computer 107 of the control system 101 to show different ways in which the information corresponding to the data form the sensor modules 112, 122, 132, and 142 may be displayed to a user. As shown in FIGS. 5-7, the control system 101 may display constant, real-time information about a plurality of ancillary devices. As shown in FIGS. 8-10, the control system 101 provides communications periodically, such as at predetermined times or when a certain condition is met. These communications may be pushed to a user so that the user is notified of the condition even if the user is not at his or her desktop computer. Alternatively, the user may pull the communications to the user such as by requesting status information using a smartphone 106 (see FIG. 10). In some forms, the control system 101 displays constant real-time information and provides communications to a user in the event of a particular condition occurring.

With reference to FIGS. 5-7, the computer 107 is shown displaying the remaining lifetimes of ancillary devices of the conveyor systems 100, 100A. In FIG. 5, a table 500 is displayed having information about each ancillary device. The information includes identifying information, such as the location 552 and an identification number 554, the install date 556, and the estimated remaining lifetime 558 in days or weeks. In some forms, the table is color coded to draw attention to devices that are in need of imminent maintenance. For example, devices that are currently in a failure state are indicated by the color red and devices having a short remaining life are indicated by the color yellow or orange.

Turning to FIG. 6, the computer 107 displays a bar graph 600 showing the percentage of remaining life for each ancillary device. Similar to the table 500, the graph 600 includes the identifying information 652 and 654, installation date 656, and bar 658 showing the percentage of life remaining. In some forms, the bars 658 are color coded as above to draw attention to ancillary devices that are currently in need of maintenance or will require maintenance shortly.

FIG. 7 illustrates a map 700 or satellite view of the facility or worksite where one or more conveyor systems 100, 100A are positioned. Indicators 750 are positioned on the map 700 at the location of ancillary devices having sensor modules. When the user clicks on the indicator 750 of one of the ancillary devices or hovers her mouse over the indicator 750, the control system 101 displays additional information about the corresponding ancillary device, such as the information in the table 500 or graph 600, e.g. identifying information and remaining lifetime. The indicators 750 are color coded to indicate the current status, e.g., green for good, yellow for short remaining lifetime, and red for fault.

Figure 4:
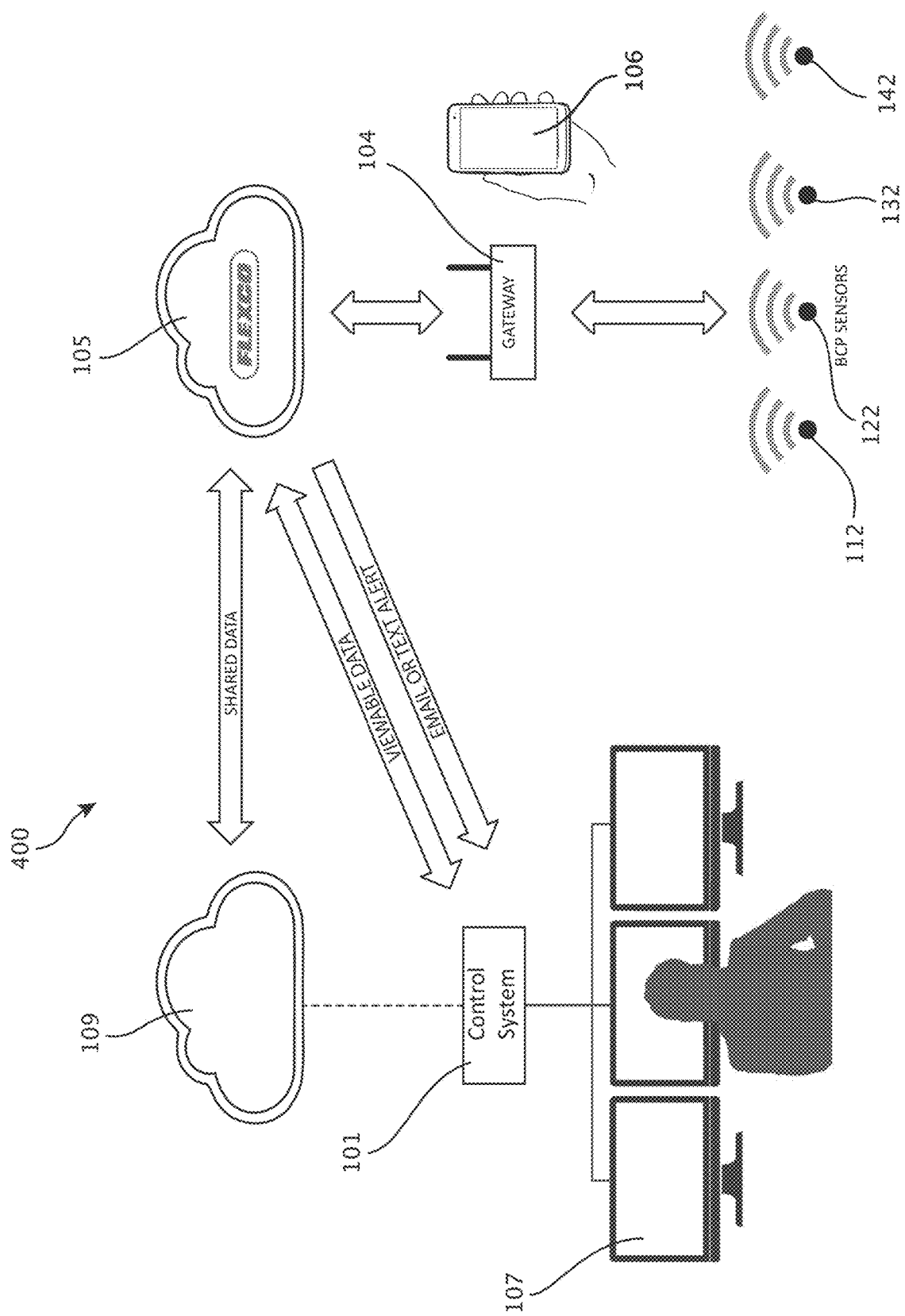
FIG. 4 is a network diagram illustrating the wireless communication of sensors of the conveyor system of FIG. 1A with a control system by way of a wireless gateway and cloud storage as well as a second cloud computing system for providing additional parameters to the control system.

In one form, the control system 101 utilizes additional information to estimate or predict the remaining lifetime of ancillary devices. With reference to FIG. 4, a monitoring apparatus 400 is provided that is similar in many respects to the monitoring apparatus 10 discussed above and contains many of the same components such as the control system 101, computer 107, wireless communication hub 104, cloud-based computing system 105, and sensor modules 112, 122, 132, 142. The monitoring apparatus 400 further includes a cloud-based computing system 105 from which additional data is transmitted to the control system 101. Example data includes the state of the belt, e.g. running or stopped, the speed of the belt, the weight of the material being conveyed, and weather conditions. The weather conditions and other environmental factors can be determined based on environmental sensors, such as rain detectors, temperature sensors, and humidity sensors located on or near the conveyor system 100, 100A. Alternatively or additionally, environmental information is retrieved by the control system 101 from the internet based on the location of the conveyor system 100, 100A. The control system 101 alters the values to which the measured data is compared based on the additional information from the system 105. For example, the control system 101 would expect the scraper 120 and idler rollers 130 to move more when the belt 102 is moving faster. As another example, the control system 101 would additionally expect the impact bed 110 to move more when a heavier payload is being loaded onto the belt.

In some forms, the cloud based-computing system 105 includes a memory storing a future schedule for the conveyor system 100. The schedule contains hours of operation, speed of operation, and weight of material for the conveyor system 100. The control system 101 calculates the estimated remaining lifetime of one or more of the ancillary devices based on the scheduled workload of the conveyor system.

In addition to identifying wear as described above, the monitoring apparatus 400 utilizes data from the sensor modules 112, 122, 132, 142 to identify abnormal trends. For example, data from an accelerometer of the sensor module 142 measures movement of the conveyor belt tracker 140 and compares the movement to historical data and/or stored thresholds to determine how often the belt 102 is currently being corrected compares to an expected frequency of correction. A heightened frequency of corrections by the conveyor belt tracker 140 indicates that something is causing the conveyor belt 102 to creep or pull in one lateral direction. The control system 101 alerts the user either via the computer 107 or the smartphone 106. Maintenance can then be performed on the conveyor system 100 to identify and correct the cause of the pulling before the pulling causes premature wearing of the belt 102 and/or conveyor belt tracker 140.

With reference to FIGS. 8-10, the control system 101 may provide communications in the form of email alerts 800, 900 or text alerts 1000 from the control system 101 to a user. In some forms, such as in FIG. 9, the email alerts 800, 900 or text alerts 1000 are sent out periodically to convey operating information. For example, graphs 960 of email alert 900 indicate the amount of use each of a plurality of belts 102 have experienced over a predetermined timeframe. The communications may also include maintenance information, such as the amount of faults identified by the sensor modules and/or the number of ancillary devices to be repaired or replaced. In still further examples, the information provided includes the table 500 or chart 600 illustrating the current remaining lifetime of a plurality of devices.

The control system 101 may transmit an email alert 800 or text alert 1000 when an ancillary device fails or reaches a predetermined level of remaining lifetime. For example, the control system 101 may predict the lifetimes for several devices as described above and emails or texts maintenance personnel one week before an expected failure. Further, the control system 101 may email or text a manager or overseer when a fault occurs so that the conveyor system 100, 100A can be shutdown to avoid additional damage.

Figure 13A:
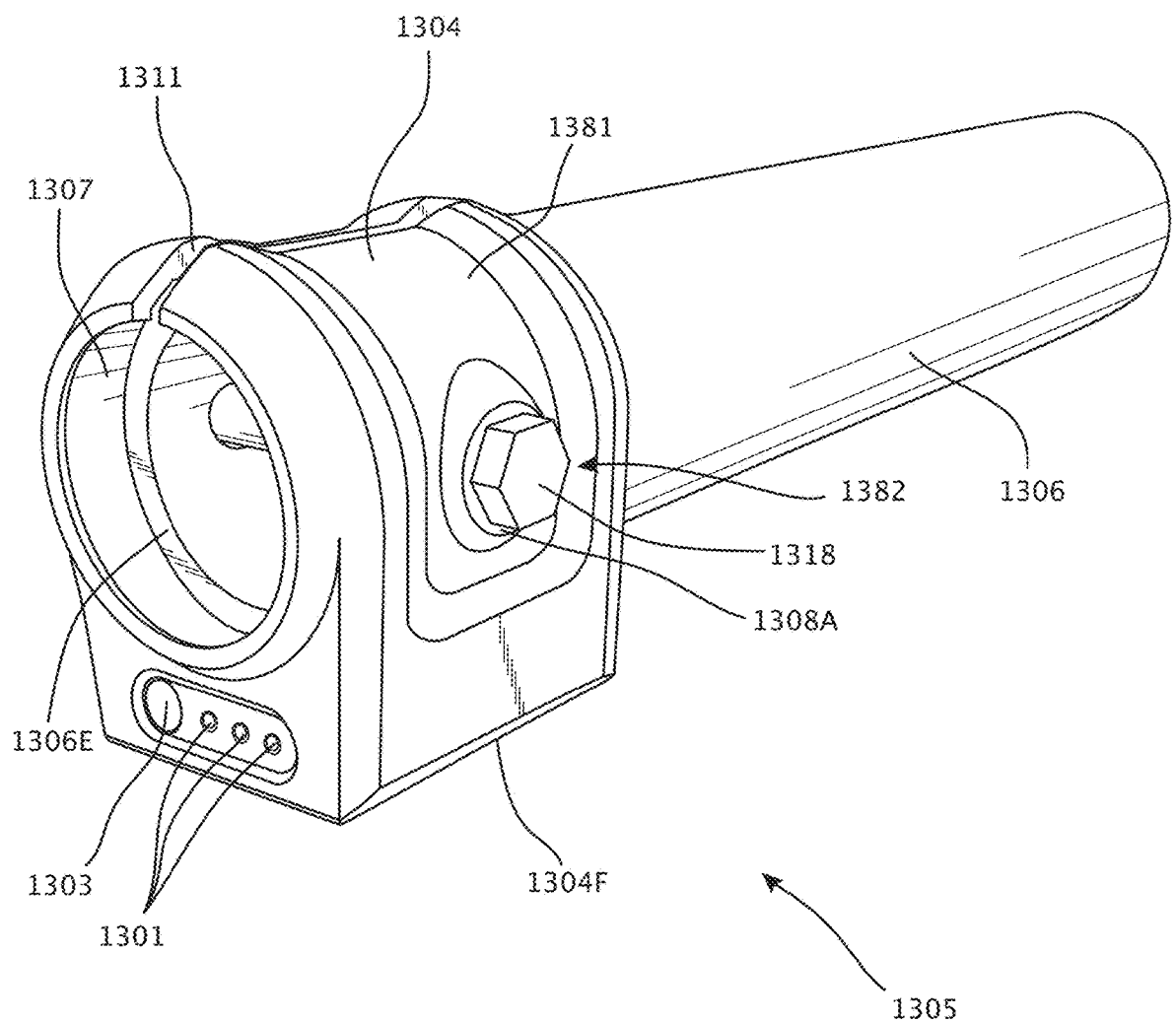
FIGS. 13A, 13B, and 13C are, respectively, a perspective view, a cross-sectional view, and an exploded view of a self-contained sensor module for use in the conveyor system of FIG. 1A or FIG. 1C.
Figure 13B:
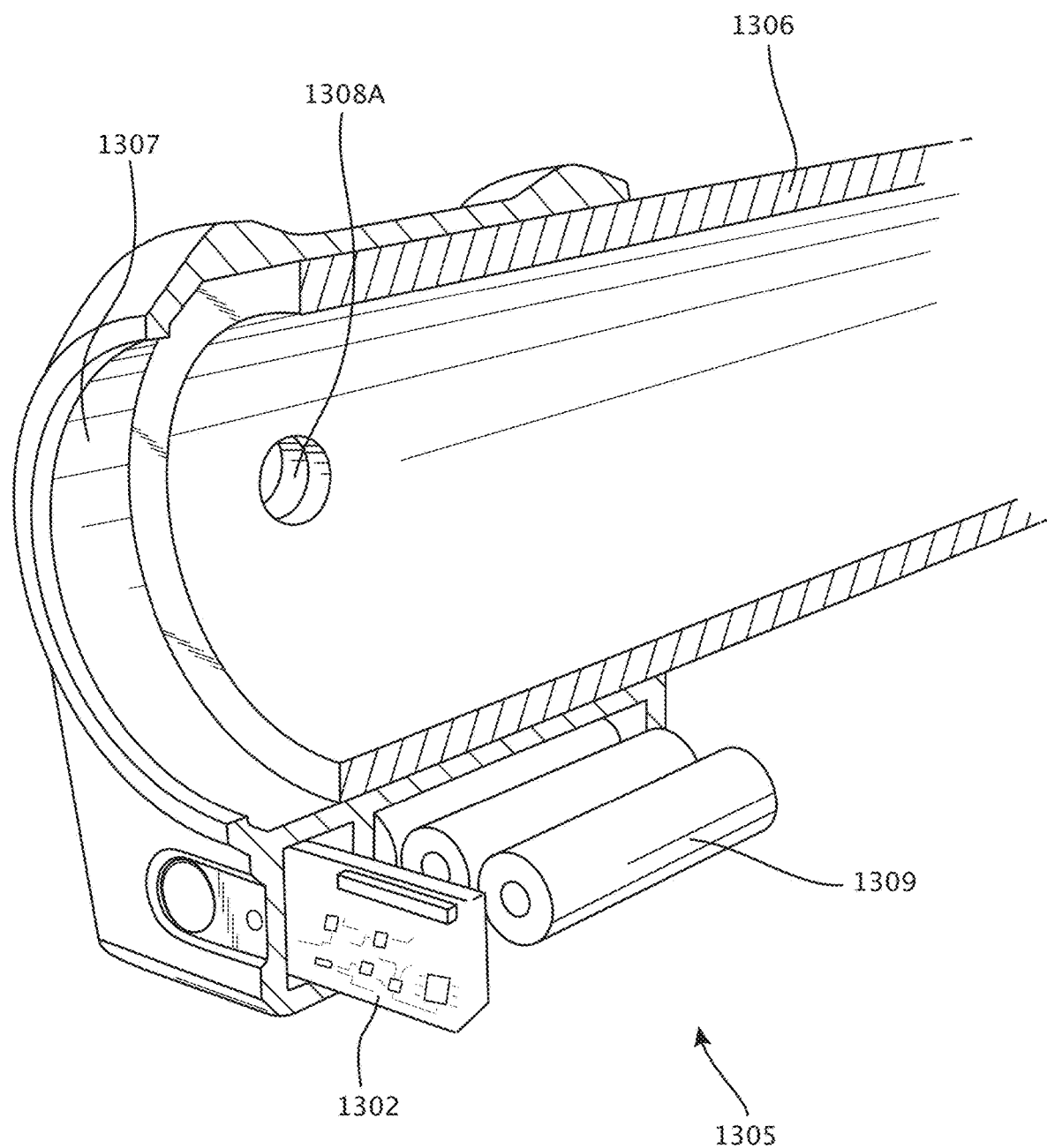
Figure 13C:
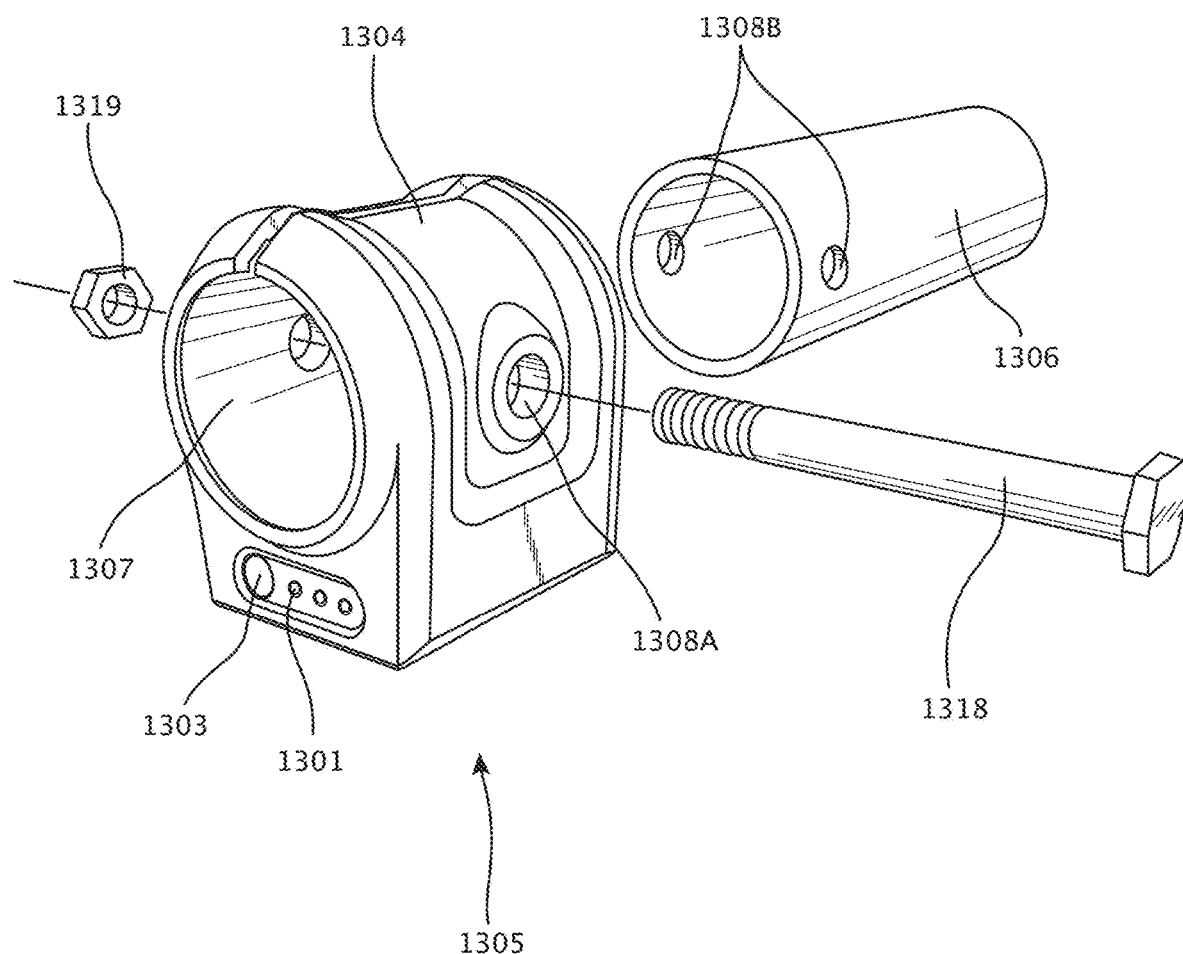

FIGS. 13A-13C illustrate a sensor module 1305 having a sensor circuit 1302 inside of a housing 1304 configured to couple to a base member of a conveyor belt cleaner 120, such as a support pole 1306. The sensor module 1305 operates in a manner similar in many respects to the sensor module 122 discussed above and the sensor circuit 1302 is similar to the sensor circuit 1800. The sensor module 1305 includes a housing 1304 having a generally annular shape with an outward extending projection which houses the sensor circuit 1302. The housing 1304 has a central opening 1307 and an annular sleeve portion 1381 extending around the central opening 1307 configured to receive an end portion 1306E of the support pole 1306. In one form, the sleeve portion 1381 includes a slit 1311 extending the entire length of the sleeve portion 1381. The sleeve portion 1381 of the housing 1304 can deflect because of the slit 1311 to fit snugly over different sized support poles 1306. In one form, the housing 1304 permits access to the interior of the support pole 1306, such as through the central opening 1307, so that the interior of the support pole 1306 may be cleaned.

In one form, the sensor module 1305 is mounted at the end portion 1306E of the support pole 1306. In another form, the sensor module 1305 is slid farther onto the support pole 1306. The position of the sensor module 1305 along the support pole 1306 can effect the movement of the sensor module 1305 and the associated data provided by the sensor module 1305. For example, the distal end portion 1306E of the support pole 1306 can have a larger amplitude of movement than a portion of the support pole 1306 closer to the associated mount connecting the support pole 1306 to the conveyor frame 103. The harmonics of the support pole 1306 may also impact the movement of the sensor module 1305. If the sensor module 1305 is positioned proximate a harmonic node of the support pole 1306, which is a position on the structure where vibration is minimized, the sensor module 1305 will experience less vibration than a sensor module 1305 spaced from the harmonic nodes.

In one form, the housing 1304 includes a coupling assembly 1382 configured to fix the sensor module 1305 to the support pole 1306. In one form, the coupling assembly 1382 includes a fastener such as a bolt 1318 configured to extend through bolt holes 1308A of the housing 1304 and bolt holes 1308B of the support pole 1306. The coupling assembly 1382 may also include a nut 1319 that engages a threaded shank of the bolt 1318. Tightening of the nut 1319 onto the bolt 1318 clamps the sleeve portion 1381 around the support pole 1306, reduces the width of the slit 1311, and fixes the sensor module 1305 to the support pole 1306. This clamps the housing 1304 on the support pole 1306 and resists turning of the housing 1304 about the support pole 1306 and axial movement of the housing 1304 along the length of the support pole 1306. In another form, at least one of the holes 1308A, 1308B is threaded so as to threadingly engage the bolt 1318.

In one form, the housing 1304 has at least one substantially flat side 1304F. When the sensor module 1305 is detached from the base member 1306, the sensor module 1305 may be positioned on the substantially flat side 1304F thereof to reduce instances of rolling away or rolling off of the surface on which the sensor module 1305 is resting.

Figure 14:
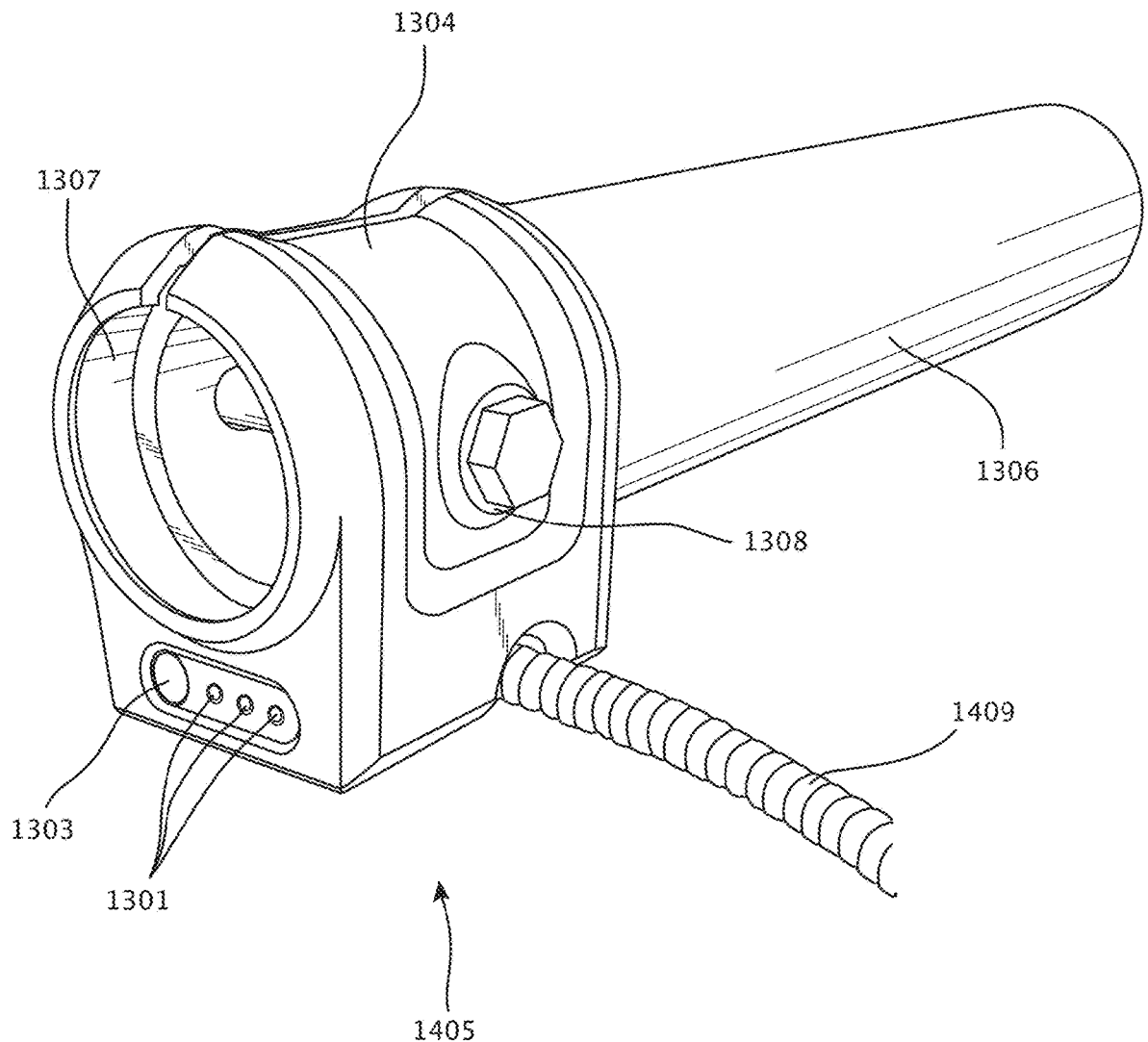
FIG. 14 is a perspective view of the sensor module of FIG. 13 having a power cord.

With reference to FIG. 13B, the sensor circuit 1302 includes a communication module, and, in some embodiments, a processor. The sensor module 1305 further includes a power source, such as batteries 1309. Alternatively or additionally, the power source can be a power cable, such as the cable 1409 in FIG. 14. In some forms, the batteries 1309 are kept in a separate compartment of the housing 1304 than the compartment used to house the sensor circuit 1302 and other electronic components. This separation protects the electronics during movement of the batteries, overheating of the batteries, or rupture of the batteries. In one form, the sensor circuit 1302 of the sensor module 1305 includes wireless communication circuitry including an antenna located outside of the support pole 1306 to reduce interference in the wireless connection.

In some forms, the sensor module 1305 includes an indicator 1301 configured to display one or more conditions of the sensor module 1305. Example conditions to be displayed include battery life, signal strength or connectivity, and calibration. The sensor module 1305 may include a manual input, such as a button 1303. The button 1303 may be used to control one or more functions of the sensor module 1305, such as resetting the wireless connection, resetting one or more sensors of the sensor module 1305, and displaying monitored conditions using the indicators 1301.

The sensor module 1305 may be configured for particular applications. For example, if the sensor module 1305 is to be installed outdoors, the housing 1304 may have a bright color such as white to reduce heating of the sensor module 1305 by sunlight. The housing 1304 is formed of a rigid material to reduce the risk of breaking in the harsh environments of the conveyor systems 100, 100A. Exemplary materials include rigid composites, metal alloys, metals, and/or plastics. The housing 1304 may be a thick-walled structure to provide robustness. One or more portions of the housing 1304 may be sealed to resist ingress of materials. In a preferred form, the housing 1304 has an ingress protection ("IP") rating of at least 54 (dust rating of 5, water rating of 4). In a more preferred from, the housing 1304 has an IP66 rating.

Figure 15:
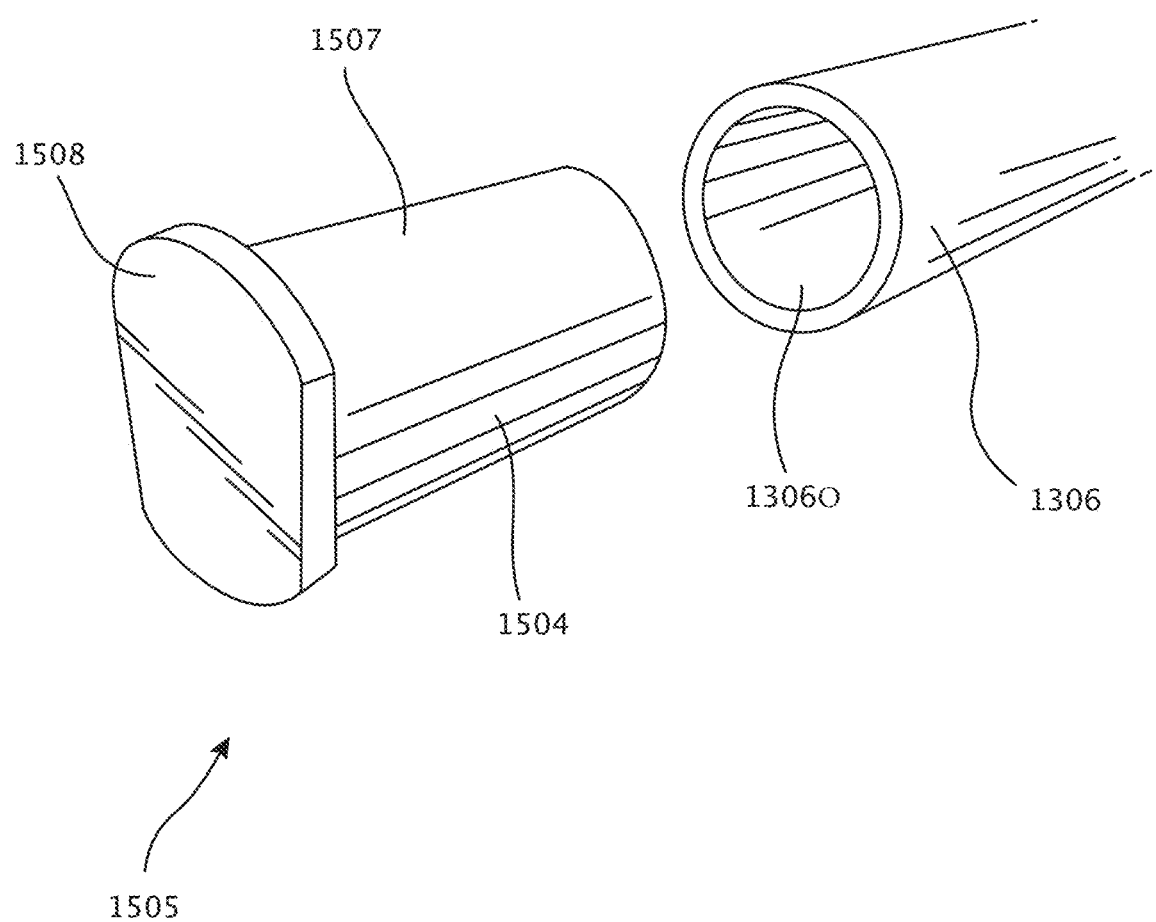
FIG. 15 is a perspective view of a sensor module for use in the conveyor system of FIG. 1A or FIG. 1C, the sensor module having a body member sized to fit within a support pole of one of the conveyor belt cleaners of the conveyor belt system.

With reference to FIG. 15, a sensor module 1505 is provided that is similar in many respects to the sensor module 1405 discussed above. One difference between the sensor modules 1405, 1505 is that the sensor module 1505 includes a housing 1504 that extends at least partially into an opening 13060 the support pole 1306. The housing 1504 includes a first portion or plug portion 1507 sized and configured to fit into the opening 13060 of the support pole 1306 and form a plug-fit therewith. The housing 1504 further includes a second portion or flange plate portion 1508 that extends radially beyond the outer surface of the plug portion 1507 such that the flange portion 1508 forms a stop during insertion, preventing the sensor module 1505 from being fully inserted into the support pole 1306.

Inserting the insertion portion 1507 of the housing 1504 into the support pole 1306 reduces the space taken up by the assembly as well as provides additional protection for the portion of the sensor module 1505 inside the support pole 1306. The sensor module 1505 includes a sensor circuit similar to the sensor circuit 1800 and includes similar components, e.g., sensor(s), power sources, antennae, processor(s), etc., and thus can be used as the sensor modules 112, 122, 132, and 142 described above. As with the sensor module 122, in one form the antenna of the sensor module 1505 is positioned outside of the support pole 1306 to reduce interference therewith.

Figure 20A:
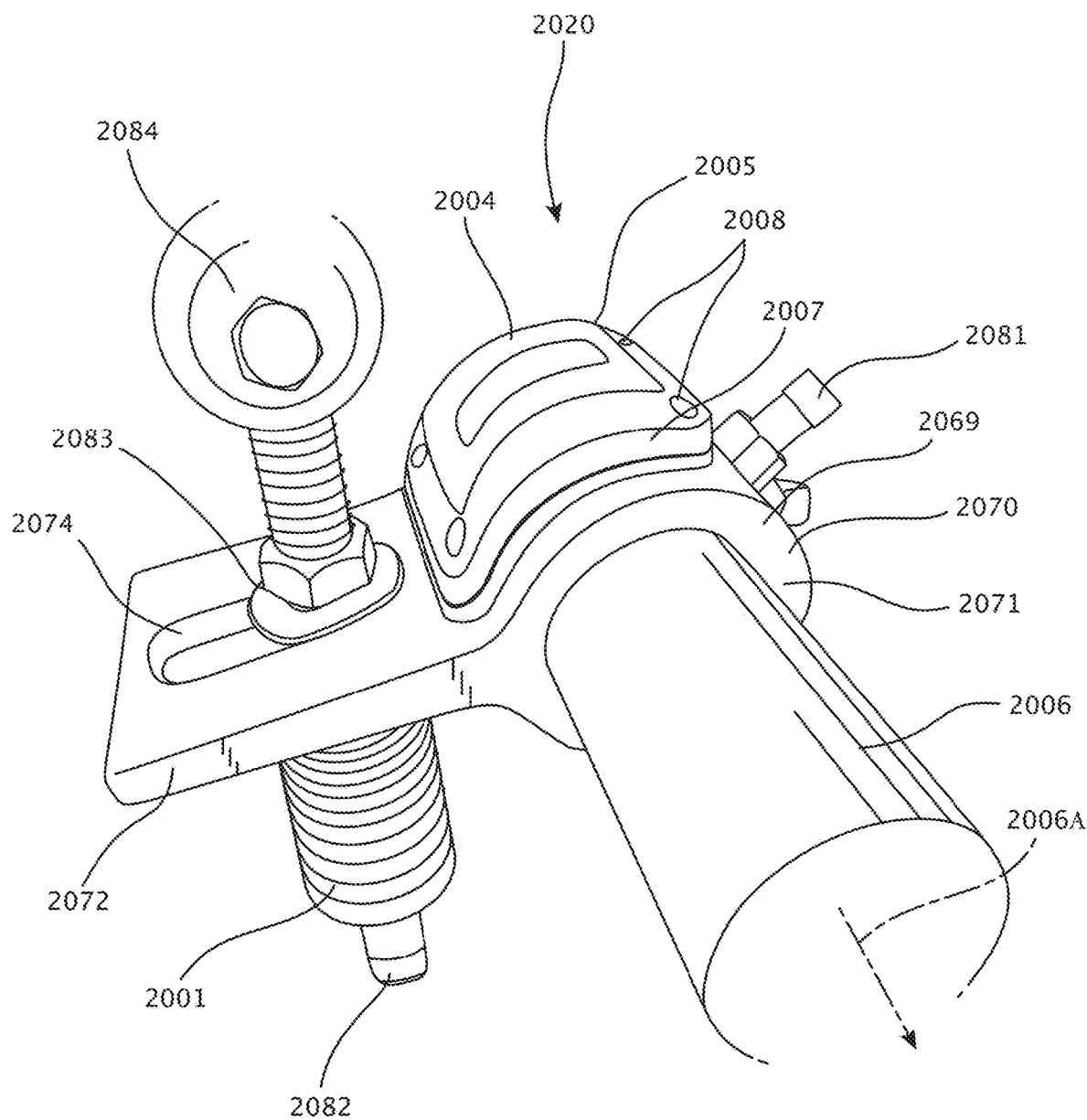
FIG. 20A is a perspective view of a sensor module mounted on a tension bracket of a conveyor belt cleaner for use in the conveyor system of FIG. 1A or FIG. 1C.
Figure 20B:
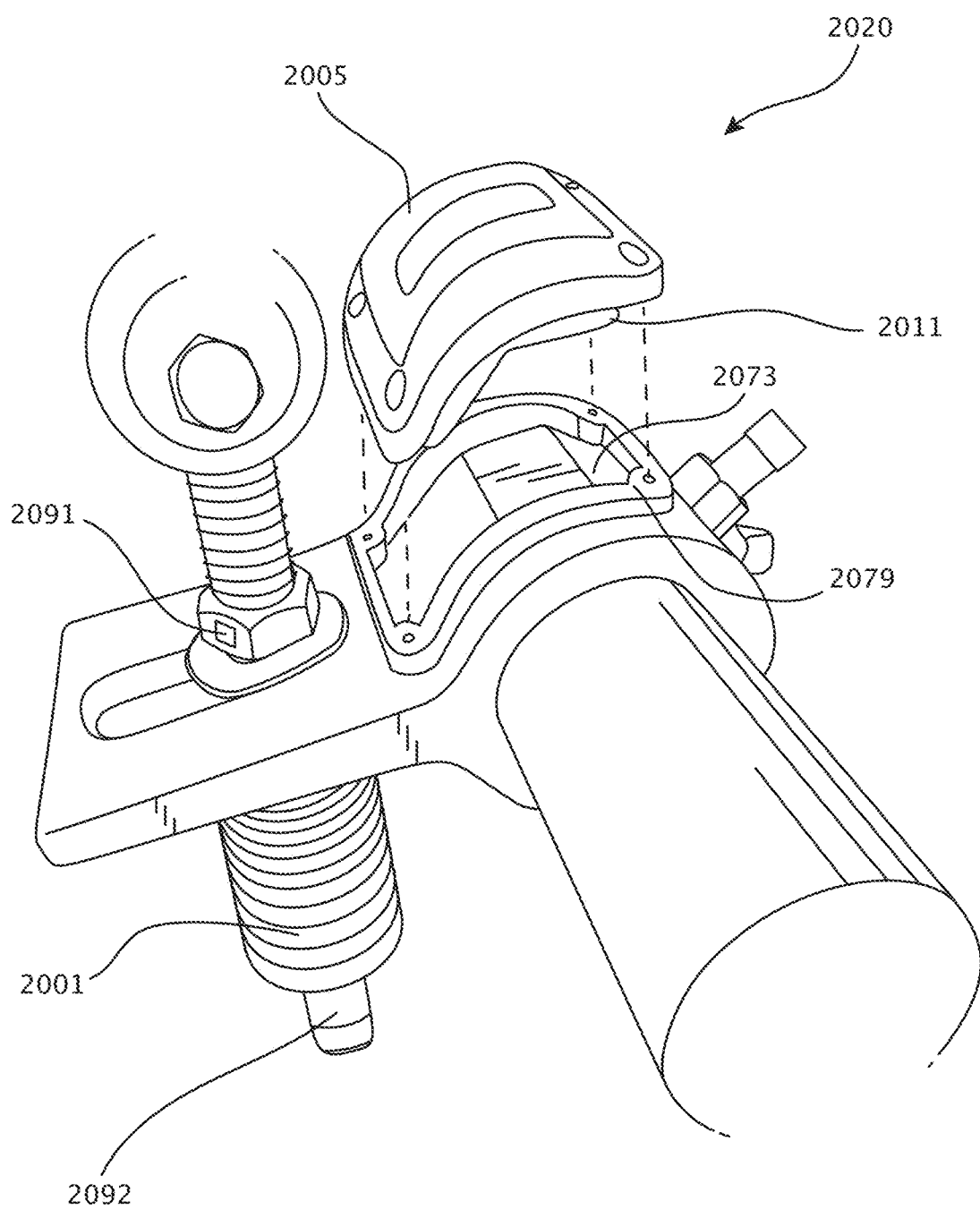
FIG. 20B is an exploded view of the tension bracket and sensor module assembly of FIG. 20A.

FIGS. 20A-20B illustrate a portion of a belt cleaner 2020 that includes a support pole 2006 and mounts 2069 for resiliently urging a scraper blade of the belt cleaner 2020 against a conveyor belt. Each mount 2069 includes a tension bracket 2070 and a sensor module 2005. The tension bracket 2070 is coupled to the support pole 2006 by a set screw or bolt 2081 such that rotation of the support pole 2006 about a central, longitudinal axis 2006A of the support pole 2006 causes the tension bracket 2070 to rotate.

The tension bracket 2070 includes a first portion, such as a sleeve portion 2071, configured to fit over an end of the support pole 2006 and a second portion, such as a wing portion 2072, extending radially therefrom. The bolt 2081 extends through the annular portion 2071. In some forms, the support pole 2006 and the sleeve portion 2071 have a slot and key engagement to restrict rotation of the tension bracket 2070 relative to the support pole 2006.

The wing portion 2072 includes an opening such as a slot 2074. Each mount 2069 further includes a bolt 2082 extending through the aperture 2074 and a spring 2001 extending along a portion of the bolt 2082. The spring 2001 engages the wing portion 2072 to apply a biasing force against the tension bracket 2070 and impart a torque on the support pole 2006. In one form, the mount 2069 includes a stop 2083, such as a nut engaged with the bolt 2082 and a washer, limiting the distance which the tension bracket 2070 can turn about the axis 2006A. The bolt 2082 further includes attachment structure 2084 configured to couple to the conveyor frame 103.

The sensor module 2005 is mounted to the tension bracket 2070. Mounting the sensor module 2005 on a critical component of the belt cleaner 2020, such as the tension bracket 2070, reduces the likelihood of the sensor module 2005 being inadvertently left off of the belt cleaner 2020 after maintenance. Turning to FIG. 20B, the tension bracket 2070 includes a wall 2079 defining a recess 2073. The sensor module 2005 includes a housing 2004 having a base portion 2011 shaped and sized to be received within the recess 2073. The housing 2004 further includes an enlarged, upper portion 2007 having a flange 2007 configured to rest on top of the wall 2079. Fasteners such as screws or bolts 2008 extend through the flange 2007 into the wall 2079 to releasably secure the sensor module 2005 to the tension bracket 2070. Other approaches may be used such as straps or welds.

The sensor module 2005 is substantially similar to the sensor modules 122, 1305, and 1405 described above. The housing 2004 includes an internal cavity housing a sensor circuit similar to the sensor circuit 1800. The sensor circuit includes a sensor, wireless communication circuitry, and one or more sensors, such as a gyroscope and an accelerometer. The processor receives data from the sensors and transmits the received data via the wireless communication circuitry as described above. The sensor module 2005 may also include a power source. In one form, the power source is one or more batteries. The batteries are positioned in the housing 2004. In some forms, the batteries are in a separate cavity from the sensor circuit.

In operation, the accelerometer and/or gyroscope measures rotation of the tension bracket 2070 about the axis 2006A. From this rotation, a processor, such as a processor of the control system 101, determines the status of the belt cleaner 2020 and the conveyor system 100. For example, the orientation of the tension bracket 2070 can be used to determine the state of wear on the scraper blades as described above.

Unlike the sensor modules 122, 1305, 1405 described above, the sensor module 2005 may not extend past the end of the support pole 2006. This shortens the overall length of the belt cleaner assembly 2020. Moving the sensor module 2005 from the end of the support pole 2006 may also protect the sensor module 2005 from being impacted when something hits the end of the support pole 2006. In one form, the sensor module 2005 does not block or restrict access to the end of the support pole 2006 and the interior thereof.

In some forms, an existing belt cleaner is retrofitted with the sensor module 2005. The existing tension bracket is replaced with a tension bracket 2070 having the sensor module 2005. The support pole 2006 does not need to be replaced or modified, as the sleeve portion 2071 is configured to couple to existing support poles 2006.

With reference to FIG. 20B, in one form the tension of the belt cleaner 2020 may be measured by a distance between portions 2091 and 2092 of a sensor associated with the sensor module 2005. The sensor portions 2091 and 2092 are positioned proximate opposite ends of the spring 2001. The distance between the sensor portions 2091 and 2092 is detected, as the length of the spring 2001 may be used to calculate the force being exerted thereby. In some forms, the sensor portions 2901 and 2902 are positioned in the stop 2083 and the bolt 2082 respectively. The sensor portion 2091 may be a sensing component and the sensor portion 2092 may be a sensed component. In some forms, the sensed portion 2092 includes a permanent or electric magnet and the sensing portion 2091 includes a sensor configured to detect the magnetic field created by the sensed portion 2092. The strength of the magnetic field detected corresponds to the distance therebetween.

In some forms, the sensor module 2005 includes an anti-tampering sensor or switch. The anti-tampering switch is configured to detect when the sensor module 2005 is removed from the tension bracket 2070. When the sensor module 2005 is removed, the processor of the sensor modules 2005 operates the wireless communication circuitry thereof to transmit an alert to the central control system 101 and/or a user device. In one embodiment, the anti-tampering sensor or switch is a magnetometer, a reed switch, or a mechanical switch that is operated when the sensor module 2005 is removed from the tension bracket 2070.

Alternatively or additionally, the cloud computing system 105 identifies tampering using the sensor data from the sensor module 2005. For example, a large spike in acceleration followed by data inconsistent with expected acceleration values indicates that the sensor module 2005 was knocked off of the belt cleaner 2020. The cloud computing system 105 transmits an alert to the central control system 101 and stops processing data from the tampered with sensor module 2005 until a user input indicates that the sensor module 2005 has been reinstalled on the belt cleaner 2020.

The sensor module 2005 is coupled to a belt cleaner 2020. In other forms the sensor module 2005 can be coupled to other ancillary devices having a similar recess 2073.

While the support poles in FIGS. 2A-2B, 13A-15, and 20A-20B are shown as being cylindrical, it is understood that differently shaped support poles can be utilized by altering the shape of the housings 1304, 1504, 125 of the sensor modules 1305, 1505, 122. For example, the housings 1304, 1504, 125 can be shaped and configured to couple to square tubing, flat iron, or angle iron base members.

Figure 17A:
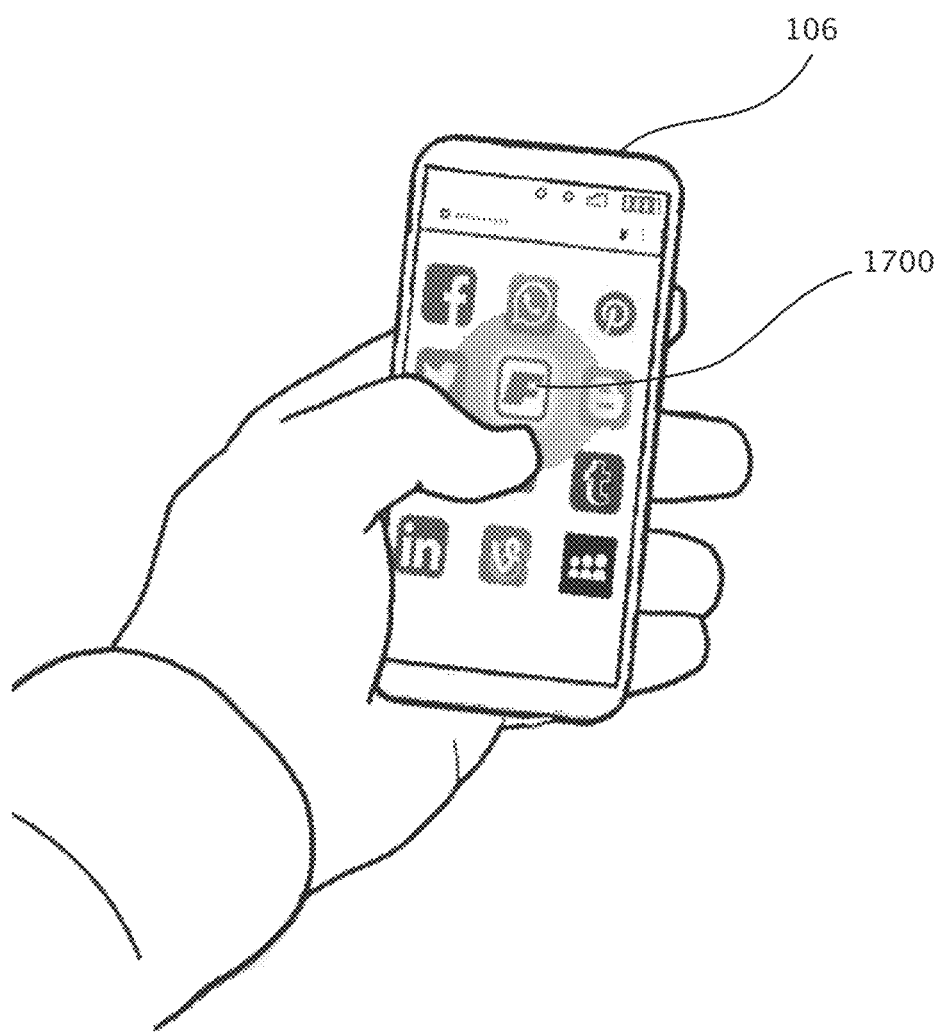
FIGS. 17A, 17B, and 17C illustrate a method for monitoring the condition of a conveyor belt of the conveyor system of FIG. 1A or FIG. 1C.
Figure 17B:
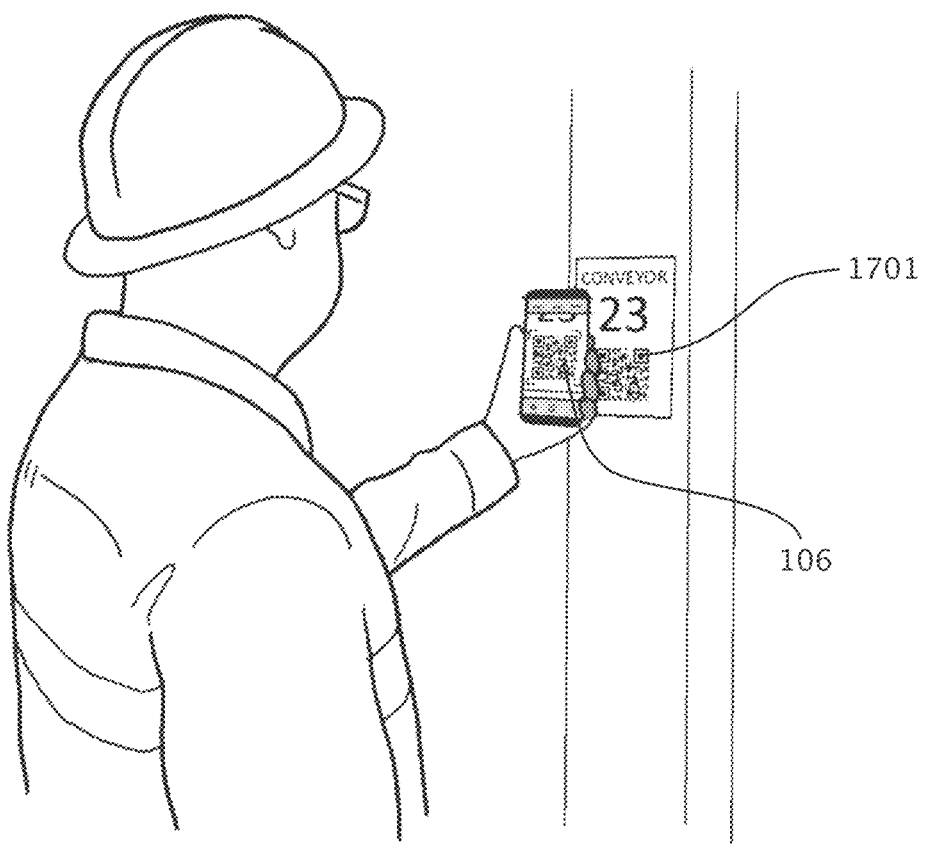
Figure 17C:
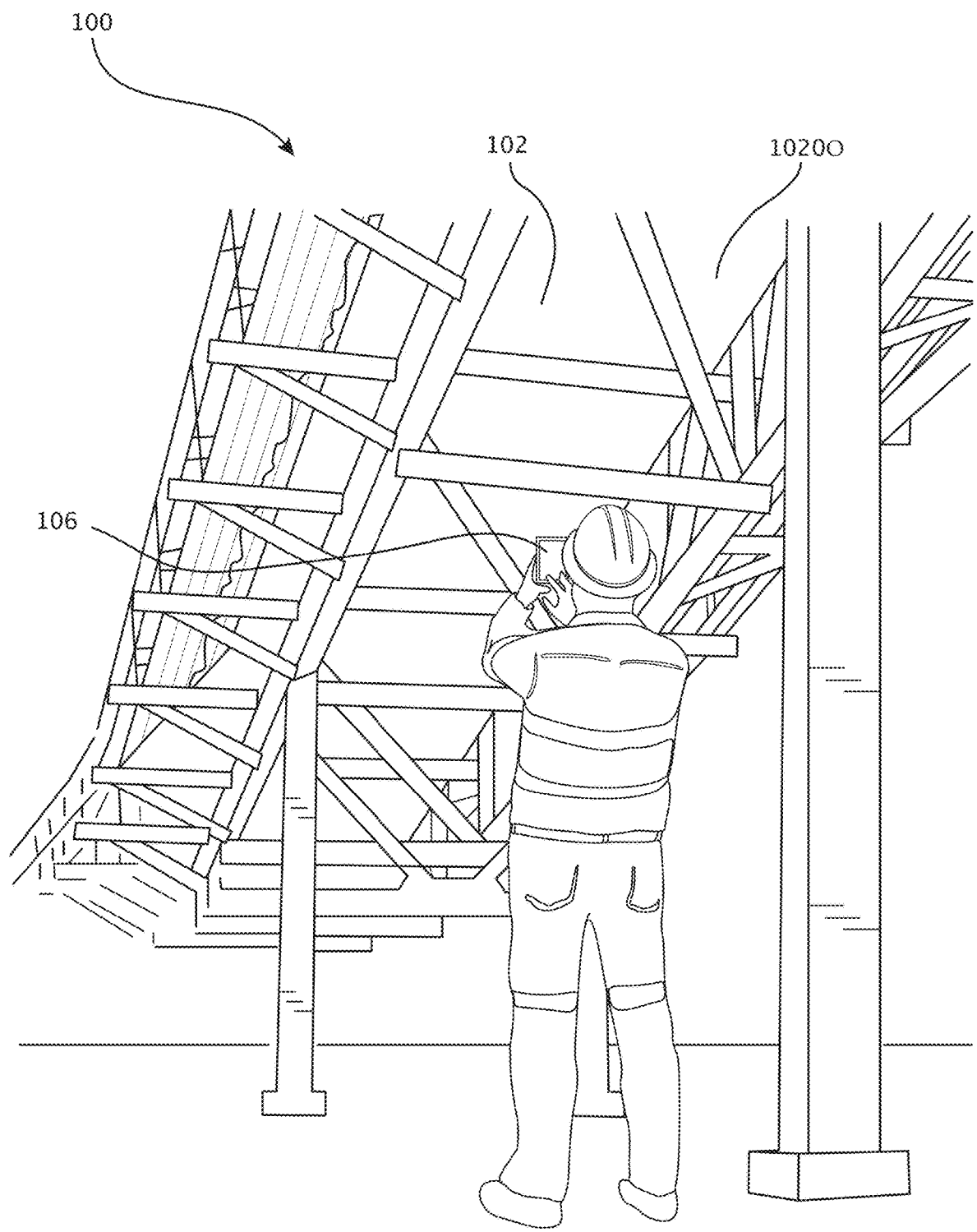

Regarding FIGS. 17A-17C, a method is provided for monitoring the condition of the belt 102 of the conveyor system 100, 100A at a facility. A user opens the conveyor monitoring application 1700 on the smartphone 106 or other mobile computing device such as a tablet computer. The tablet or smartphone 106 includes a camera. The user then inputs his location in the facility, such as an identification number of the conveyor belt 102 being inspected. In one approach, the user inputs the identifying information of the location and/or conveyor belt 102 by scanning a bar code, RFID tag, or QR code 1701 mounted on or near the conveyor system 100 with the smartphone 106 as shown in FIG. 17B.

Turning to FIG. 17C, the user takes one or more pictures, and/or records a video, of the outer surface 1020 of the return run of the belt 102. The picture and/or video is then transmitted by the smartphone 106 to the cloud-based computing system 105 and/or the control system 101. A processor of the control system 101 compares the photograph or video to stored sample images to identify signs of wear in the belt 102. In some forms, the processor estimates the remaining lifespan of the belt based on the identified signs of wear and transmits displays the estimates using the computer 107 discussed above and/or by transmitting the estimate to the smartphone 106. Alternatively or additionally, the control system 101 compares the signs of wear to a stored maximum and alerts one or more users if the belt 102 exceeds the threshold amount of wear. The pictures or videos can also be used to identify carryback on the return side of the belt. Carryback is material that remains stuck to the belt 102, and thus is carried by the belt 102 along the return side of the conveyor belt to the beginning of top run 201 (see, FIG. 1C).

In some forms, the pictures and/or videos of a conveyor belt are stored in memory and/or transmitted, such as by email or multimedia message, to a remote inspector such that the remote inspector can determine the condition of the belt without physically going to the location of the belt. In some forms, the remote inspector assigns a numerical score to the belt based on the condition and/or amount of carryback. The picture and/or video of the belt is stored in a database along with the corresponding score. Future pictures and/or videos of conveyor belts are compared to those stored in the database by the central control system 101 to approximate the score. Overtime, the database grows bigger and thus the approximations grow more accurate as there are more samples with which to compare.

Figure 23:
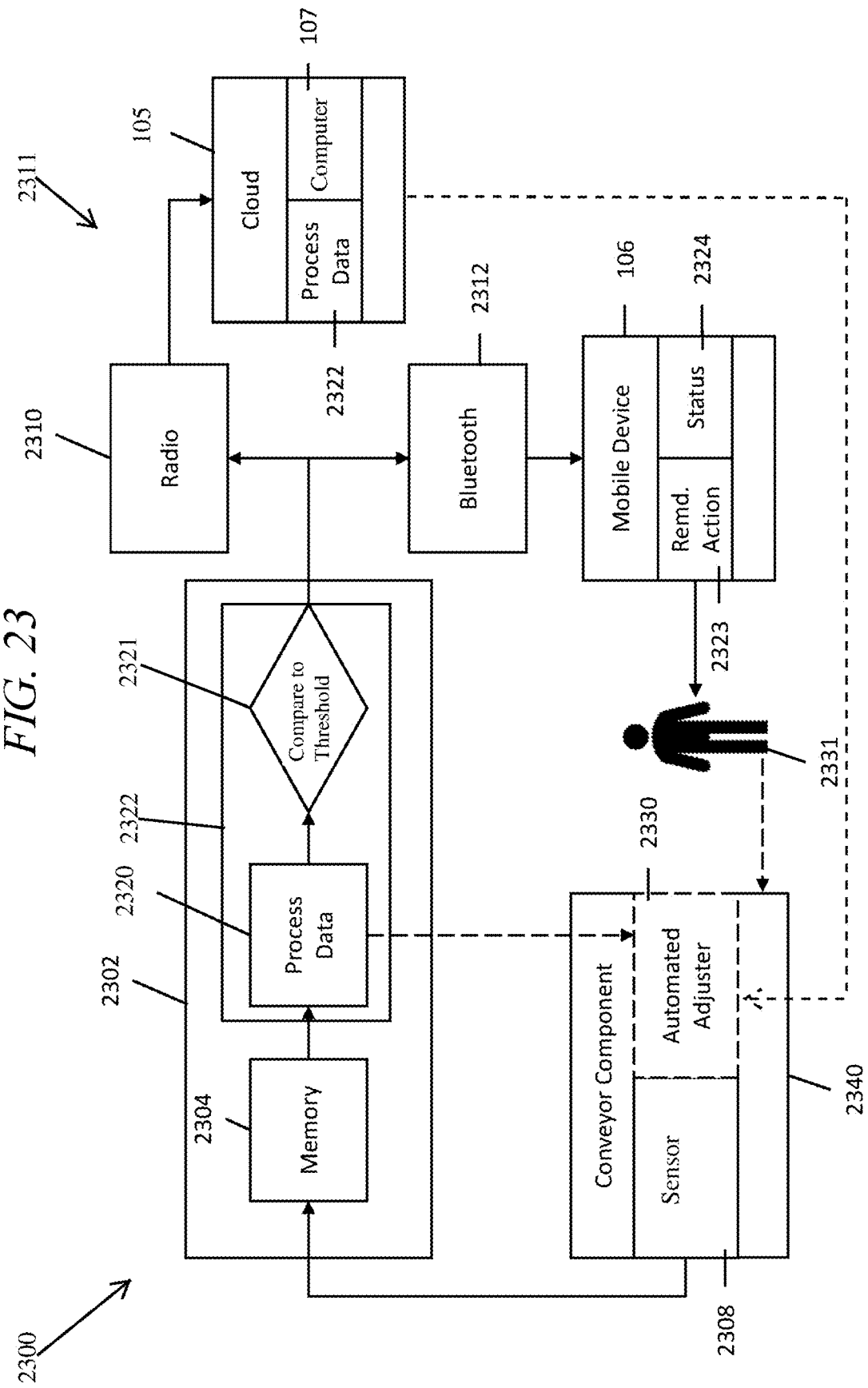
FIG. 23 is a block diagram of a system for monitoring an ancillary device of a conveyor system.

FIG. 23 illustrates a system 2300 for monitoring the condition of a conveyor component 2340 that is similar in many respects to the systems 10, 400 discussed above. The conveyor component 2340 is one of the ancillary devices described above, such as a belt cleaner, idler roller, belt tracker, or impact bed. A sensor 2308 is configured to detect one or more characteristics of the conveyor component 2340. In one form, the sensor 2308 includes an accelerometer mounted on or near the conveyor component 2340 so as to detect vibration and/or movement thereof. For example, the sensor 2308 may include an accelerometer mounted on the support pole of a belt cleaner with sensor 2308 being configured to detect impacts between the one or more scraping blades of the belt cleaner and imperfections, irregularities, or interruptions along the surface of a conveyor belt such as a splice of the conveyor belt.

The sensor 2308 may include a microphone configured to detect the sound produced by an ancillary device. Changes in the sound produced by the ancillary device may indicate a change in one or more characteristics of the ancillary device. For example, the microphone may detect chatter from a scraper blade or the sound of a failed bearing in an idler roller. As another example, the microphone may detect the change in sound of material traveling down a chute which occurs as the chute fills with conveyed product.

The sensor 2308 outputs data representing the measured characteristics to a controller or processor circuitry 2302. In one embodiment, the sensor 2308 and the processor circuitry 2302 are components of a sensor module like those discussed above. In another embodiment, the sensor 2308 is associated with the conveyor component 2340, and the processor circuitry 2302 is included with a separate device in communication with the sensor 2308.

The processor circuitry 2302 includes a memory 2304 and a processor 2322. The memory 2304 may store data from the sensor 2308 representative of one or more characteristics of the conveyor component 2340. The processor 2322 is configured to perform operations on data from the sensor 2308. The operations include a step 2320 of processing the data to determine one or more characteristics of the conveyor component 2340 and a step 2321 of comparing the one or more characteristics to one or more thresholds. In some forms, the threshold values are uploaded to the processor circuitry 2302 and stored in the memory 2304, such as during manufacturing, setup, or installation. In alternative forms, the threshold values are calculated by the processor circuitry 2302 based on measured parameters and/or historical sensor data.

The step 2321 of comparing the one or more characteristics to one or more thresholds may include determining whether a characteristic is above a threshold, below a threshold, or outside of a range between upper and lower thresholds. If the one or more characteristics exceeds the threshold, the processor circuitry 2302 utilizes communication circuitry 2311, such as a radio transceiver 2310 and/or a Bluetooth transceiver 2312, to output a signal to a remote computing device such as the cloud-based computing system 105. The radio transceiver 2310 utilizes radio communication to communicate over the internet with the cloud-based computing system 105. The radio transceiver 2310 may connect to the internet using WiFi or cellular communication as described above. The Bluetooth transceiver 2312 is a short range wireless transmitter or transceiver, such as a Bluetooth® or BLE transceiver. The Bluetooth transceiver 2312 communicates with nearby wireless devices, such as a mobile device 106.

In some forms, the data output by the communication circuitry 2311 is encrypted or secured. In one form, the system 2300 utilizes highly secure data transmission, such as Transport Layer Security 1.2 (TLS1.2).

The cloud-based computing system 105 stores historical data from the sensor 2308. The cloud-based computing system 105 processes 2322 the data to identify trends. The trends are used to predict properties such as the remaining operating lifetime of the conveyor component 2340. A user can access the information stored on the cloud-based computing system 105 through a user interface of the computer 107. In one embodiment, the computer 107 provides data from the cloud-based computing system 105 to the user via a website displayed on one or more screens of the computer 107. In another embodiment, the computer 107 receives messages from the cloud-based computing system 105, such as through an email client. In still further examples, the computer 107 includes software that facilitates communication with the information stored on the cloud-based computing system 105. Using the computer 107, a user can see both the raw data from the sensor 2308 as well as data calculated from the raw data. The calculated data may be, for example, predicted remaining lifetime of the component 2340 and/or instances of readings exceeding the threshold. In some forms, the computer 107 receives inputs from the user to order parts for the conveyor component 2340 and/or to schedule maintenance on the conveyor component 2340.

The cloud-based computing system 105 stores data from sensor modules 2308 on a plurality of conveyor components 2340. For example, sensor data from the plurality of components 2340 associated with the same conveyor belt can be used to identify which component 2340 needs to be adjusted. As an example, if the cloud-based computing system 105 knows the belt speed and the distance between upstream and downstream belt cleaners with sensor modules 2308, the cloud-based computing system 105 may determine a timeframe to expect an impact of a splice against the downstream belt cleaner after the splice has impacted the upstream belt cleaner. If the impact of the splice against the downstream belt cleaner is sufficiently greater than the impact of the splice against the upstream belt cleaner, the downstream belt cleaner may be over-tensioned and the cloud-based computing system 105 can direct a maintenance worker to adjust the downstream belt cleaner.

Further, the data from sensor modules 2308 from the conveyor components may be processed 2322 together to identify larger trends. For example, sensor data from a plurality of components 2340 associated with the same conveyor belt can be used to identify faults in the conveyor belt, such as a faulty splice, a tear, or a dirty belt. Further, the data from the plurality of components 2340 is also used to generate predictive rates of wear in the components 2340 and provide more accurate remaining operating lifetime predictions.

The mobile device 106 serves as a user interface through which a user 2331 can access data from the processor circuitry 2302. The data includes status information 2324 regarding the conveyor component 2340. In some forms, the data further includes recommended actions 2323. For example, if in processing 2320 the raw data from the sensor 2308, the processor unit 2302 determines that the conveyor component 2340 requires maintenance, the recommended action information 2323 conveys a suggested maintenance action for the user 2331 to take. In one illustrative example, the processor unit 2302 processes accelerometer data from sensor 2308 to determine whether the tension of the conveyor component 2340 (e.g. a belt cleaner) is between stored thresholds. If not, the processor circuit 2302 outputs to the mobile device 106 a suggestion for the user to tighten or loosen the belt cleaner 2340 to adjust the tension and get the tension of belt cleaner between the set thresholds.

In some forms, the conveyor component 2340 includes an automated adjuster 2330. In examples in which the conveyor component 2340 is a belt cleaner, the automated adjuster 2330 is an actuator for adjusting the scraper blades relative to the belt. When the processor 2322 detects that the tension of the belt cleaner is not within the desired range, as described above, the processor unit 2302 may operate the automated adjuster 2330 to adjust the tension of the belt cleaner. The conveyor component 2340 may include other ancillary devices such as an impact bed, a belt tracker, and a feed chute.

The operation of one conveyor component 2340 may affect other conveyor components 2340. For example, if the conveyor component 2340 is a belt cleaner, the processor unit 2302 may determine the associated conveyor belt is damaged based on data from the sensor 2308 of the conveyor component 2330. The processor unit 2302 may then operate the automated adjuster 2330 of other belt cleaners on the belt to cause the belt cleaners to move the scraper blades of the belt cleaners away from the damaged belt. In another embodiment, the cloud-based computing system 105 sends control signals to the automated adjuster 2330 and may control operation of the automated adjuster 2330 on one conveyor component 2340 and other conveyor components 2340 in response to adjustments to the one conveyor component 2340.

As another example, if the conveyor component 2340 is a belt cleaner, the processor unit 2302 may determine the associated conveyor belt is damaged based on data from the sensor 2308 of the conveyor component 2340. The processor unit 2302 may operate the automated adjusters 2330 of other conveyor components 2340 to stop conveying of material. For example, the processor unit 2302 may close a feed chute that supplies material onto the belt and/or stop operation of one or more conveyor belts such as the belt being cleaned by the conveyor component 2340, an upstream conveyor belt, and/or a downstream conveyor belt.

Figure 24A:
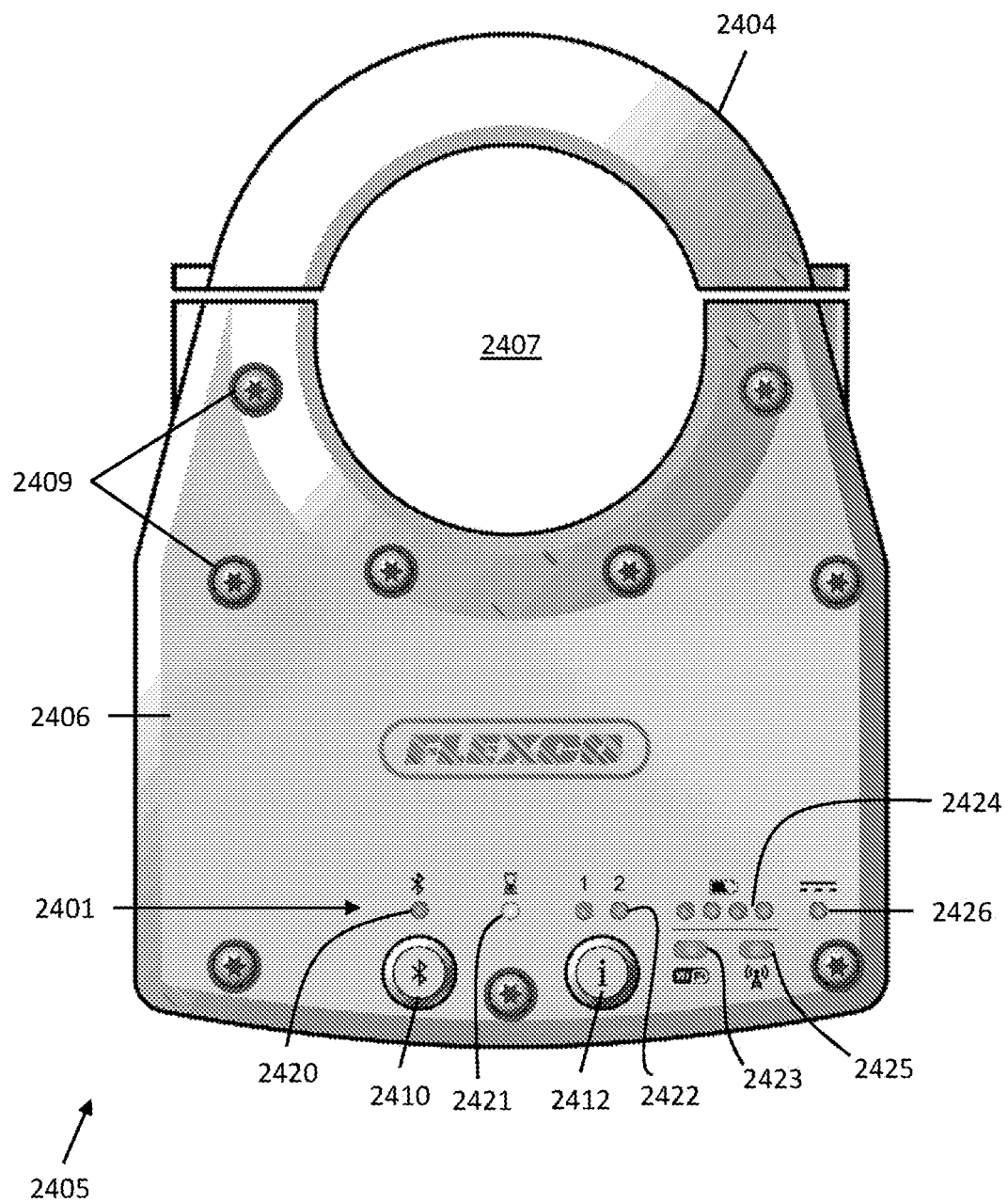
FIG. 24A is a front elevational view of a sensor module for being mounted to a support pole of a conveyor belt cleaner to monitor one or more characteristics of the conveyor belt cleaner.
Figure 24B:
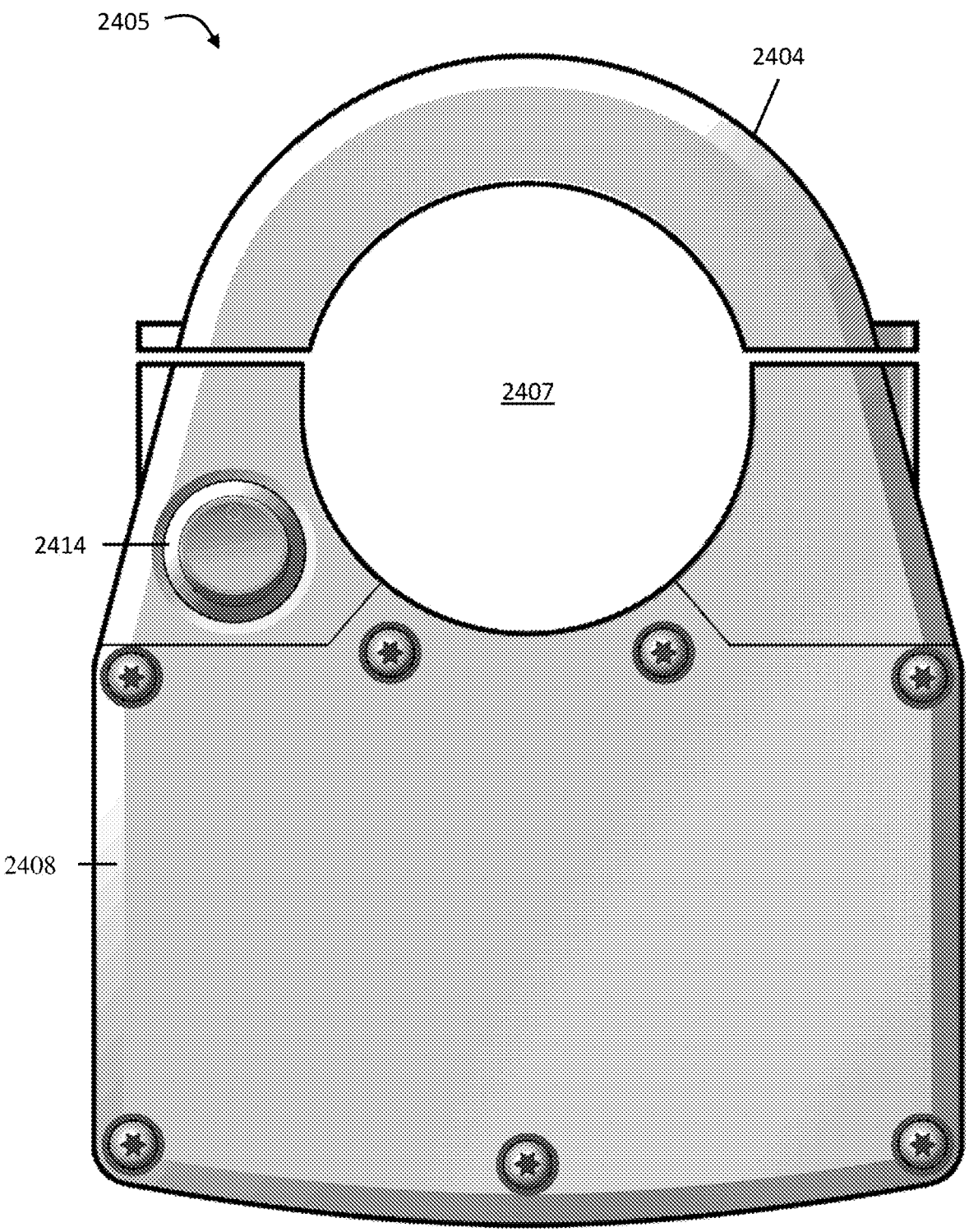
FIG. 24B is a rear elevational view of the sensor module of FIG. 24A.

FIGS. 24A-24B illustrate a sensor module 2405 configured to detect one or more operating characteristics of an ancillary device of a conveyor system. The sensor module 2405 is similar in many respects to the sensor module 1305 discussed above. The sensor module 2405 has a housing 2404 configured to detachably couple to a conveyor system. The housing 2404 has a through opening 2407 for receiving a portion of the ancillary device. In one embodiment, the opening 2407 is circular for coupling to a cylindrical support member, such as the support pole 1306 discussed above.

The housing 2404 encloses a sensor circuit similar to the sensor circuits described above. The sensor circuit is covered by a face plate 2406. The face plate 2406 is coupled to the sensor module 2405 by a plurality of screws 2409. The face plate 2408 includes a user interface 2401 communicatively coupled to the sensor circuit. The user interface 2401 has a plurality of user inputs, such as buttons 2410, 2412, 2414 (see FIG. 24B) and a plurality of outputs, such as status lights 2420, 2421, 2422, 2423, 2424, 2425, 2426.

In operation, the sensor module 2405 is communicatively coupled to a mobile device, such as a smartphone or tablet computer, during setup using a short range wireless communication protocol. The pairing button 2410 places the sensor module 2405 in a pairing mode such that the wireless connection can be established. In one form, the short range wireless communication protocol utilized is Bluetooth® or BLE. The pairing button 2410 causes the sensor module 2405 to output a pairing signal that can be detected by a mobile device to pair the devices.

A pairing indicator 2420 outputs information to the user during the pairing process. For example, holding the pairing button 2410 causes the sensor module 2405 to temporarily enter a pairing state in which a pairing signal is transmitted. While in the pairing state, the pairing indicator 2420 blinks to indicate to the user that the sensor module 2405 is outputting the pairing signal. Additionally or alternatively, the pairing indicator 2420 indicates whether or not a wireless connection is formed. For example, the pairing indicator 2420 may be illuminated when the sensor module 2405 is wirelessly paired to at least one mobile device.

The connection indicator 2421 indicates whether the connection between the sensor module 2405 and the mobile device is secure. For example, after a mobile device pairs to the sensor module 2405, the user must login on their mobile device. The connection indicator 2421 illuminates or blinks when the login has been confirmed and the transmission of data between the sensor module 2405 and the mobile device is initiated.

The sensor module 2405 connects to the internet using WiFi or cellular network communication and includes a WiFi indicator 2423 and a cellular indicator 2425. The WiFi indicator 2423 indicates the status of a WiFi internet connection. In one form, the WiFi indicator 2423 is a first color, such as green, when a WiFi connection to a local wireless network and the internet is established. The WiFi indicator 2423 is a second color, such as red, when there is no WiFi connection. In some forms, the WiFi indicator 2423 is a third color, such as yellow, when connected to the local wireless network (e.g., a wireless router or wireless modem) but not to the internet. In another embodiment, different types of illumination are used instead of different colors. For example, the WiFi indicator is not illuminated when no WiFi connection exists, is illuminated when an internet connection exists, and blinks when connected to a router or modem but not the internet.

The cellular indicator 2425 indicates the status of a cellular network connection, such as a LTE CAT-M1, NB-IoT, or GSM connection as described above. The cellular indicator 2425 operates in substantially the same manner as the WiFi indicator 2423. A first state, such as a first color or continuous illumination, indicates that the sensor module 2405 is connected to a cellular network and the internet. A second state, such as a second color or no illumination, indicates a lack of cellular network connection. A third state, such as a third color or intermittent illumination, indicates connection to a cellular network gateway, such as a cellular tower, but no internet connection.

The housing 2404 includes one or more batteries, similar to the batteries described in the sensor modules above. The housing 2404 includes a removable battery plate 2408 which covers the battery compartment. Removing the battery plate 2408 provides access to the power source compartment of the housing 2404 to allow the battery or batteries to be removed and replaced. The battery or batteries may include, for example, a single-use battery such as a battery having lithium-thionyl chloride cells, a rechargeable battery. The battery or battery may store energy received from solar cells.

Regarding FIG. 24A, the battery indicator 2424 indicates the charge of the battery. The battery indicator 2424 includes lights to show an approximate percent of charge remaining in the battery. For example, all four lights being illuminated indicates approximately 100% charge, three lights being illuminated indicates approximately 75% charge, two lights being illuminated indicates approximately 50% charge, and one light being illuminated indicates approximately 25% charge. In some forms, at least one of the lights of the battery indicator 2424 is operable to illuminate in at least two colors. Illuminating a single light in a second color indicates a critically low battery charge, such as less than 10%. In alternative embodiments, a different state of illumination is used instead of a different color, such as a single blinking light to indicate less than 10% charge remaining.

Alternatively or additionally to the battery, the sensor module 2405 includes a wired connection to a power source. A wired power source indicator 2426 indicates connection to the power source such as an electrical mains. The power source indicator 2626 is illuminated when connected to the power source and off when not connected. In some forms, the wired power source is detachable to charge the battery or batteries, such as a charging cable. Some chargers include one or more additional batteries. For example, in one form the sensor module 2405 includes a port for forming a wired connection to the mobile device used during setup. The port may be a USB port by which the sensor module 2405 and mobile device can be connected via a USB cord. By this connection, the mobile device communicates data and charges the battery or batteries of the sensor module 2405.

The sensor module 2405 further includes additional status indicators 2422. The status indicators 2422 include lights used to indicate other status information. In some forms, the status indicators 2422 are multicolor LEDs, such as red, yellow, and green LEDs. Exemplary status information includes faults with the sensor module 2405, such as a frozen processor or damaged sensor.

To save battery life, the sensor module 2405 includes a status input 2412. Pressing the status input causes the outputs 2420, 2421, 2422, 2423, 2424, 2425, 2426 to illuminate to indicate statuses as described above. After the status input 2412 is released, the indicators 2420, 2421, 2422, 2423, 2424, 2425, 2426 turn off to save energy. In some forms, there is a time delay after the status input 2412 is released before the indicators turn off.

Regarding FIG. 24B, the power button 2414 is on the back side of the sensor module 2405 for turning the sensor module 2405 on and off. By having the power button 2414 on the back side of the sensor module 2405, a maintenance worker is less likely to accidently press the power button 2414 believing the power button 2414 is the pairing button 2410 or the status indicator button 2412.

FIG. 25 illustrates a method 2500 of setting up a conveyor system having sensor modules, such as the sensor modules described herein. The user, such as an installer or maintenance worker, sets up the conveyor system sensor modules 2522 using a mobile device 106.

As an initial step, a site ontology is generated and loaded 2501 onto the system, such as the cloud-based computing system 105. The ontology illustrates the overall layout of the conveyor system, including the location and identity of the ancillary devices. The identity of each ancillary device may include the brand and/or model of the ancillary device as well as the identify of one or more components of the ancillary device. For example, the identify of a belt cleaner may include the brand and model of the belt cleaner as well as the brand and model of the scraper blade of the belt cleaner. The user is authorized 2502 to view the ontology to aid in the installation and setup of the ancillary devices and sensor modules.

During setup, the user may install 2503 a new blade on the belt cleaner 120 and properly tension the belt cleaner 120. One of the sensor modules 2522 is installed 2504 on the belt cleaner 120 in a position such that the sensor module 2522 monitors one or more operating characteristics of the belt cleaner 120.

The installed sensor module 2522 is then turned 2505 on. The user observes the indicators, such as the indicators 2420, 2421, 2422, 2423, 2424, 2425, 2426 described above, to check the status of the sensor module 2522. A short range wireless connection is established 2506 between the sensor module 2522 and the mobile device 106. As described above, exemplary short range wireless connections include Bluetooth® or BLE connections. The user provides login information to the user interface of the mobile device 106 that is communicated to the sensor module 2522. The login information may include information required to permit the user to setup the sensor module 2522 as well as information required to access a wireless network. The sensor module 2522 uses the information to establish 2507 an internet connection. The internet connection communicatively couples the sensor module 2522 to the cloud-based computing system 105. The user inputs validating or authenticating information, such as a password and/or ID to form a secure connection between the sensor module 2522 and the cloud-based computing system 105.

Information is uploaded to the cloud-based computing system 105 to link 2508 the sensor module 2522 with the specific conveyor system and the specific location within the conveyor system. In some forms, linking 2508 involves editing 2509 the ontology. Each sensor module 2522 has a unique identifier, such as an ID number, allowing it to be identified for the purpose of linking 2508. In some forms, the identifier is printed on the body of the sensor module 2522, such as with a scannable code. Alternatively or additionally, the identifier is stored in the memory of the sensor module 2522 and accessed by the mobile device 106 after the connection is established 2506.

With the connection to the cloud-based computing system 105 formed, the sensor module 2522 starts recording 2510 data as described in the methods above. The recorded data is transmitted to the cloud-based computing system 105 via the internet connection. The cloud-based computing system 105 stores and processes the data.

The user repeats steps 2503-2509 for each sensor module 2522 of the conveyor system such that every sensor module 2522 is linked to a specific location in the ontology and is communicatively coupled to the cloud-based computing system 105.

During maintenance, the sensor modules 2522 can be relinked to locations in the conveyor system ontology by following steps similar to those described above. The user removes one or more sensor modules 2522 from one or more conveyor accessories to service the sensor modules 2522, for example to replace or recharge the batteries. As the user reinstalls the sensor modules 2522 on the conveyor accessories, a communication link is established 2506 between the mobile device 106 and one of the sensor modules 2522. In one embodiment, the linking involves a Bluetooth pairing procedure between the mobile device 106 and the sensor module 2522.

When the linked sensor module 2522 is installed to a conveyor accessory, the user indicates the location of the sensor module 2522 in the conveyor system ontology using the mobile device 106. In one embodiment, the user utilizes a touch screen of the mobile device 106 to indicate the location of the sensor module 2522 in the conveyor system ontology. The mobile device 106 communicates information regarding the location to at least one of the cloud-based computing system 105 and the mobile device 106.

The user repeats the installation and linking procedure for each sensor module 2522 as the sensor module 2522 is reinstalled. By indicating the location of each sensor module 2522 when the sensor module 2522 is installed, the user does not need to make sure each sensor module 2522 is installed in the same location as before it was removed. This permits a maintenance worker to quickly replace or recharge batteries for number of sensor modules 2522 in confined environments such as mines.

Figure 26:
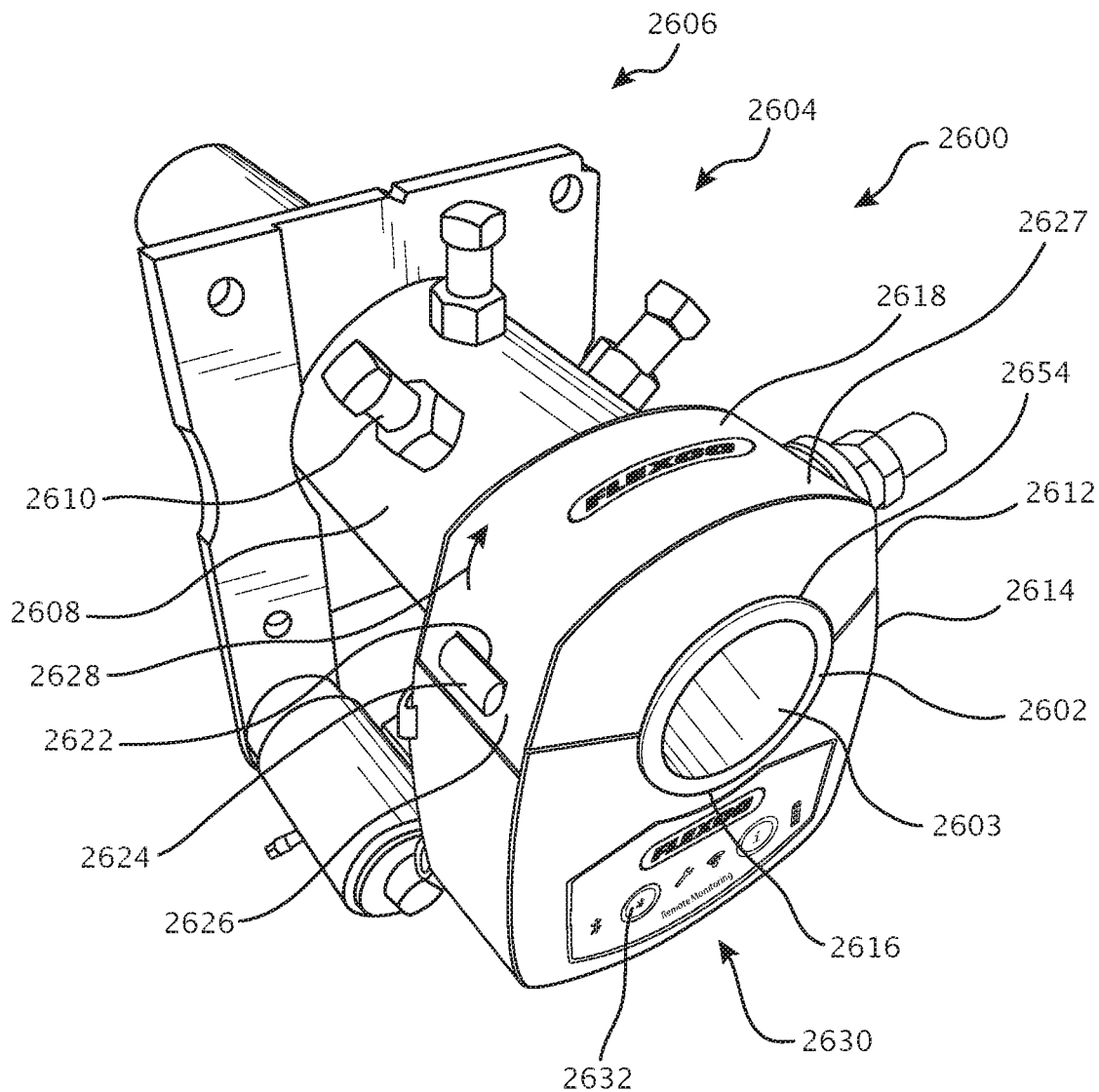
FIG. 26 is a perspective view of a sensor module connected to a conveyor belt cleaner showing a support pole of the conveyor belt cleaner clamped between a housing upper portion and a housing lower portion of the sensor module.

With reference to FIG. 26, a sensor module 2600 is provided that similar to the sensor modules discussed above and is mounted to a support pole 2602 of a conveyor belt cleaner 2604. The support pole 2602 may include a cylindrical side wall extending about an opening 2603 of the support pole 2602. The sensor module 2600 is mounted to the support pole 2602 outward from a mount 2606 of the conveyor belt cleaner 2604. The mount 2606 has a sleeve 2608 secured to the support pole 2602 by one or more locking fasteners 2610. The sensor module 2600 has a housing upper portion 2612 and a housing lower portion 2614 that define a through opening 2616 for receiving the support pole 2602. The housing upper portion 2612 includes a cover 2618 that may be made of a flexible material, such as an elastomer, and is used to cover fasteners 2620 (see FIG. 27) that secure the upper housing portion 2612 and the housing lower portion 2614 in a clamped arrangement on the support pole 2602.

The housing upper and lower portions 2612, 2614 have an installation or initial configuration that permits the housing upper and lower portions 2612, 2614 to be positioned onto the support pole 2602. In one embodiment, the initial configuration includes the housing upper and lower portions 2612, 2614 being completely separated from each other. In another embodiment, the housing upper and lower portions 2612, 2614 are connected by a hinge and are spaced apart in the initial configuration. Once the housing upper and lower portions 2612, 2614 are positioned on the support pole 2602, a user reconfigures the housing upper and lower portions 2612, 2614 to a clamping configuration wherein the upper and lower portions 2612, 2614 clamp the support pole 2602 therebetween. In one embodiment, the user reconfigures the housing upper and lower portions 2612, 2614 by inserting the fasteners 2620 through openings 2646 (see FIG. 27) of the housing upper and lower portions 2612, 2614 and tightening down the fasteners 2620. The support pole 2602 has distinct vibrations caused by operation of the associated conveyor belt and mounting the sensor module 2600 to the support pole 2602 provides clear vibrations for measurement by the sensor module 2600.

In one approach, the cover 2618 is flexible and includes an end portion 2626 having an opening 2622 that receives a catch 2624 of the housing upper portion 2612. The cover 2618 has an end portion 2627 opposite the end portion 2626 that is secured to the housing upper portion 2612. To access the fasteners 2620, the end portion 2626 of the cover 2618 is manipulated to disengage the end portion 2626 from the catch 2624 and moved away from the housing upper portion 2612 in direction 2628.

The sensor module 2600 includes a user interface 2630 that may include one or more buttons 2632. The user may press one of the buttons 2632 to request a status of the sensor module 2600 and may press another one of the buttons 2632 to establish a short-range wireless link between the sensor module 2600 and a portable electronic device, such as a smartphone.

Figure 27:
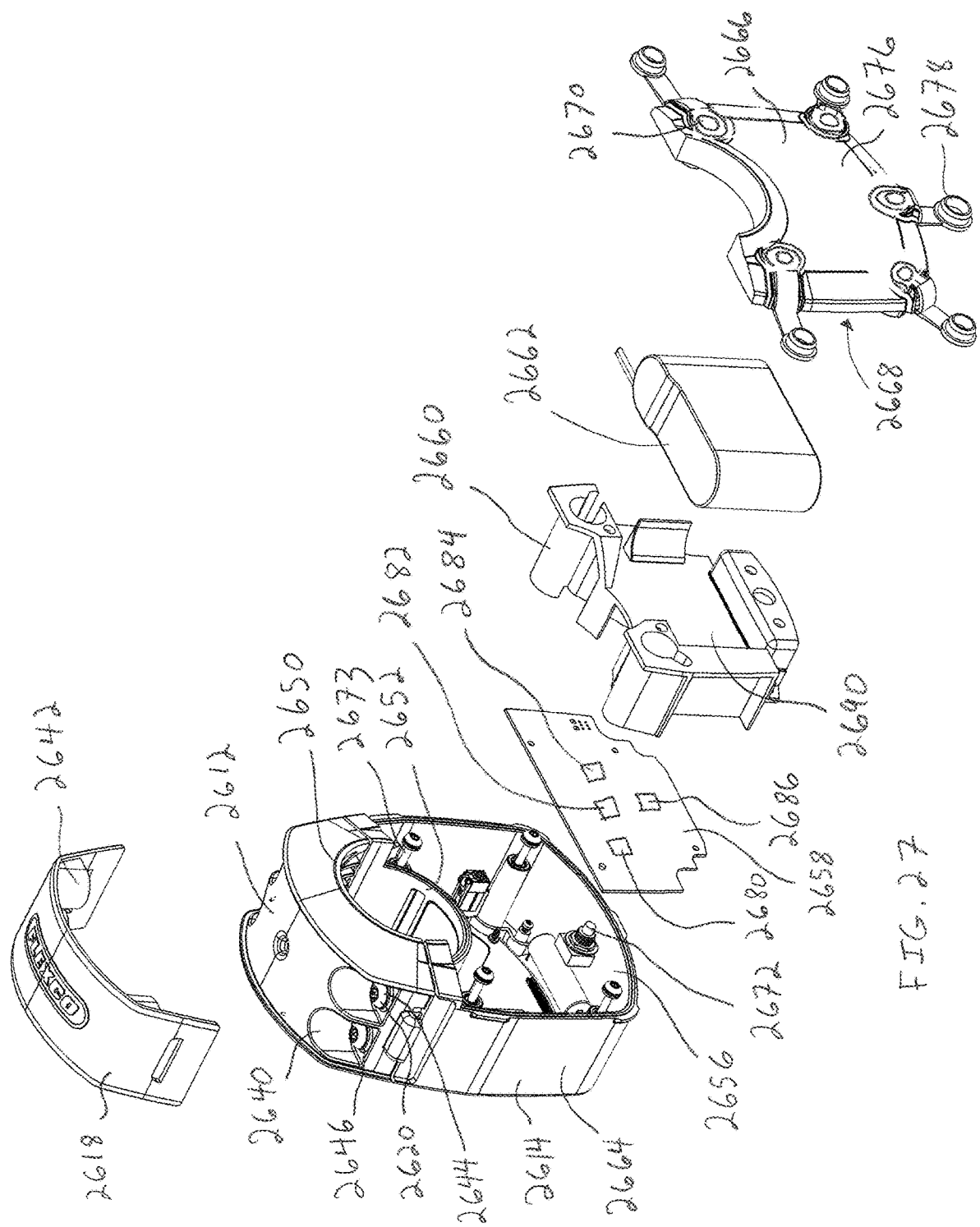
FIG. 27 is an exploded, perspective view of the sensor module of FIG. 26 showing a circuit board, a circuit board support, and a battery that are received within a compartment of the housing lower portion.

With reference to FIG. 27, the housing upper portion 2612 includes sockets 2640 that receive the fasteners 2620 and the cover 2618 includes plug portions 2642 sized to fit into the sockets 2640, cover heads 2644 of the fasteners 2620, and resist ingress of material into drive structures of the fasteners 2620. The plug portions 2642 of the cover 2618 also may extend around the heads 2644 and resist ingress of debris into the openings 2646 of the housing upper portion 2612 through which the fasteners 2620 extend. The housing upper portion 2612 and the housing lower portion 2614 include clamping portions 2650, 2652 that are curved or otherwise shaped to complement an outer surface 2654 (see FIG. 26) of the support pole 2602.

The housing lower portion 2614 includes a compartment 2656 that receives a circuit board 2658, a circuit board support 2660, and a battery 2662. The compartment 2656 includes one or more walls 2664 and a door 2666 having a seal 2668 that engages the one or more walls 2664 and seals the compartment 2656. The door 2666 includes openings 2670 for receiving, for example, fasteners 2673 operable to secure the door 2666 to the walls 2664 and for permitting access to a power button 2672 of the sensor module 2600. The door 2666 includes protective covers 2678 configured to fit into each of the openings 2670 and cover the fastener 2672 or the power button 2672 therein. The door 2666 may be formed using a two-shot process wherein a body 2676 of the door 2666 is formed using a first injected molded material and the seal 2668 and protective covers 2678 are formed in a second injection using a second injected material. In this manner, the door 2666 has a one-piece construction so that the door 2666 may be removed from and connected to the walls 2654 readily without a user misplacing the seal 2668 or the protective covers 2678. In one embodiment, the housing upper portion 2612 and the housing lower portion 2614 including the door body 2676 are made of a rigid material, such as glass-filled nylon. The seal 2668 and the cover 2678 may be made of a soft elastomer, as an example. The circuit board support 2660 may be made of a rigid material such as acrylonitrile butadiene styrene plastic.

Regarding FIG. 27, the circuit board 2658 includes a processor 2680, communication circuitry 2682, one or more sensors 2684, and a memory 2686. The circuit board support 2660 receives the circuit board 2658 and securely mounts the circuit board 2658 within the housing lower portion 2614. The circuit board 2660 further includes a battery compartment 2690 for receiving the battery 2662.

The one or more sensors 2682 are configured to detect one or more characteristics of the support pole 2602. The one or more sensors 2684 may include, for example, an accelerometer, a gyroscope, or a combination thereof. The sensors 2684 may measure, for example, acceleration in a Z direction along the length of the pole 2602 (which may be caused by flexing of pole), acceleration in a X-axis direction perpendicular to the Z axis, acceleration in a Y-axis direction perpendicular to both the Z- and X-axes, and accelerations about one or more of the X, Y, and Z axes. The support pole 2602 experiences high acceleration, small displacement movements caused by operation of the conveyor belt and detected by the one or more sensors 2684. The support pole 2602 also experiences large displacement events such as a splice impacting the cleaner blade of the conveyor belt cleaner 2604 which are also detected by the one or more sensors 2684.

As an example, the one or more characteristics of the support pole 2602 may include the orientation of the support pole 2602. The sensors 2684 may detect the orientation of the support pole 2602 relative to gravity. As the cleaner blade wears down, the support pole 2602 will turn and the sensor 2684 will detect the change in the orientation of the support pole 2602 relative to gravity. The sensor module 2600 may communicate the orientation of the support pole 2602 so that one or more properties of the cleaner blade may be predicted, such as the remaining life of the cleaner blade.

Figure 28:
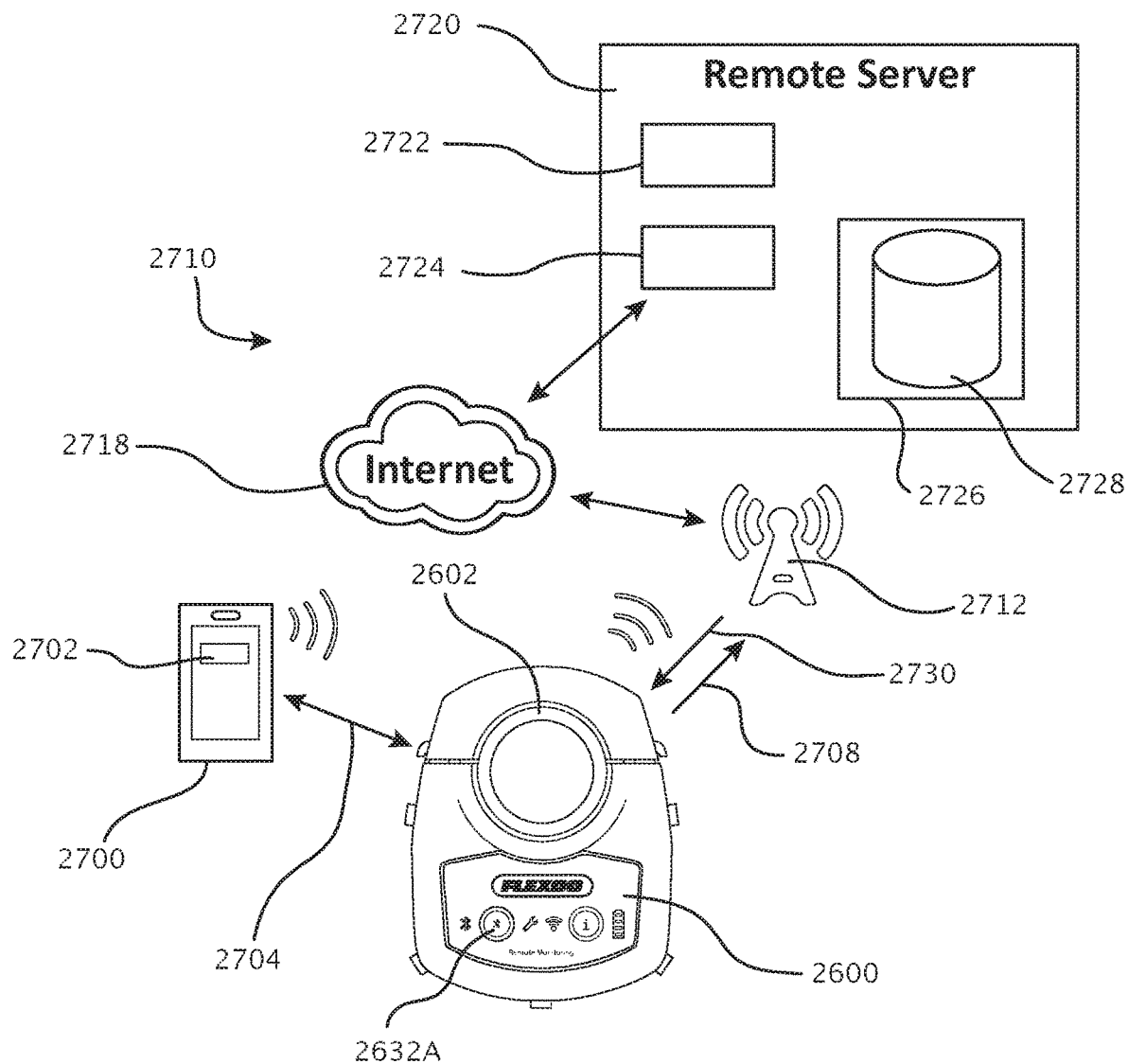
FIG. 28 is a schematic representation of a smartphone being used to setup the sensor module of FIG. 26 and the sensor module communicating information to a remote server.

With reference to FIG. 28, the sensor module 2600 may be installed and operated in a manner consistent with the sensor modules as discussed above. In one embodiment, the sensor module 2600 is installed on the support pole 2602 and the user wirelessly connects a portable electronic device, such as a smartphone 2700, to the sensor module 2600. The smartphone 2700 may communicate 2704 information to and/or receive information from the sensor module 2600. Once connected, the smartphone 2700 may operate as a remote control for the sensor module 2600 and cause the sensor module 2600 to communicate 2708, 2730 information to and/or from a cloud computing system 2710 which includes a remote server 2720.

For example, the smartphone 2700 may connect to the sensor module 2600 via a short-range wireless protocol, such as Bluetooth, utilized by the communication circuitry 2682. In one approach, a user such as a maintenance worker presses a pairing button 2632A of the sensor module 2600 to place the sensor module 2600 in a pairing mode and the user may pair the smartphone 2700 with the sensor module 2600. Once the smartphone 2700 and the sensor module 2600 are paired, the user may use an application running on the smartphone 2700 to enter information identifying the conveyor belt cleaner 2604 to which the sensor module 2600 is connected such as by using a displayed graphical user interface 2702. For example, the information may include an identity of the conveyor belt system associated with the conveyor belt cleaner 2604, the location of the conveyor belt cleaner 2604 along the conveyor belt, the model number of the conveyor belt cleaner 2602, and the model number of scraper blades installed in the conveyor belt cleaner 2602. Further information can be provided via the smartphone 2700, such as the estimated tension the conveyor belt cleaner 2604 is applying to the cleaner blades, the material being handled by the conveyor belt, the material of the conveyor belt, and/or other information.

The smartphone 2700 communicates 2704 the information to the sensor module 2600 and the sensor module 2600 communicates 2708 the information to the remote server 2720, such as via a cellular network 2712 and the internet 2718. The communication 2708 includes a globally unique identifier for the sensor module 2600 so that the remote server 2720 may associate the received information with the sensor module 2600 that communicated the information.

Because the sensor module 2600 operates as an intermediary between the smartphone 2700 and the cellular network 2712, the smartphone 2700 does not have to connect to the cellular network 2712 which may be difficult in remote locations. In one embodiment, the sensor module 2600 communicates with the cellular network 2712 using the 4G LTE CAT M standard which may provide better communication in remote areas than conventional 3G or 4G cellular networks. In another embodiment, the sensor module 2600 communicates with a remote server 2720 via a local wireless gateway and the internet. Because the sensor module 2600 operates as an intermediary between the smartphone 2700 and the local wireless gateway, the smartphone 2700 does not have to connect to the local wireless gateway. This may improve wireless network security for the facility because a maintenance worker does not have to connect to the local wireless gateway in order to setup or service the sensor module 2600.

The cloud computing system 2710 is similar in many respects to the cloud computing systems discussed above and includes the remote server 2720. The remote server 2720 includes a processor 2722, a communication interface 2724, and a memory 2726. The memory 2726 includes a historical database 2728 that contains historical information that is used by the processor 2722 during operation of the conveyor belt to estimate one or more characteristics of the cleaner blade of the conveyor belt cleaner 2604 as discussed above. The historical database 2728 may include historical data representative of one or more characteristics of the support pole 2602 as the support pole 2602 vibrates with operation of the associated conveyor belt.

The processor 2722 of the remote server 2720 predicts at least one property of the conveyor belt cleaner 2604 by comparing the at least one characteristic of the support pole 2602 to at least one characteristic stored in the database 2728. In one embodiment, the processor 2722 monitors changes to the vibration signatures detected by the sensors 2684 to identify changes in the at least one property of the cleaner blade. The signal from a given sensor 2684 monitoring vibration of the support pole 2602 includes a number of different frequencies and a fast Fourier transform may be performed to identify which frequencies are present in the signal. There may be specific frequencies that are more prominent in the data than other frequencies. These prominent or fundamental frequencies may vary over time as the conveyor belt operates. For example, the processor 2722 may observe whether the detected fundamental frequencies change by a number of Hz from the baseline frequencies observed when the sensor module 2600 was initially installed on the support pole 2602. The processor 2722 may determine a change has occurred to the at least one property of the cleaner blade if the change in the fundamental frequencies is greater than a predetermined threshold. The processor 2722 may cause the communication interface 2724 to send an alert to the maintenance worker's smartphone 2700.

Figure 34:
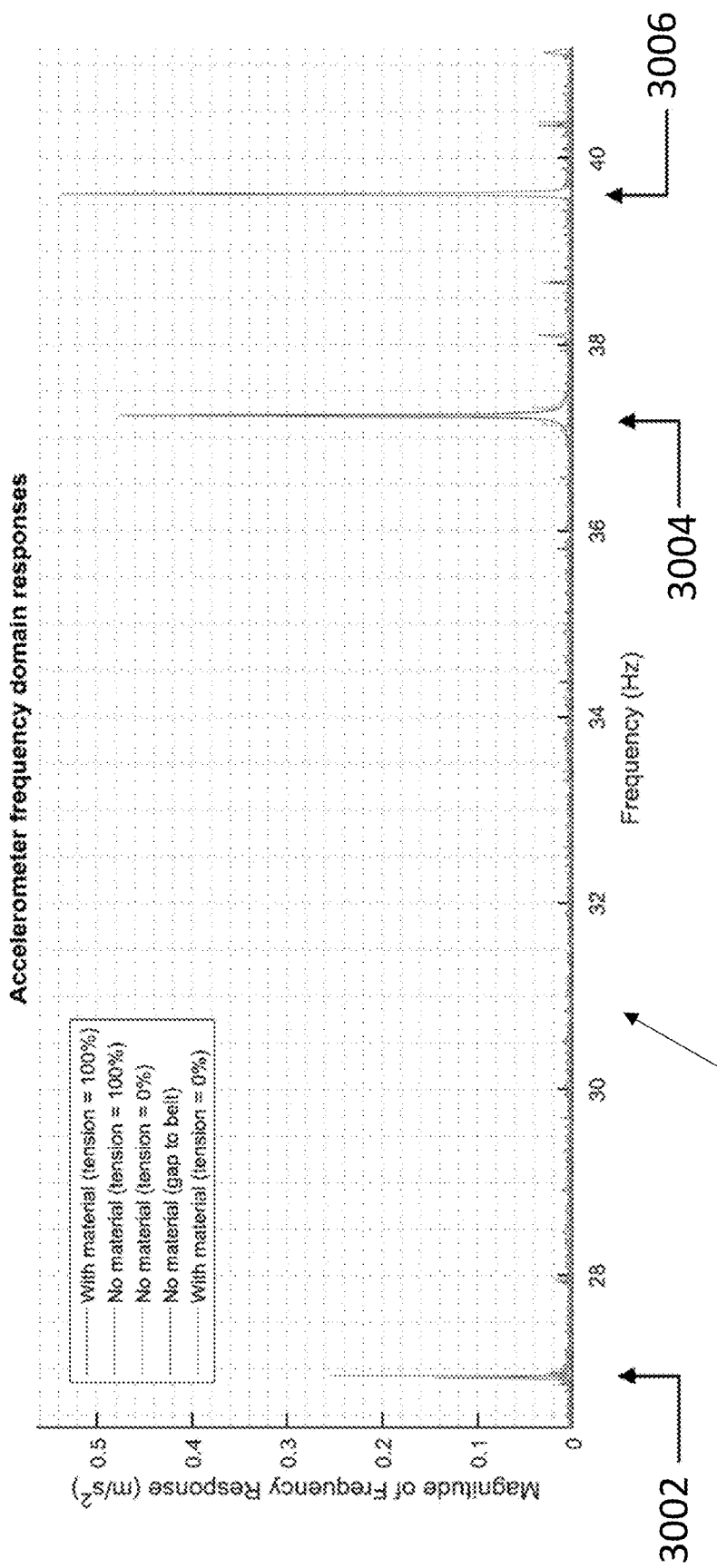
FIG. 34 is a graph showing data from an accelerometer mounted to a support pole of a conveyor belt cleaner showing changes in the frequency domain response of signals from the accelerometer with changes in the operating conditions of the associated conveyor belt system.

For example, with reference to FIG. 34, a graph 3000 is provided of the frequency domain response of signals from an accelerometer mounted to a support pole of a conveyor belt cleaner which were obtained during testing. The graph 3000 illustrates how the fundamental frequencies of the frequency domain response change with changes in the operation of the associated conveyor belt system. For example, when the conveyor belt was loaded with material and the tension of the conveyor belt cleaner was zero or 100% of allowable tension, the measured fundamental frequency occurs at frequency 3002. When there was no material on the conveyor belt and the tension of the conveyor belt cleaner was 0%, the fundamental frequency occurs at frequency 3004. When there was no material on the conveyor belt and the tension of the conveyor belt cleaner was 100%, the fundamental frequency occurs at frequency 3006. With this historical data stored in the database 2728, the processor 2722 will be able to predict that there is no material on the belt and the cleaner blades of the conveyor belt cleaner are subject to zero percent tension if the fundamental frequency measured during operation of the conveyor belt occurs at frequency similar to frequency 3004. In this manner, the processor 2722 may predict one or more current properties of the conveyor belt and/or conveyor belt cleaner blades based on historical data of one or more characteristics of the support pole.

As another example, the processor 2722 may predict chattering of a cleaner blade of the conveyor belt cleaner 2604 by identifying a deviation of the frequency and/or amplitude of one or more fundamental frequencies of the acceleration of the support pole 2602 from the historical frequency and/or amplitude. Alternatively or additionally, the historical database 2728 may include historical data representative of one or more characteristics of the support poles of other conveyor belt cleaners associated with the same conveyor belt or different conveyor belts. The processor 2722 may utilize the historical data from the other conveyor belt cleaners to generate one or more thresholds for the deviation that must be met before the deviation in the frequency and/or amplitude of the fundamental frequencies of the at least one characteristic of the support pole 2602 triggers an alert to be sent to the maintenance team.

The processor 2722 may utilize data from other sources to predict the at least one property of the cleaner blade of the conveyor belt cleaner 2604. For example, the communication interface 2724 may receive position data from a linear actuator of the conveyor belt cleaner 2604. The processor 2722 may use the position data and the sensed at least one characteristic of the support pole 2602 to predict whether the cleaner blade is engaged with the conveyor belt.

The database 2728 also includes a plurality of algorithms that are used to model the physical behavior of conveyor belt cleaner 2604. One or more of the algorithms may be used by the sensor module 2600, the remote server 2720, or both. For example, based on information received via the communication 2708 from the sensor module 2600, the remote server 2720 may send a communication 2730 to the sensor module 2600 that includes at least a portion of an algorithm, such as a complete algorithm or variables of an algorithm, that corresponds to the type of conveyor belt cleaner 2604 to which the sensor module 2600 is mounted. For example, the processor 2722 of the remote server 2720 may select the at least a portion of an algorithm based upon, for example, the brand of the conveyor belt cleaner 2604, the model of the conveyor belt cleaner 2604, the size of the conveyor belt cleaner 2604, the model of the cleaner blades, the type of material being conveyed by the associated conveyor, and/or other information. The processor 2722 uses the at least a portion of an algorithm to perform initial processing on the data received from the one or more sensors 2684. The sensor module 2604 may thereby provide edge processing for the system.

Using the at least a portion of an algorithm received, the sensor module 2600 may calculate one or more characteristics of the support pole 2602 as the support pole 2602 vibrates during operation of the associated conveyor belt. The at least one characteristic may include, for example, translational acceleration, rotational acceleration, position, velocity, direction of gravity, or a combination thereof. The sensor module 2600 may communicate the at least one characteristic of the support pole 2602 to the remote server 2720. The processor 2720 uses the at least one characteristic of the support pole 2602 to predict at least one property of a cleaner blade of the conveyor belt cleaner 2604. The at least one property may include, for example, whether the cleaner blade is engaged with the belt, the tension applied to the cleaner blade, residual blade height, whether the cleaner blade is chattering, and/or whether a cushion of the conveyor belt cleaner blade is damaged. The remote server 2720 may also use the at least one characteristic of the support pole 2602 to predict at least one property of the conveyor belt associated with the conveyor belt cleaner 2604. The at least one property of the conveyor belt may include whether there is material present on the conveyor belt, whether the conveyor belt is running, the conveyor belt speed, whether the conveyor belt is mistracking, or a combination thereof.

Figure 29:
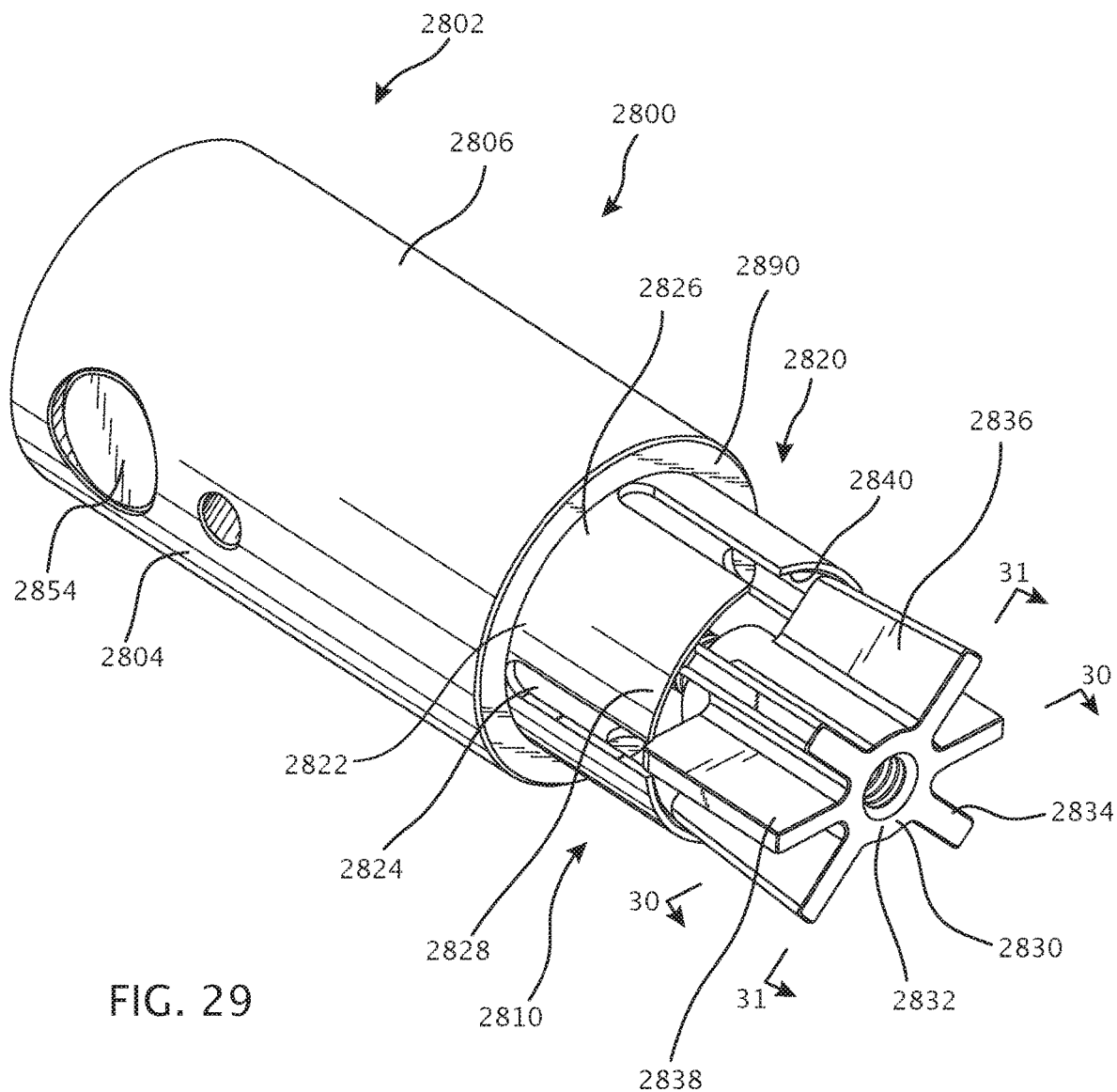
FIG. 29 is a perspective view of a pole extender including a body having spaced, arcuate walls sized to fit within an opening of a support pole of a conveyor belt cleaner and a cylindrical outer surface to which the sensor module of FIG. 26 may be attached.

With reference to FIG. 29, there may be some conveyor belt cleaners wherein the support pole thereof does not extend beyond the mounts of the conveyor belt cleaner. In these situations, a pole extender 2800 may be used to create additional space outside the material handling path of the conveyor belt for mounting the sensor module 2600. The pole extender 2800 includes a body 2802 having an annular wall 2804 with an outer surface 2806 that may be sized and shaped similarly to—or differently than the support pole to which the pole extender 2800 is connected. The outer surface 2806 may resemble a cylinder, a rectangular prism, or other shapes and the associated sensor module 2600 is configured to clamp onto the outer surface 2806.

Figure 32:
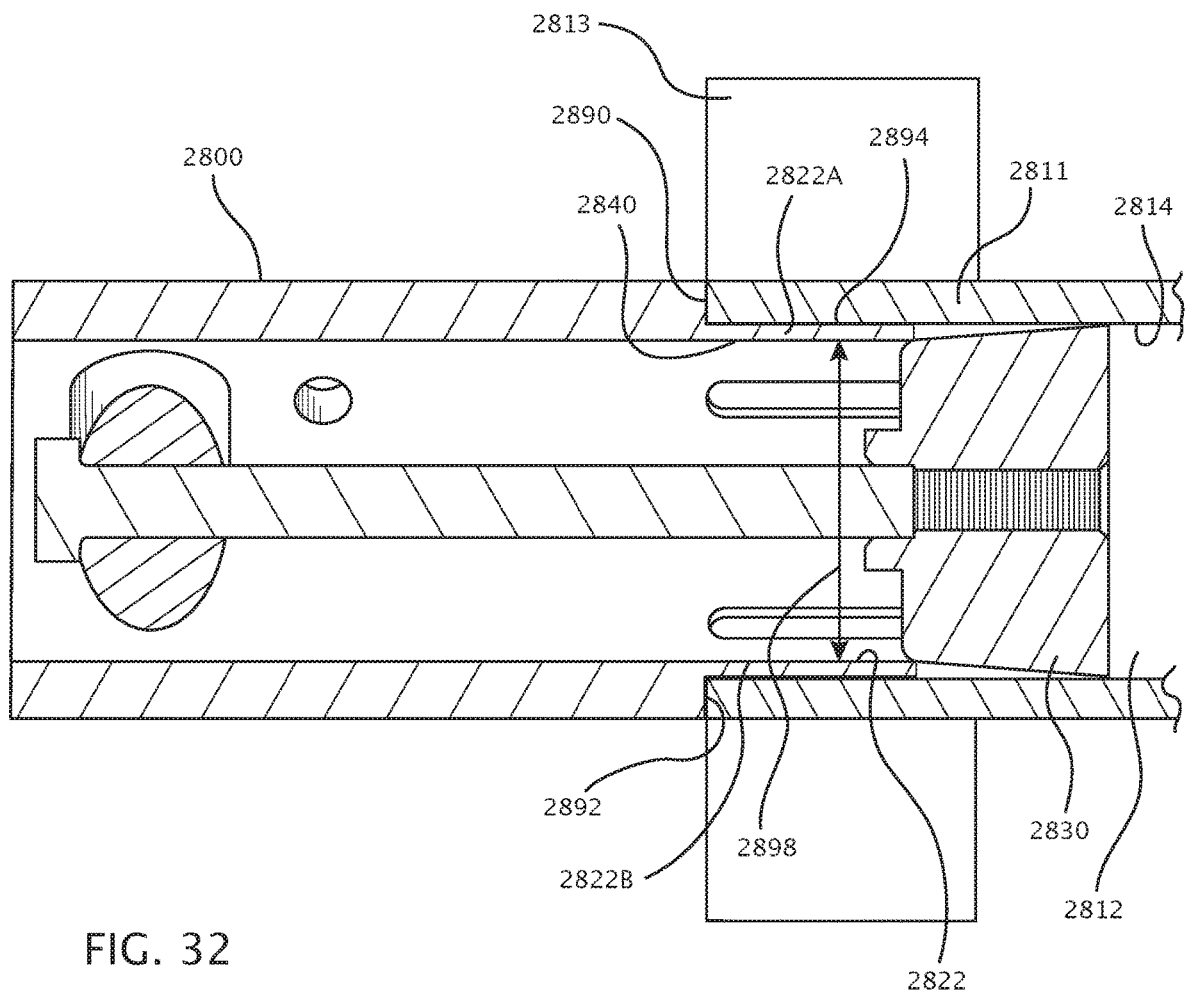
FIG. 32 is a cross-sectional view of the pole extender taken across line 31-31 in FIG. 29 showing the pole extender connected to a support pole of a conveyor belt cleaner, the conveyor belt cleaner having a mount at an end of the support pole that limits placement of a sensor module on the support pole.

Regarding FIGS. 29 and 32, the pole extender 2800 includes a mounting portion 2810 having an installation or initial configuration wherein the mounting portion 2810 is sized to be inserted into an opening 2812 of a support pole 2811. This connects the pole extender 2800 to the support pole 2811, despite the support pole 2811 having a mount 2813 at the end of the support pole 2811. The mounting portion 2810 further includes an expanded configuration (see FIG. 33) wherein the mounting portion 2810 engages an inner surface 2814 of the support pole 2811 and rigidly fixes the pole extender 2800 to the support pole 2811.

Returning to FIG. 29, the mounting portion 2810 includes one or more deflectable members 2820, such as arcuate walls 2822, separated by gaps 2824. Each arcuate wall 2822 includes a base portion 2826 and a free end portion 2828. The mounting portion 2810 includes a spreader 2830 having a tubular body 2832 and walls 2834 extending radially outward from the tubular body 2832. The walls 2834 include one or more cam walls 2836 and one or more anti-rotational walls 2838. The cam walls 2836 are configured to engage inner surfaces 2840 of the walls 2822 and urge the walls 2822 apart. The anti-rotational walls 2838 are sized to fit into the gaps 2824 to resist turning of the spreader 2830 as the spreader 2830 urges the arcuate walls 2822 against the inner surface 2814 of the support pole 2811.

Figure 30:
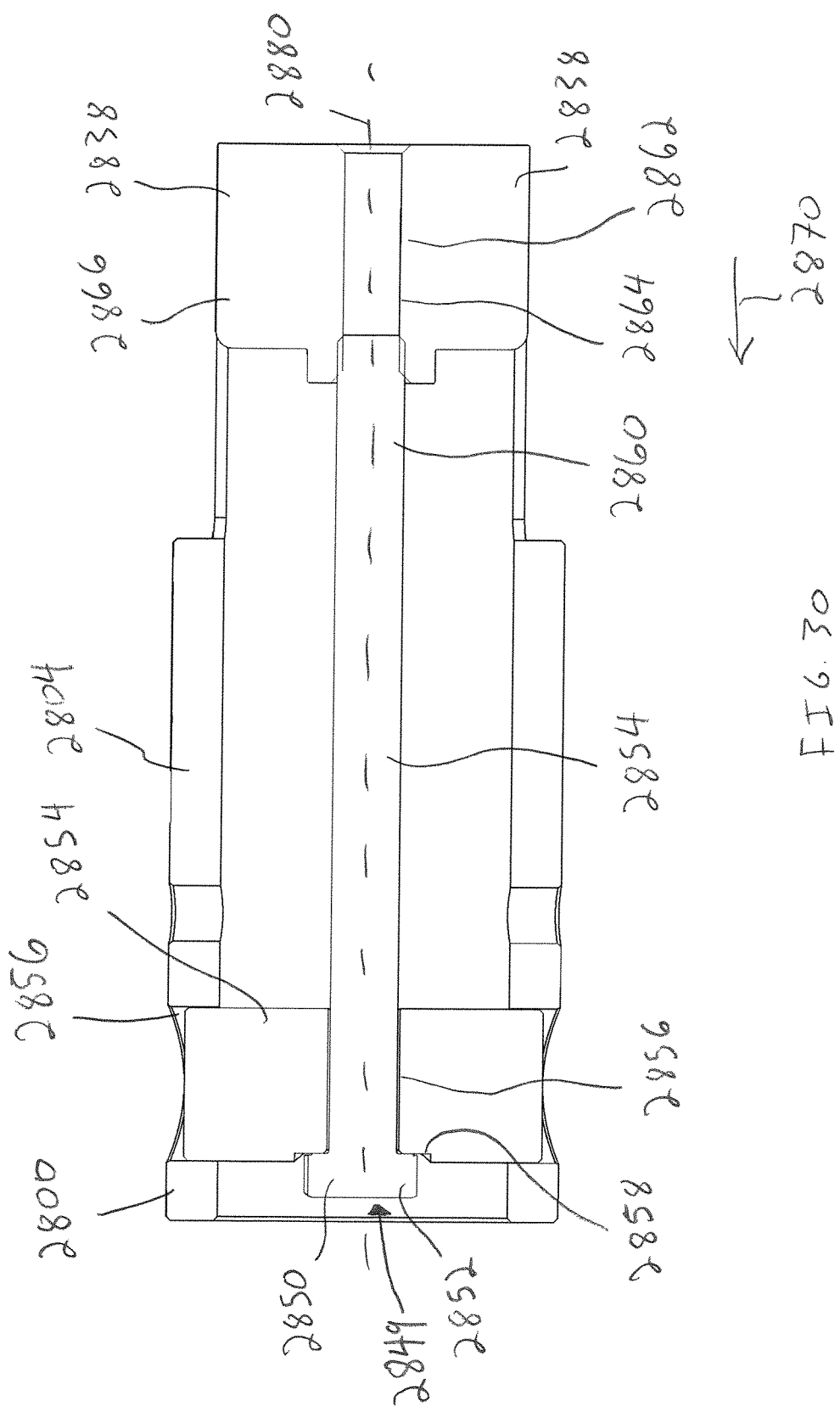
FIG. 30 is a cross-sectional view taken across line 30-30 in FIG. 29 showing an actuator bolt of the pole extender in threaded engagement with a spreader of the pole extender.

With reference to FIG. 30, the pole extender 2800 includes an actuator 2849, such as a bolt 2850, having a head 2852 and a shank 2854 depending from the head 2852. The pole extender 2800 includes a base, such as a cross pin 2854, that extends through a through opening 2856 of the annular wall portion 2804. The cross pin 2854 includes a through opening 2856 through which the shank 2854 extends and a recess portion 2858 that receives the head 2852 and permits turning of the head 2852. The shank 2854 includes a threaded portion 2860 engaged with threads 2862 of a through bore 2864 of the spreader 2866. In this manner, turning of the head 2852 in a clockwise direction causes the spreader 2866 to shift in direction 2870 toward the annular wall 2804. As the spreader 2866 shifts in direction 2870, the cam walls 2836 engage the inner surfaces 2840 of the walls 2822 and urge the walls 2822 apart.

Figure 31:
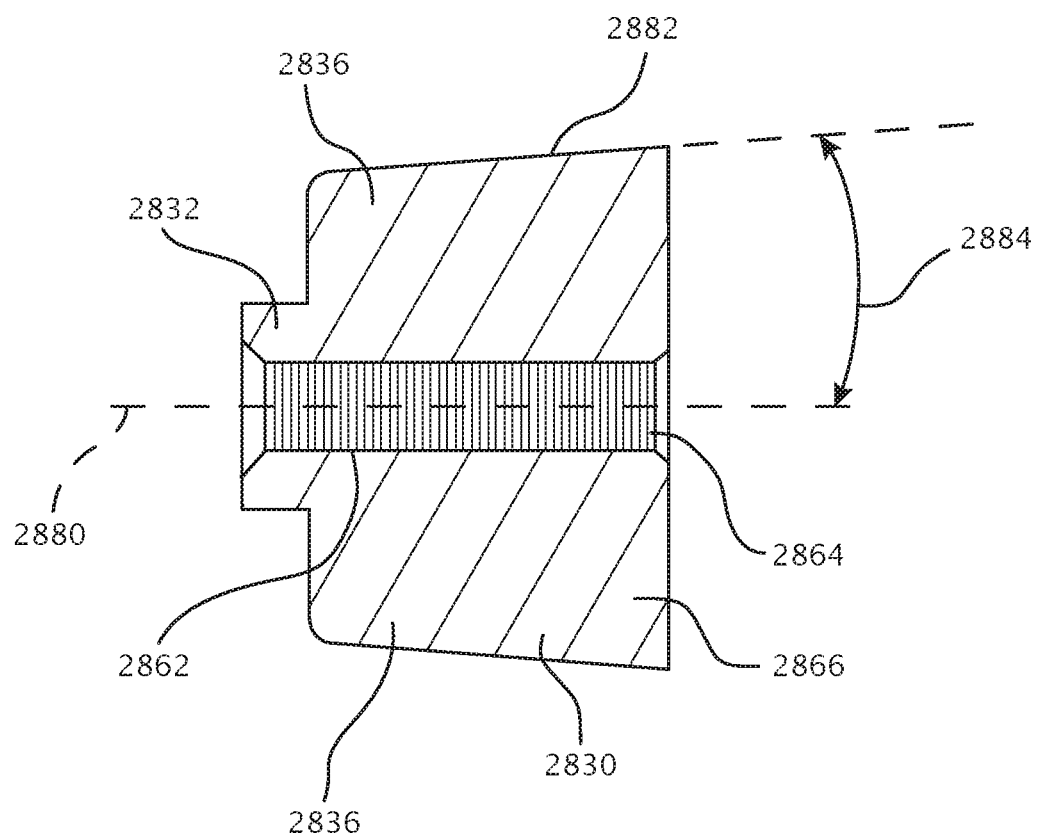
FIG. 31 is a cross-sectional view of the spreader taken across line 31-31 in FIG. 29 showing cam walls of the spreader having inclined surfaces for spreading apart the arcuate walls of the body and securing the pole extender to the support pole.

With reference to FIG. 31, the longitudinal axis 2880 of the pole extender 2800 extends through the through bore 2864 of the spreader 2830. Each cam wall 2836 includes an inclined surface 2882 that extends at an angle 2884 relative to the longitudinal axis 2880. The angle 2884 may be in the range of 1 degree to 18 degrees, such as 4 degrees.

Regarding FIG. 32, the pole extender 2800 is shown connected to the support pole 2811 with the arcuate walls 2822 and the spreader 2830 positioned in the opening 2812 of the support pole 2811. The arcuate walls 2822 have been advanced into the opening 2812 until a shoulder 2890 of the pole extender abuts an end surface 2892 of the support pole 2811. The arcuate walls 2822 include arcuate walls 2822A, 2822B that are positioned across the opening 2812 from each other. The arcuate walls 2822A, 2822B are described below, although the other arcuate walls 2822 will undergo a similar operation.

Initially, the arcuate walls 2822A, 2822B are positioned with outer surfaces 2894 thereof facing the inner surface 2814 of the support pole 2811. The walls 2822A, 2822B have an initial distance 2898 between inner surfaces 2840 of the walls 2822A, 2822B.

Figure 33:
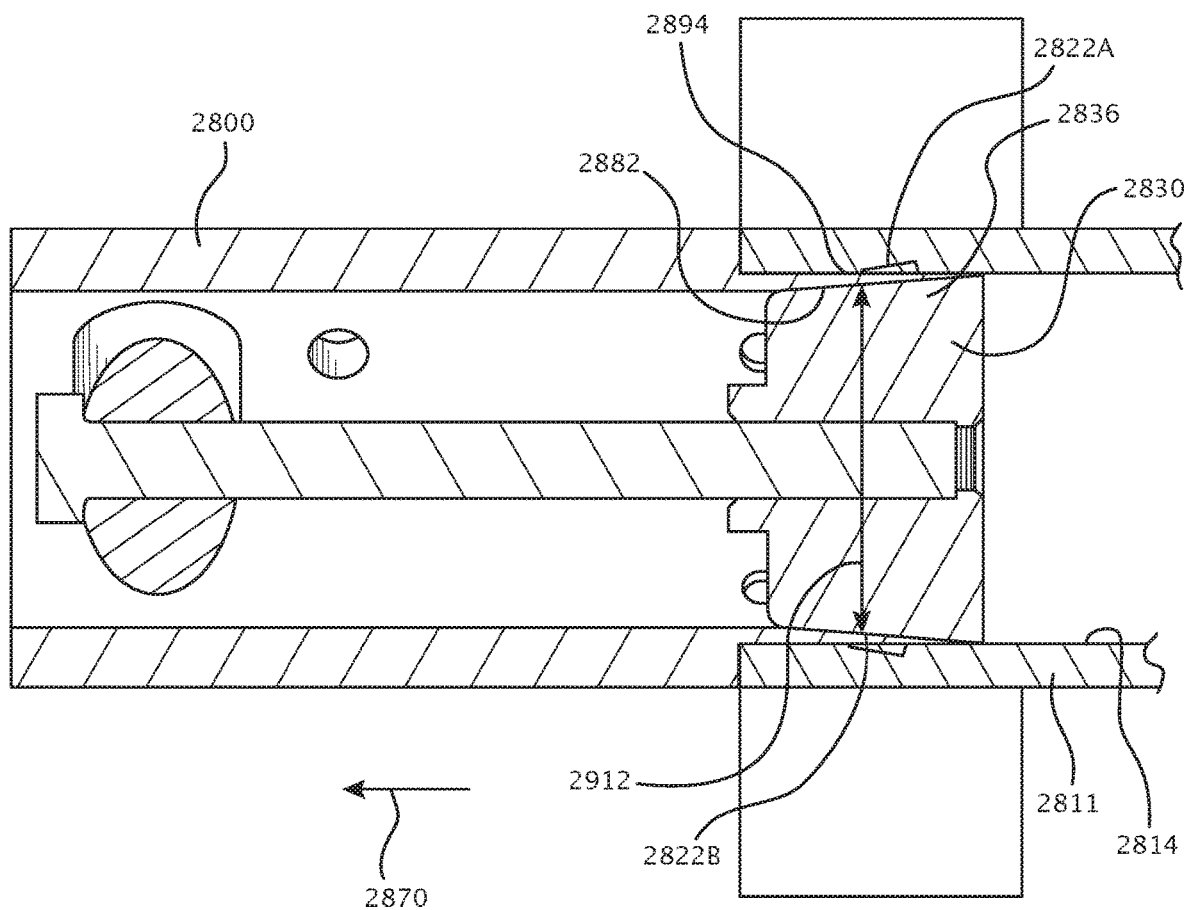
FIG. 33 is a view similar to FIG. 32 showing the actuator bolt having been tightened to draw the wedge toward the body and urge the arcuate walls of the body against an inner surface of the support pole.

With reference to FIG. 33, the user has tightened the bolt 2850, such as by using an impact wrench, which has shifted the spreader 2830 in direction 2870. The inclined surfaces 2882 of the cam walls 2836 have urged the walls 2822A, 2822B apart which engages an outer surface 2894 of the walls 2822A, 2822B with the inner surface 2814 of the support pole 2811. In one approach, the shifting of the spreader 2830 creates a distance 2912 between the inner surfaces 2840 of the walls 2822A, 2822B that is to larger than the distance 2898 when the pole extender 2800 is in the initial configuration thereof. This increase in distance 2898 may occur because there may be radial gap spacings between the arcuate walls 2822 and the inner surface 2814 of the support pole 2811 sized to permit the pole extender 2800 to be connected to the support pole 2602. Shifting of the spreader 2830 deflects the free ends 2828 radially outward into the radial gaps and into contact with the inner surface 2814 of the support pole 2811.

The movement of the spreader 2830 in direction 2870 may permanently deform the material of the arcuate walls 2822. The deformation of the walls 2822 against the support pole 2811 permanently fixes the pole extender 2800 to the support pole 2811. The user may then mount the sensor module 2600 to the pole extender 2800.

In one embodiment, the components of the pole extender 2800 are made of one or more rigid, metallic materials such as steel. The rigid materials of the pole extender 2800 and the secure fixation provided by the spreader 2830 and arcuate walls 2822 permit the pole extender 2800 to vibrate in a substantially similar manner as the support pole 2811. Thus, the sensor module 2600 may measure one or more characteristics of the pole extender 2800 as the pole extender vibrates with the support pole 2811 during conveyor belt operation.

In one embodiment, the cross pin 2854 is press fit in the through opening 2856. In another embodiment, the cross pin 2854 is welded in the through opening 2856. The actuator 2849 and the spreader 2830 may have a number of configurations to translate movement of the actuator 2849 into shifting of the spreader 2830 in direction 2870. For example, the actuator 2849 may include a nut threaded onto a shaft of the spreader 2830. Turning the nut shifts the shaft and the spreader 2830 in direction 2870. In another embodiment, the actuator 2849 may be shifted axially without rotation to cause the spreader 2830 to shift in direction 2870.

Those skilled in the art will recognize that a wide variety of modifications, alterations, and combinations can be made with respect to the above-described embodiments without departing from the spirit and scope of the invention, and that such modifications, alterations, and combinations are to be viewed as being within the scope of the claims. For example, although method steps may be presented and described herein in a sequential fashion, one or more of the steps shown and described may be omitted, repeated, performed concurrently, and/or performed in a different order than the order shown in the figures and/or described herein. Further, it will be appreciated that computer-readable instructions for facilitating the methods described above may be stored in various non-transitory computer readable mediums as is known in the art.

What is claimed is:

1. A sensor apparatus for monitoring a conveyor belt cleaner of a conveyor belt system, the conveyor belt cleaner including an elongate support and a cleaner blade configured to be operatively mounted to the elongate support and engage a conveyor belt, the sensor apparatus comprising:
    a sensor module having an opening sized to receive the elongate support and permit the sensor module to be mounted on the elongate support;
    a sensor of the sensor module configured to detect at least one characteristic of the elongate support;
    communication circuitry of the sensor module, the communication circuitry configured to wirelessly communicate data associated with the at least one characteristic of the elongate support to a communication hub; and
    a battery of the sensor module to provide power for the sensor and the communication circuitry.

2. The sensor apparatus of claim 1 in combination with the conveyor belt cleaner, the conveyor belt cleaner including the elongate support and a pair of mounts configured to support and position the elongate support to extend across the conveyor belt; and
    wherein the sensor module includes a housing having the opening, the housing configured to be mounted on the elongate support while the elongate support is supported and positioned to extend across the conveyor belt by the pair of mounts.

3. The sensor apparatus of claim 1 wherein the sensor module includes a housing, the sensor being within the housing.

4. The sensor apparatus of claim 1 further comprising a processor configured to use the at least one characteristic of the elongate support to predict at least one property of the conveyor belt system.

5. The sensor apparatus of claim 4 wherein the at least one property of the conveyor belt system includes a remaining lifespan of the cleaner blade.

6. The sensor apparatus of claim 4 wherein the processor is configured to predict the at least one property of the conveyor belt system including at least one property of the cleaner blade of the conveyor belt cleaner.

7. The sensor apparatus of claim 4 wherein the processor is configured to predict the at least one property of the conveyor belt system including at least one property of the conveyor belt.

8. The sensor apparatus of claim 4 further comprising a memory configured to store vibration historical data for a second elongate support of a second conveyor belt cleaner of a second conveyor belt system, the processor configured to use the at least one characteristic of the elongate support to predict the at least one property of the conveyor belt system at least in part by comparing the at least one characteristic to the vibration historical data of the second conveyor belt system.

9. The sensor apparatus of claim 4 further comprising a memory configured to store vibration historical data for the elongate support of the conveyor belt cleaner, the processor configured to use the at least one characteristic of the elongate support to predict the at least one property of the conveyor belt system at least in part by comparing the at least one characteristic to the vibration historical data.

10. The sensor apparatus of claim 4 wherein the processor is configured to use the at least one characteristic of the elongate support to predict the at least one property of the conveyor belt system at least in part by calculating a fundamental frequency of the at least one characteristic of the elongate support and associating the fundamental frequency with the at least one property of the conveyor belt system.

11. The sensor apparatus of claim 4 wherein the at least one characteristic includes an acceleration of the elongate support, a rate of rotation of the elongate support, or a combination thereof; and
    the at least one property of the conveyor belt system includes blade tension, whether the cleaner blade is engaged with the conveyor belt, whether the cleaner blade is chattering, or a combination thereof.

12. The sensor apparatus of claim 4 further comprising a communication interface operatively coupled to the processor and configured to receive identification data representative of at least one physical property of the conveyor belt cleaner, the processor configured to select at least a portion of an algorithm representative of the physical operation of the conveyor belt cleaner based on the identification data.

13. The sensor apparatus of claim 4 further comprising a second processor of the sensor module, the second processor operatively coupled to the sensor and the communication circuitry, the communication circuitry configured to communicate via the communication hub and a network with a remote computer that includes the processor, the second processor configured to cause the communication circuitry to communicate data representative of the at least one characteristic of the elongate support to the remote computer.

14. The sensor apparatus of claim 4 in combination with the conveyor belt system, wherein the cleaner blade includes a plurality of cleaner blades and the at least one property of the conveyor belt system includes at least one property of each of the cleaner blades.

15. The sensor apparatus of claim 1 in combination with the communication hub, the communication hub configured to wirelessly receive data from a plurality of sensor modules.

16. The sensor apparatus of claim 1 in combination with the communication hub, the communication hub configured to communicate via a cellular communication protocol.

17. The sensor apparatus of claim 1 further comprising a processor of the sensor module operably coupled to the sensor and the communication circuitry, the processor configured to cause the communication circuitry to communicate the data associated with the at least one characteristic of the elongate support to the communication hub.

18. The sensor apparatus of claim 1 wherein the at least one characteristic includes a position of the elongate support.

19. The sensor apparatus of claim 1 wherein the sensor is configured to detect:
a change in position of the elongate support;
a rotary distance the elongate support travels; or
at least a combination thereof.

20. The sensor apparatus of claim 1 wherein the sensor module includes a clamp operable to secure the sensor module on the elongate support.

21. The sensor apparatus of claim 1 wherein the sensor module includes a clamp portion of the sensor module having an inner surface extending about the opening, the clamp portion configured to clamp the inner surface against an outer surface of the elongate support and secure the sensor module to the elongate support.

22. The sensor apparatus of claim 1 wherein the sensor module includes a sleeve portion extending about the opening, the sleeve portion having a pair of ends separated by a gap, wherein the sensor module includes a clamping member operable to narrow the gap and clamp the sensor module on the elongate support.

23. The sensor apparatus of claim 1 wherein the sensor module opening is circular and the sensor module includes an annular inner surface extending about the circular opening, the annular inner surface configured to be clamped against a cylindrical outer surface of the elongate support with the sensor module mounted on the elongate support.

24. The sensor apparatus of claim 1 wherein the sensor module includes an indicator.

25. The sensor apparatus of claim 1 wherein the sensor module includes a temperature sensor.

26. The sensor apparatus of claim 1 further comprising a processor of the sensor module operably coupled to the sensor and the communication circuitry, the processor configured to cause the communication circuitry to communicate the data associated with the at least one characteristic of the elongate support to a remote computer via the communication hub.

27. The sensor apparatus of claim 1 wherein the sensor module includes a C-shaped housing.

28. The sensor apparatus of claim 1 wherein the sensor module includes a band for securing the sensor module to the elongate support.

29. The sensor apparatus of claim 1 wherein the sensor module includes a microphone.

30. The sensor apparatus of claim 1 wherein the communication circuitry is configured to wirelessly communicate the data associated with the at least one characteristic of the elongate support to the communication hub via a radio frequency communication.

31. A method of monitoring a conveyor belt system, the conveyor belt system including a conveyor belt and a conveyor belt cleaner having a cleaner blade configured to engage the conveyor belt, the conveyor belt cleaner including an elongate support and a pair of mounts supporting the elongate support to extend across the conveyor belt, the method comprising:
mounting a sensor module on the elongate support while the elongate support is supported by the mounts and extends across the conveyor belt;
powering a sensor and communication circuitry of the sensor module via a battery of the sensor module;
detecting, using a sensor of the sensor module mounted on the elongate support, at least one characteristic of the elongate support; and
wirelessly communicating, using communication circuitry of the sensor module mounted on the elongate support, data associated with the at least one characteristic of the elongate support to a communication hub.

32. The method of claim 31 further comprising communicating the data from the communication hub to a remote computer via a network.

33. The method of claim 31 further comprising using the at least one characteristic of the elongate support to predict at least one property of the conveyor belt system.

34. The method of claim 33 wherein using the at least one characteristic of the elongate support to predict the at least one property of the conveyor belt system includes predicting at least one property of the cleaner blade.

35. The method of claim 33 wherein using the at least one characteristic of the elongate support to predict the at least one property of the conveyor belt system includes predicting at least one property of the conveyor belt.

36. The method of claim 33 wherein the elongate support includes a pair of opposite ends and an axis extending therebetween; and
wherein mounting the sensor module on the elongate support includes mounting the sensor module at or adjacent to one of the ends of the elongate support axially outward from one of the mounts.

37. The method of claim 33 further comprising storing vibration historical data for an elongate support of a second conveyor belt cleaner of a second conveyor belt system; and
wherein using the at least one characteristic of the elongate support to predict the at least one property of the conveyor belt system includes comparing the at least one characteristic to the vibration historical data of the second conveyor belt system.

38. The method of claim 33 further comprising storing vibration historical data for the elongated support of the conveyor belt cleaner;
wherein using the at least one characteristic of the elongate support to predict the at least one property of the conveyor belt system includes comparing the at least one characteristic to the vibration historical data.

39. The method of claim 33 wherein using the at least one characteristic of the elongate support to predict the at least one property of the conveyor belt system includes calculating a fundamental frequency of the at least one characteristic of the elongate support and associating the fundamental frequency with the at least one property of the conveyor belt system.

40. The method of claim 33 wherein the detecting, using the sensor of the sensor module, the at least one characteristic of the elongate support includes detecting an acceleration of the elongate support, detecting a rate of rotation of the elongate support, or a combination thereof; and
wherein using the at least one characteristic of the elongate support to predict the at least one property of the conveyor belt system includes predicting a blade tension of the cleaner blade, whether the cleaner blade is engaged with the conveyor belt, whether the cleaner blade is chattering, or a combination thereof.

41. The method of claim 33 further comprising:
receiving identification data representative of at least one physical property of the conveyor belt cleaner;
selecting at least a portion of an algorithm representative of the conveyor belt cleaner based on the identification data; and wherein using the at least one characteristic of the elongate support to predict the at least one property of the conveyor belt system includes determining the at least one property utilizing the selected at least a portion of an algorithm.

42. The method of claim 33 wherein the cleaner blade includes a plurality of cleaner blades and wherein using the at least one characteristic of the elongate support to predict the at least one property of the conveyor belt system includes predicting at least one property of each of the blades.

43. The method of claim 31 wherein detecting the at least one characteristic of the elongate support includes detecting the at least one characteristic of the elongate support during operation of the conveyor belt.

* * * * *